United States Patent
Carlson et al.

(10) Patent No.: US 10,554,026 B2
(45) Date of Patent: Feb. 4, 2020

(54) INTEGRATED SYSTEMS FACILITATING WIRE AND CABLE INSTALLATIONS

(71) Applicant: Southwire Company, LLC, Carrollton, GA (US)

(72) Inventors: John R. Carlson, Newnan, GA (US); David Brian McCardel, Marietta, GA (US); David A. Cooper, Douglasville, GA (US); David Mercier, Carrollton, GA (US); Philip Sasse, Douglasville, GA (US); Allan W. Daniel, Woodland, AL (US); Timothy M. Andrea, Douglasville, GA (US); Juan Alberto Galindo Gonzalez, Powder Springs, GA (US); Timmothy R. Bardin, Carrollton, GA (US)

(73) Assignee: Southwire Company, LLC, Carrollton, GA (US)

( * ) Notice: Subject to any disclaimer, the term of this patent is extended or adjusted under 35 U.S.C. 154(b) by 0 days.

(21) Appl. No.: 16/011,170

(22) Filed: Jun. 18, 2018

(65) Prior Publication Data
US 2018/0301879 A1     Oct. 18, 2018

Related U.S. Application Data

(60) Division of application No. 14/456,594, filed on Aug. 11, 2014, now Pat. No. 10,003,179, which is a
(Continued)

(51) Int. Cl.
*H02G 1/08* (2006.01)
*H02G 1/00* (2006.01)
*H02G 15/04* (2006.01)

(52) U.S. Cl.
CPC .......... *H02G 1/081* (2013.01); *H02G 15/043* (2013.01)

(58) Field of Classification Search
CPC ............................. H02G 1/081; H02G 15/046
(Continued)

(56) References Cited

U.S. PATENT DOCUMENTS 482,270 A * 9/1892 O'Connor et al. ..... F16G 11/00
                                                     24/115 R
524,035 A     8/1894 White
(Continued)

FOREIGN PATENT DOCUMENTS

GB         2069444        8/1981
JP         01110013 A     4/1989
(Continued)

OTHER PUBLICATIONS

U.S. Office Action dated Nov. 7, 2012 in U.S. Appl. No. 12/726,992.
(Continued)

*Primary Examiner* — Patrick J Maestri
*Assistant Examiner* — Joseph J. Sadlon
(74) *Attorney, Agent, or Firm* — Hartman & Citrin LLC

(57) ABSTRACT

Pulling eyes are provided with integrated wiring systems suitable for installing conductors or cables. The pulling eyes may include body portions that define interior cavities that are sized to snugly engage outside portions of the conductors or cables. The body portions are sized to be deformably crimped onto the outside portions of the conductors or cables. The pulling eyes may also include head portions joined to the body portions, with the head portions defining apertures for receiving a strength member for installing the conductors or cables. These apertures place the interior cavities in communication with the exteriors of the pulling eyes.

20 Claims, 30 Drawing Sheets

Related U.S. Application Data continuation-in-part of application No. 12/726,992, filed on Mar. 18, 2010, now Pat. No. 8,800,967.

(60) Provisional application No. 61/244,919, filed on Sep. 23, 2009, provisional application No. 61/221,216, filed on Jun. 29, 2009, provisional application No. 61/174,210, filed on Apr. 30, 2009, provisional application No. 61/162,589, filed on Mar. 23, 2009.

(58) Field of Classification Search
USPC ............... 254/134.3 FT, 134.3 R, 134.4
See application file for complete search history.

(56) References Cited

U.S. PATENT DOCUMENTS

| | | | |
|---|---|---|---|
| 633,067 A | 9/1899 | Brien | |
| 1,830,411 A | 11/1931 | Schork, Jr. | |
| 2,007,411 A | 7/1935 | Karel | |
| 2,007,441 A | 7/1935 | Candy, Jr. | |
| 2,231,919 A | 2/1941 | Kent | |
| 2,339,671 A | 1/1944 | Bergman | |
| 2,360,312 A * | 10/1944 | Aust | H02G 1/1275 156/47 |
| 2,498,834 A | 2/1950 | Bennett et al. | |
| 2,615,074 A | 10/1952 | Bronovichi | |
| 2,688,172 A * | 9/1954 | Kellems | F16G 11/03 294/86.42 |
| 2,705,735 A | 4/1955 | Wolf | |
| 2,804,973 A | 9/1957 | Buddecke | |
| D181,440 S | 11/1957 | Petersen | |
| 2,901,725 A | 8/1959 | Schuyler | |
| 2,913,222 A * | 11/1959 | Kuzara | B65H 75/364 254/134.3 FT |
| 3,013,323 A | 12/1961 | Williams | |
| 3,015,385 A | 1/1962 | Chesnut | |
| 3,061,088 A | 10/1962 | Buddecke | |
| 3,089,588 A | 5/1963 | Correll | |
| 3,150,844 A | 9/1964 | Le Bus, Sr. | |
| 3,166,810 A | 1/1965 | Ensley | |
| 3,330,533 A | 7/1967 | Blume | |
| 3,474,559 A | 10/1969 | Hunt | |
| 3,508,644 A | 4/1970 | Martin | |
| 3,573,346 A | 4/1971 | Appleby | |
| 3,727,967 A | 4/1973 | Anastasiu et al. | |
| 3,741,489 A | 6/1973 | Kawamura | |
| 3,769,685 A | 11/1973 | Noda | |
| 3,779,471 A | 12/1973 | Grein | |
| 3,894,173 A * | 7/1975 | Andrews | H01B 13/34 138/118 |
| 3,971,544 A * | 7/1976 | Smith, Jr. | H02G 1/08 254/134.3 FT |
| 3,989,400 A * | 11/1976 | Smith | F16G 11/02 403/275 |
| 4,002,817 A | 1/1977 | DeGrado | |
| 4,077,609 A * | 3/1978 | Mac Farlane | H02G 1/02 254/134.3 FT |
| 4,101,114 A | 7/1978 | Martin et al. | |
| 4,183,692 A | 1/1980 | Durr | |
| 4,194,082 A | 3/1980 | Campbell | |
| 4,199,653 A | 4/1980 | Talley | |
| 4,242,777 A * | 1/1981 | Bourard | B66C 1/12 24/115 A |
| 4,278,238 A | 7/1981 | Vugrek | |
| 4,336,415 A | 6/1982 | Walling | |
| 4,337,923 A | 7/1982 | Smith | |
| 4,379,615 A | 4/1983 | Toda | |
| 4,411,409 A | 10/1983 | Smith | |
| 4,419,534 A | 12/1983 | Dwyer | |
| 4,432,663 A | 2/1984 | Lasak et al. | |
| 4,460,159 A | 7/1984 | Charlebois et al. | |
| 4,518,152 A * | 5/1985 | Pierce | H02G 1/08 15/104.04 |
| 4,529,172 A * | 7/1985 | Le Comte | H02G 1/08 254/134.3 FT |
| 4,565,351 A | 1/1986 | Conti et al. | |
| 4,583,289 A * | 4/1986 | Beck | H01R 43/04 29/749 |
| 4,596,486 A | 6/1986 | Niederer, Sr. | |
| 4,609,180 A | 9/1986 | Fisher et al. | |
| 4,627,187 A | 12/1986 | Williams | |
| 4,629,285 A * | 12/1986 | Carter | G02B 6/4482 174/112 |
| 4,635,989 A | 1/1987 | Tremblay et al. | |
| 4,655,432 A | 4/1987 | Woodruff | |
| 4,684,161 A | 8/1987 | Egner et al. | |
| 4,684,214 A | 8/1987 | Goldmann et al. | |
| 4,691,988 A | 9/1987 | Tremblay et al. | |
| 4,697,757 A | 10/1987 | Nakaya et al. | |
| 5,013,125 A | 5/1991 | Nilsson et al. | |
| 5,039,169 A | 8/1991 | Bougher et al. | |
| 5,039,196 A | 8/1991 | Nilsson | |
| 5,067,843 A | 11/1991 | Nova | |
| 5,122,007 A | 6/1992 | Smith | |
| 5,129,027 A | 7/1992 | Boero | |
| 5,197,715 A | 3/1993 | Griffioen | |
| 5,203,541 A | 4/1993 | Nix | |
| 5,212,616 A | 5/1993 | Dhong et al. | |
| 5,217,207 A | 6/1993 | Schmader et al. | |
| D346,734 S | 5/1994 | Rohr | |
| 5,350,885 A * | 9/1994 | Falciglia | H01B 7/365 156/50 |
| 5,356,710 A | 10/1994 | Rinehart | |
| 5,379,174 A | 1/1995 | Kasamoto | |
| 5,421,501 A | 6/1995 | Haines | |
| 5,480,203 A | 1/1996 | Favalora et al. | |
| 5,509,291 A * | 4/1996 | Nilsson | B25B 7/12 72/409.14 |
| 5,595,355 A | 1/1997 | Haines | |
| 5,636,648 A | 6/1997 | O'Brien et al. | |
| 5,691,870 A | 11/1997 | Gebara | |
| 5,779,229 A | 7/1998 | Lirette | |
| 5,788,697 A | 8/1998 | Kilpela et al. | |
| 5,820,249 A * | 10/1998 | Walsten | H02G 1/081 362/191 |
| 5,915,770 A * | 6/1999 | Bergstrom | H02G 1/00 254/134.3 R |
| 5,926,394 A | 7/1999 | Nguyen et al. | |
| 5,933,945 A | 8/1999 | Thomeer et al. | |
| 5,938,180 A | 8/1999 | Walsten | |
| 5,998,772 A | 12/1999 | Kirma et al. | |
| 6,006,909 A | 12/1999 | Dunne | |
| 6,038,765 A * | 3/2000 | Hentschel | F16G 11/02 226/162 |
| 6,100,467 A | 8/2000 | Kroulik | |
| 6,137,058 A | 10/2000 | Moe et al. | |
| 6,138,934 A | 10/2000 | Helton | |
| 6,297,453 B1 * | 10/2001 | Wigh | H02G 1/10 174/74 R |
| 6,369,329 B1 * | 4/2002 | Moore | H02G 15/043 174/74 A |
| 6,383,567 B2 | 5/2002 | Ager et al. | |
| 6,443,457 B1 | 9/2002 | Daoud | |
| 6,472,899 B2 | 10/2002 | Osburn et al. | |
| 6,655,104 B2 | 12/2003 | Kadotani et al. | |
| 6,726,181 B1 * | 4/2004 | Urban | H02G 1/00 254/134.3 FT |
| 6,883,782 B2 | 4/2005 | Ames et al. | |
| 6,886,484 B2 | 5/2005 | Thomas | |
| 7,019,217 B2 | 3/2006 | Bryant | |
| 7,041,909 B2 | 5/2006 | Hiel et al. | |
| 7,128,306 B2 | 10/2006 | Ames et al. | |
| 7,147,210 B2 | 12/2006 | Foege et al. | |
| 7,149,392 B2 | 12/2006 | Chen | |
| 7,185,838 B2 | 3/2007 | Mullebrouck et al. | |
| 7,246,789 B2 | 7/2007 | Ames et al. | |
| 7,478,794 B1 | 1/2009 | Gohlke et al. | |
| 7,563,983 B2 | 7/2009 | Bryant | |
| 7,608,783 B2 | 10/2009 | Bryant et al. | |
| D604,594 S | 11/2009 | Lin | |
| D605,499 S | 12/2009 | Gaudron | |
| 7,672,562 B1 | 3/2010 | Fandl et al. | |
| 7,775,506 B2 | 8/2010 | Hoffend, III | |

(56) References Cited

U.S. PATENT DOCUMENTS

| | | | |
|---|---|---|---|
| D630,501 S | 1/2011 | Daniel et al. | |
| D632,165 S | 2/2011 | Daniel et al. | |
| D635,450 S | 4/2011 | Deese | |
| 7,934,697 B2 | 5/2011 | Gohlke et al. | |
| 7,951,440 B2 | 5/2011 | Butler, III | |
| 7,952,020 B2 | 5/2011 | Yamamoto et al. | |
| 8,022,301 B2 | 9/2011 | Bryant et al. | |
| 8,033,678 B2* | 10/2011 | Patterson | H01B 7/36 174/68.1 |
| 8,148,639 B2* | 4/2012 | Auphand | H01B 7/36 174/110 R |
| 8,590,862 B2 | 11/2013 | Schauerte | |
| 9,027,908 B1 | 5/2015 | Calhoun et al. | |
| 9,762,039 B2 | 9/2017 | Barker et al. | |
| 2003/0010965 A1 | 1/2003 | Watanabe | |
| 2003/0131923 A1 | 7/2003 | Shah | |
| 2004/0007308 A1 | 1/2004 | Houston et al. | |
| 2004/0041136 A1 | 3/2004 | Ames et al. | |
| 2007/0280621 A1 | 12/2007 | Livingston et al. | |
| 2009/0070966 A1 | 3/2009 | Gohlke et al. | |
| 2009/0211780 A1* | 8/2009 | Auphand | H01B 7/36 174/68.1 |
| 2010/0176357 A1 | 7/2010 | Wen | |
| 2010/0236045 A1 | 9/2010 | Galindo et al. | |
| 2011/0133141 A1 | 6/2011 | Carlson | |
| 2013/0218325 A1 | 8/2013 | Carlson et al. | |

FOREIGN PATENT DOCUMENTS

| | | |
|---|---|---|
| JP | 10201035 A | 7/1998 |
| JP | 11134069 | 5/1999 |
| JP | 2002135968 | 5/2002 |
| JP | 2005130547 A | 5/2005 |
| WO | WO 2004/062072 | 7/2004 |
| WO | WO 2006/011696 | 2/2006 |

OTHER PUBLICATIONS

U.S. Office Action dated Apr. 11, 2013 in U.S. Appl. No. 12/726,992.
U.S. Office Action dated Jul. 25, 2013 in U.S. Appl. No. 12/726,992.
U.S. Notice of Allowance dated Nov. 12, 2013 in U.S. Appl. No. 12/726,992.
U.S. Notice of Allowance dated Apr. 11, 2014 in U.S. Appl. No. 12/726,992.
U.S. Office Action dated Jul. 17, 2013 in U.S. Appl. No. 13/007,827.
U.S. Notice of Allowance dated Nov. 27, 2013 in U.S. Appl. No. 13/007,827.
U.S. Office Action dated Jul. 30, 2014 in U.S. Appl. No. 13/223,889.
U.S. Office Action dated Sep. 13, 2016 in U.S. Appl. No. 13/836,319.
International Search Report and Written Opinion dated May 12, 2010 in International Application No. PCT/US10/028113.
Canadian Office Action dated Feb. 25, 2010 in Canadian Patent Application No. CA133807.
Mexican Office Action dated Dec. 6, 2010 in Mexican Patent Application No. MX/f/2010/000205.
Mexican Office Action dated Jul. 1, 2015 in Mexican Patent Application No. MX/a/2013/009816.
Canadian Office Action dated Jul. 31, 2017 in Canadian Patent Application No. CA2755343.
U.S. Notice of Allowance dated May 3, 2010 in U.S. Appl. No. 29/340,663.
U.S. Office Action dated Apr. 27, 2010 in U.S. Appl. No. 29/340,662.
U.S. Notice of Allowance dated Jun. 23, 2010 in U.S. Appl. No. 29/340,662.
U.S. Notice of Allowance dated Sep. 22, 2010 in U.S. Appl. No. 29/368,014.
U.S. Notice of Allowance dated Aug. 29, 2012 in U.S. Appl. No. 29/384,954.
U.S. Office Action dated Mar. 9, 2015 in U.S. Appl. No. 14/456,594.
U.S. Office Action dated Nov. 3, 2015 in U.S. Appl. No. 14/456,594.
U.S. Office Action dated Feb. 24, 2016 in U.S. Appl. No. 14/456,594.
U.S. Advisory Action dated Sep. 1, 2016 in U.S. Appl. No. 14/456,594.
U.S. Advisory Action dated Sep. 21, 2016 in U.S. Appl. No. 14/456,594.
Examiner's Answer to Appeal dated Sep. 26, 2016 in U.S. Appl. No. 14/456,594.
U.S. Patent Trial and Appeal Board Decision on Appeal dated Nov. 14, 2017 in U.S. Appl. No. 14/456,594.
U.S. Notice of Allowance dated Feb. 7, 2018 in U.S. Appl. No. 14/456,594.
U.S. Office Action dated Apr. 20, 2015 in U.S. Appl. No. 14/499,810.
U.S. Office Action dated Dec. 3, 2015 in U.S. Appl. No. 14/499,810.
U.S. Office Action dated Apr. 13, 2016 in U.S. Appl. No. 14/499,810.
U.S. Office Action dated Sep. 20, 2016 in U.S. Appl. No. 14/499,810.
U.S. Office Action dated Mar. 30, 2017 in U.S. Appl. No. 14/499,810.
U.S. Office Action dated Jun. 14, 2017 in U.S. Appl. No. 14/499,810.
User Guide, "Reusable Power Eye" by Condux International, Inc., Literature Part No. 08917089, Revision No. 2.5, Copyright 2008; 2 pages. Accessed from http://www.condux.com.
Installation Guide, "Crimp-On Pulling Eyes" by Condux International, Inc., Literature Part No. 08920097, Revision No. 2.00, Copyright 1998, 16 pages. Accessed from http://www.condux.com.
DCD Design Catalog, Cable Pulling Eyes Section, "Power Cable Pulling Eyes 00925 / 24000 / 24100 Series," p. 24. Accessed from www.dcddesign.com Jul. 2007 Catalog; 1 page.
DCD Design Catalog, Cable Pulling Eyes Section, "24000 Power-Grip (lug) 24100 Power-Grip (clevis)," p. 25. Accessed from www.dcddesign.com Jul. 2007 Catalog; 1 page.
DCD Design Catalog, Cable Pulling Eyes Section, "Multiplex Pushing Eye 24200 Series," p. 26. Accessed from www.dcddesign.com Jul. 2007 Catalog; 1 page.
DCD Design Catalog, Cable Pulling Eyes Section, "Mimi Grip 24500 Series / Pulling Harness 25000 Series," p. 27. Accessed from www.dcddesign.com Jul. 2007 Catalog; 1 page.
"Grips Double Lock System," new product information page, accessed Mar. 18, 2010 from http://www.maxis-tools.com/, 1 page.
"Grips Maxis," product information page, accessed Mar. 18, 2010 from http://www.maxis-tools.com/product/grips/, 1 page.
"Utility Industries, Inc. (UII)," product information page, accessed Mar. 18, 2010 from http://utilityindustries.com/products.html, 1 page.
"Greenlee," product information page, accessed Mar. 18, 2010 from http://www.mygreenlee.com/Products/main.shtml?greenlee_category_id=10&product_category=109&adodb_next_page=1&portalProcess_2=showGreenleeProductTemplate&upc_number=31855, 1 page.
"Spaced and Overlapping Crimps" and "Crimp Configurations", product information page, Copyright 2007 FCI USA, Inc., 1 page.
Photograph taken Mar. 28, 2011 of Pulling-Eye from Utility Industries, Inc. crimped to conductor (believed to be used in similar fashion and/or re-sold by Applicant as early as August of 2007).
Pulling Eye—Single Conductor Assembly Instructions; Downloaded from http://utilityindustries.com on Apr. 28, 2011.
RectorSeal "Wire Snagger" product information page, accessed May 31, 2011 from http://www.rectorseal.com/index.php?site_id=1&product_id=278.
Greenlee, product catalog, accessed May 31, 2011 from http://www.greenlee.com/cat_docs/Cable_Pulling09.pdf; pp. 177-182.
"Recommended Practice for Installing Aluminum Building Wire and Cable" NECA/AA 104-2000; published by National Electrical Contractors Association, 2000.
Gator EK425 Battery-Powered Crimping Tool Instruction Manual, Dec. 2006, 14 pages.
K425BG and K425O Mechanical Crimping Tools Instruction Manual, Oct. 2002, 4 pages.

* cited by examiner

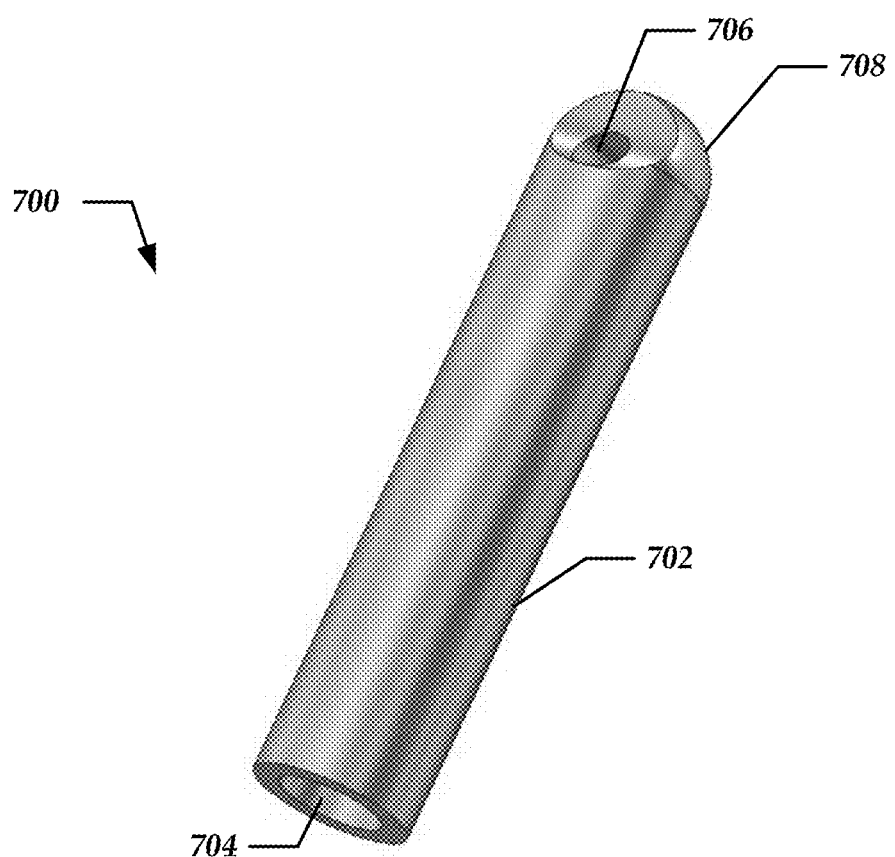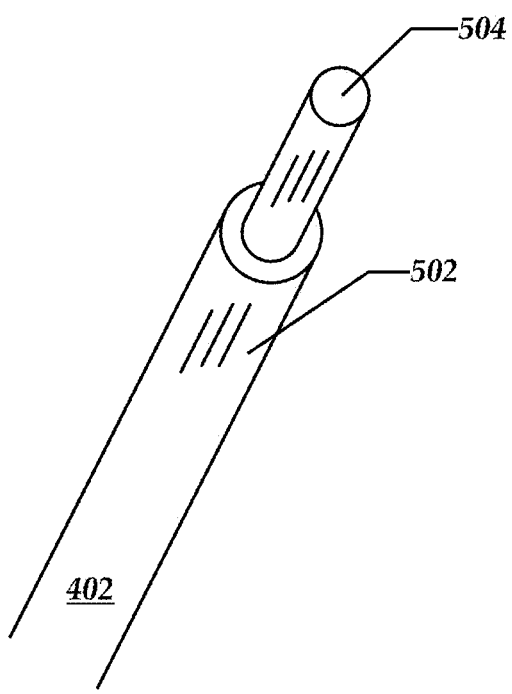
Fig. 7

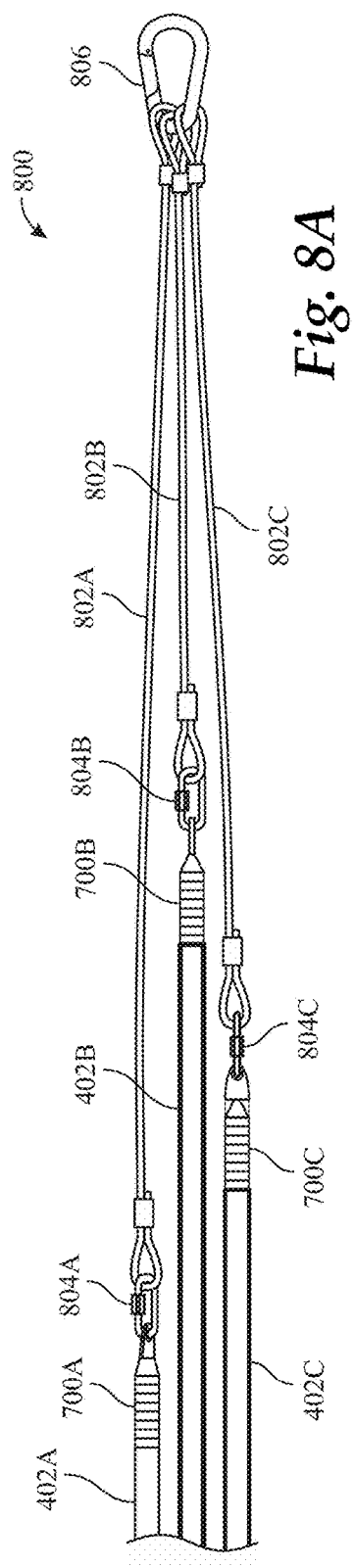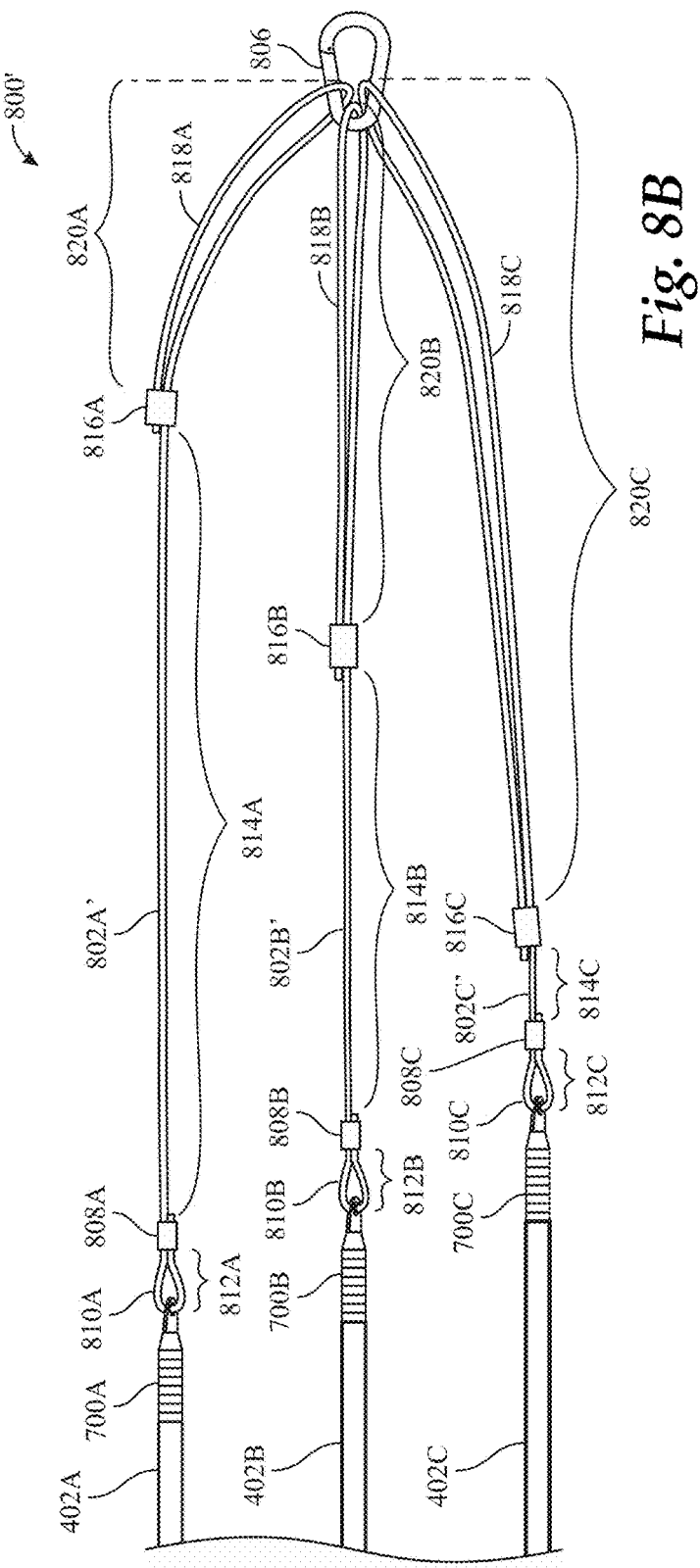

INTEGRATED SYSTEMS FACILITATING WIRE AND CABLE INSTALLATIONS

CROSS-REFERENCE TO RELATED APPLICATIONS

This application is a division of and claims priority to U.S. patent application Ser. No. 14/456,594 filed on Aug. 11, 2014, now U.S. Pat. No. 10,003,179, which is incorporated herein by reference in its entirety and which is a continuation-in-part of U.S. patent application Ser. No. 12/726,992 filed on Mar. 18, 2010, now U.S. Pat. No. 8,800,967, which is incorporated herein by reference in its entirety and which claims the benefit of U.S. Provisional Patent Application No. 61/162,589 filed on Mar. 23, 2009, which is incorporated herein by reference in its entirety; U.S. Provisional Patent Application No. 61/174,210 filed on Apr. 30, 2009, which is incorporated herein by reference in its entirety; U.S. Provisional Patent Application No. 61/221,216 filed on Jun. 29, 2009, which is incorporated herein by reference in its entirety; and U.S. Provisional Patent Application No. 61/244,919 filed on Sep. 23, 2009, which is incorporated herein by reference in its entirety. This application further incorporates by reference the entire contents of U.S. Pat. No. 7,557,301, filed as U.S. patent application Ser. No. 12/017,222 on Jan. 21, 2008, as if the contents thereof were set forth verbatim herein. In addition, this patent application incorporates by reference the following as if the contents thereof were set forth verbatim herein: U.S. Provisional Patent Application No. 60/587,584; and U.S. patent application Ser. Nos. 11/858,766, now abandoned, filed Sep. 20, 2007, and 11/675,441, now U.S. Pat. No. 7,749,024, filed Feb. 15, 2007.

BRIEF DESCRIPTION OF THE DRAWINGS

FIG. 7 is a diagram illustrating an example pulling eye that may be attached to a terminal end of the wires or cables provided as part of the integrated systems for wire and cable installations.

FIGS. 8A and 8B are diagrams illustrating additional examples of the pulling eyes, as well as illustrating installation scenarios in which a number of different pulling eyes are attached to the terminal ends of respective wires, connected to pulling ropes, and linked to a common attachment point for pulling through conduit.

DETAILED DESCRIPTION

The following detailed description is directed to methods, systems, and apparatuses for using integrated systems for wire and cable installations. This description provides various components, one or more of which may be included in particular implementations of the integrated systems for wire and cable installations. In illustrating and describing these various components, however, it is noted that implementations of the integrated systems for wire and cable installations may include any combination of these components, including combinations other than those shown in this description.

Figure 1:
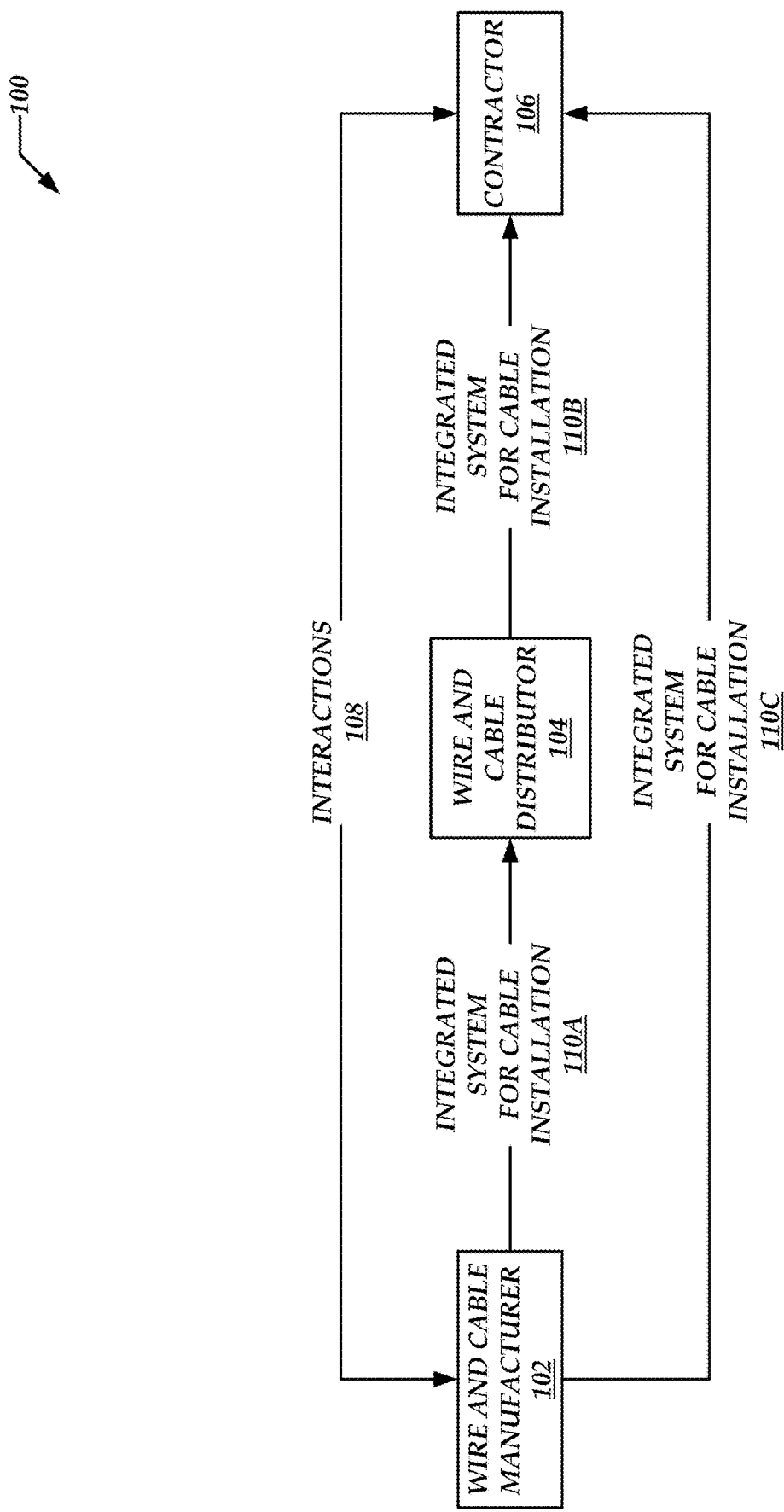
FIG. 1 is a combined block and flow diagram illustrating implementations in which wire and cable manufacturers, distributors, and contractors may interact in connection with creating and delivering integrated systems for wire and cable installations.

FIG. 1 illustrates implementations, denoted generally at 100, in which any number of wire and cable manufacturers 102, wire and cable distributors 104, and contractors 106 may interact in connection with creating and delivering integrated systems for wire and cable installations. As shown in FIG. 1, a given wire and cable manufacturer 102 and a given contractor 106 may communicate or interact with one another, to establish various parameters related to one or more wire pulls to be performed at a job site where the contractor 106 is working. FIG. 1 denotes these interactions generally at 108.

The interactions 108 may represent the contractor 106 providing specifications related to the wire pulls. The interactions 108 may also represent the manufacturer 102 processing these specifications to design and provide an integrated system that is customized for performing one or more of the wire pulls at the contractor site.

FIG. 1 generally represents at 110A and 110B (collectively, integrated systems 110) the integrated systems for wire and cable installations, as provided by the manufacturer 102. In some implementations, but not necessarily all, the integrated systems 110 may pass through one or more distributors 104 for delivery to the contractor 106. FIG. 1 denotes at 110A the integrated systems as provided to the distributors 104, and denotes at 110B the integrated systems as provided by the distributors 104 to the contractors 106. In different scenarios, the distributors 104 may or may not add to or augment the integrated systems 110 before delivering them to the contractors 106. Thus, the integrated systems 110A may or may not be the same as the integrated systems 110B in different implementation scenarios.

In some cases, the integrated systems 110 may pass directly from the manufacturer 102 to the contractor 106. FIG. 1 represents this scenario generally at 110C.

Figure 2:
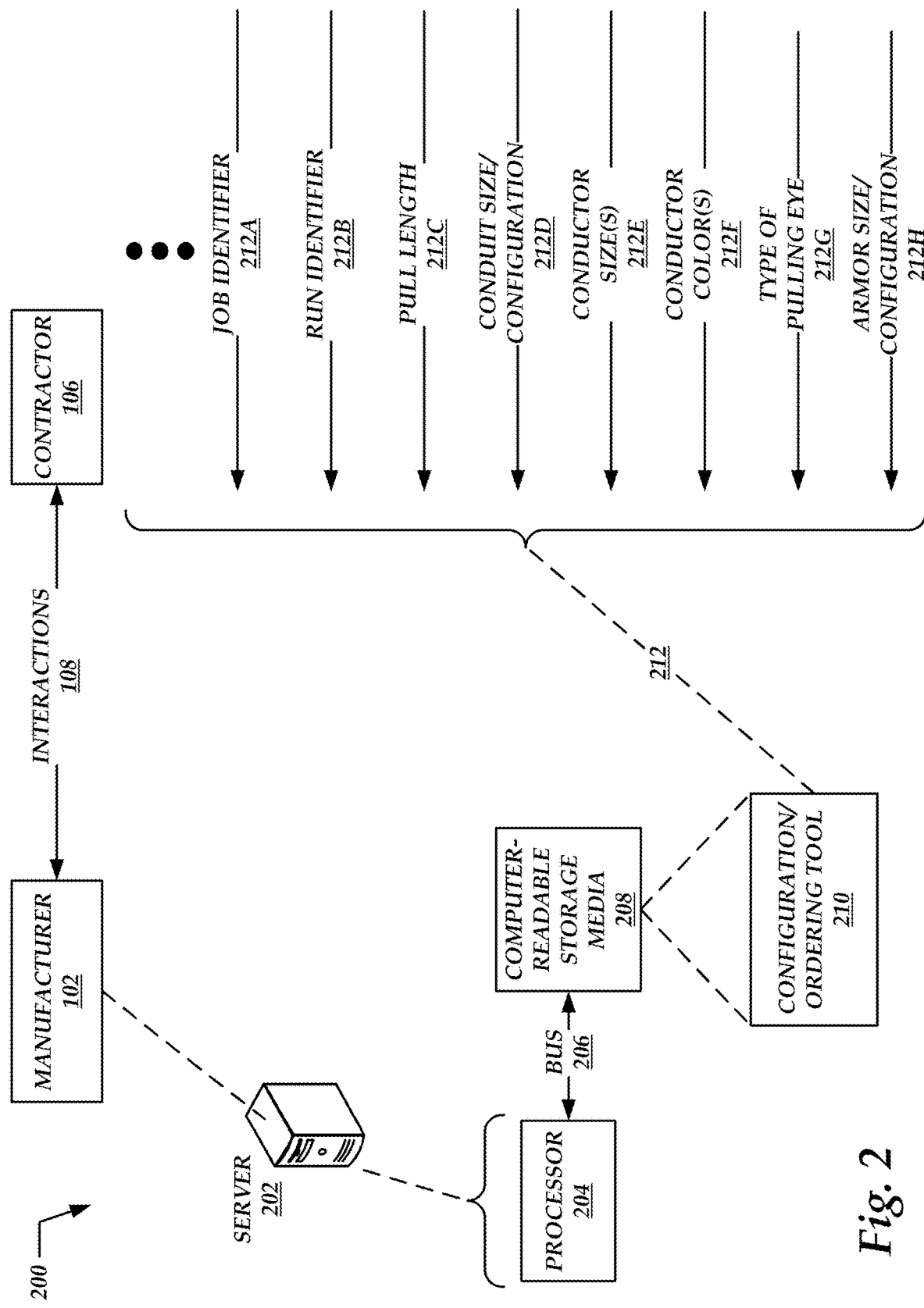
FIG. 2 is a block diagram providing additional details relating to a configuration and ordering tool that may facilitate creating and delivering the integrated systems for wire and cable installations.

FIG. 2 illustrates additional details, denoted generally at 200, relating to a configuration and ordering tool that may facilitate creating and delivering the integrated systems for wire and cable installations. For ease of description, but not to limit possible implementations, FIG. 2 carries forward the manufacturer 102 and the contractor 106, who may interact as carried forward at 108.

Turning to FIG. 2 in more detail, the manufacturer 102 (or a third party acting on behalf of the manufacturer 102) may operate one or more server systems 202, and may enable the distributors and/or contractors 106 to log into the server systems 202 remotely to access at least portions of the server systems 202. The server systems 202 may communicate with the manufacturer 102, the distributors, and/or the contractors 106 over suitable communications networks (not shown in FIG. 2). For example, the manufacturer 102 and the contractor 106 may carry out at least portions of the interactions 108 through the server systems 202.

Turning to the server systems 202 in more detail, these systems may include one or more processors 204, which may have a particular type or architecture, chosen as appropriate for particular implementations. The processors 204 may couple to one or more bus systems 206 chosen for compatibility with the processors 204.

The server systems 202 may also include one or more instances of computer-readable storage medium or media 208, which couple to the bus systems 206. The bus systems 206 may enable the processors 204 to read code and/or data to/from the computer-readable storage media 208. The media 208 may represent apparatus in the form of storage elements that are implemented using any suitable technology, including but not limited to semiconductors, magnetic materials, optics, or the like. The media 208 may include memory components, whether classified as RAM, ROM, flash, or other types, and may also represent hard disk drives.

The storage media 208 may include one or more modules of instructions that, when loaded into the processor 204 and executed, cause the server systems 202 to perform various techniques related to provisioning the integrated systems for wire and cable installations. As detailed throughout this description, these modules of instructions may also provide various tools or techniques by which the server systems 202 may provision the integrated systems 110, using the components and flows discussed in more detail throughout this description. For example, the storage media 208 may include one or more software modules that implement configuration and ordering tools or utilities 210. These configuration and ordering tools 210 generally represent software programmed or configured to perform various functions allocated herein to the server systems 202. For example, the contractors 106 and/or distributors may access the configuration and ordering tools 210, once they have logged into the server systems 202.

Turning to the configuration and ordering tools 210 in more detail, these tools may provide suitable graphical user interfaces (UIs) and related process flows by which the manufacturer 102 may obtain different parameters related to one or more wire/cable pulls to be performed on a contractor job site. FIG. 2 illustrates several non-limiting examples of such parameters, denoted generally at 212.

Turning to the parameters 212 in more detail, these parameters 212 may include a representation of a job or site identifier where the wire/cable pulls are scheduled to occur. FIG. 2 denotes the job or site identifier at 212A.

At a given job or site indicated by the identifier 212A, one or more different wire/cable pulls or runs may be scheduled and provisioned using the configuration and ordering tool 210. FIG. 2 denotes a representative run identifier at 212B, but it is noted that the configuration and ordering tool may provision any number of wire/cable runs for a given job site.

For a given wire/cable run or pull, the configuration and ordering tools 210 may gather different parameters. For example, FIG. 2 denotes a length of the pull at 212C, with the pull typically involving pulling wire or cable through a run of conduit or involving running armored cable, such as metal-clad ("MC") cable. According to embodiments, an armored cable includes a wire bundle consisting of individually insulated conductors covered by an armor, or flexible layer of material, such as metal. Generally, runs involving armored cable do not require a conduit through which the armored cable needs to be pulled since the armor of the armored cable acts like the conduit. The pull length parameters 212C may be specified in feet, yards, or other appropriate units of measure.

FIG. 2 denotes a size and/or configuration of the conduit at 212D for pulls involving a conduit. More specifically, the conduit configuration parameters 212D may represent the diameter of the conduit through which the wire or cable is to be pulled. This conduit size or diameter may be expressed and represented using any suitable nomenclature known to those skilled in the art.

In addition, the conduit configuration parameters 212D may indicate a general layout or configuration of a given conduit run. For example, the conduit configuration parameters 212D may indicate whether the conduit run includes any bends. For conduit runs that include bends, the conduit configuration parameters 212D may indicate how many and what types of bends occur, and the like. The conduit configuration parameters 212D may indicate whether the conduit run includes any intermediate pull or junction boxes, and the locations of any such boxes. Finally, the conduit configuration parameters 212D may indicate whether the conduit itself is constructed of metallic or plastic (e.g., polyvinyl chloride (PVC)) materials.

The configuration parameters 212 may include parameters representing particular conductors involved with a given run, denoted generally at 212E. The conductor parameters 212E may indicate how many conductors (whether individual wires or cables that include multiple wires) are included in a given run, how many conductors are included within the armor of an armored cable, as well as the size and type of these conductors. These conductor sizes or types may be expressed and represented using any suitable nomenclature known to those skilled in the art. The configuration parameters 212 may also specify whether a given conductor is copper, aluminum, or other conductive material.

The configuration parameters 212 may include parameters representing colors of insulation desired for particular conductors, as denoted generally at 212F. As understood by those skilled in the art, certain colors chosen for a given circuit may convey corresponding electrical functions. These colors and functions may vary depending on whether the circuit is operating at high-voltage or at low-voltage. For example, in either high-voltage or low-voltage scenarios, green-colored conductors typically function as circuit grounds. In high-voltage scenarios, brown, orange, or yellow conductors may indicate "hot" circuit functions, while gray conductors may indicate circuit neutrals. In low-voltage scenarios, black, red, or blue conductors may indicate "hot" circuit functions, while white conductors may indicate circuit neutrals. In general, these conductor colors may be expressed and represented using any suitable nomenclature and conventions known to those skilled in the art.

In previous techniques, phase tape may be applied to, for example, black conductors to represent different circuit functions. However, applying phase tape to these different conductors may be laborious and error prone. For example, cross-phasing the electrical supply to, for example, three-phase equipment may damage this equipment. However, the color-coded conductors provided as part of the integrated systems 110 may reduce or eliminate the use of phase tape on individual conductors.

The configuration parameters 212 may indicate whether the wires or cables are to be equipped with pulling eyes, as represented generally at 212G. These pulling eyes are described in more detail below. In overview, the manufacturers 102 or distributors 104 may install, at their facilities, pulling eyes onto a leading end of the wires that are delivered to the contractors 106. These pulling eyes facilitate attaching pulling ropes to the ends of the wires, for pulling into and through the conduit. Because the pulling eyes are affixed at the factory before delivery to the contractors 106, personnel associated with the contractors 106 are relieved from the labor and time involved with configuring the ends of the wires for the pulls. For example, using previous techniques, contractor personnel may create a pulling head by stripping some length of the insulation from the end of a wire, thereby exposing the bare metallic conductor or conductors. In cases where the wire is a stranded conductor, at least some of the outer strands may be untwisted and pulled back, and the interior strands cut out. In turn, the outer strands may be attached to or twisted around a pulling rope in some convenient fashion to form a pulling head. The whole connection may be wrapped with adhesive tape (e.g., duct tape or electrical tape) further to secure the connection between the pulling rope and the wire.

In these previous techniques for creating pulling heads, however, the pulling tension is borne by only a subset of the conductor strands, namely the strands that are not cut off when creating the pulling heads. Because only a subset of the conductor strands are bearing the pulling tension, the maximum pulling tension that a given pulling head may withstand before failing may be reduced. However, as described in further detail below, the pulling eyes are attached to all of the stranded conductors, such that the pulling tension is transferred to all of the stranded conductors, rather than only a subset thereof. Accordingly, implementations of the integrated systems 110 that incorporate the pulling eyes may achieve higher maximum pulling tensions. In addition, pulling heads that incorporate the pulling eyes may be shorter in length and more flexible than conventional pulling heads, and thus may travel through bends in conduit runs more readily without snagging or binding.

Typically, pulls through conduits may experience bends having any angle up to or possibly more than approximately 90°. The pulling eyes described herein may be of any length suitable for clearing such bends without binding or jamming during pulls.

Using the pulling eyes affixed to the ends of the wires, the pulling rope may be attached to the wires, while reducing the labor time and cost associated with previous techniques for forming the pulling head. In general, configuration parameters 212G associated with a given wire or conductor may indicate whether that given wire or conductor is to be equipped with a pulling eye. For example, for an armored cable run, all of the conductors making up the armored cable may be equipped with a pulling eye, or a portion of the conductors making up the armored cable may be equipped with a pulling eye while the remaining conductors are not equipped with a pulling eye. In cases where multiple types of pulling eyes are available, the configuration parameters 212G may identify which type of pulling eye is to be attached to the given wire or conductor.

The parameters 212 may also include an armor size/configuration parameter 212H for runs involving armored cable, such as MC cable. The armor size/configuration parameter 212H may indicate the size of the armor to be associated with the armored cable as well as the type of material the armor itself is to be constructed of, such as metal. As is known by one skilled in the art, the size of the armor to be associated with the armored cable may be determined based on the number and size of conductors to be included within the armor as provided by the conductor parameters 212E. The armor size may be expressed and represented using any suitable nomenclature known to those skilled in the art. In addition, the armor size/configuration parameter 212H may indicate a general layout or configuration of a given armored cable run.

Figure 3:
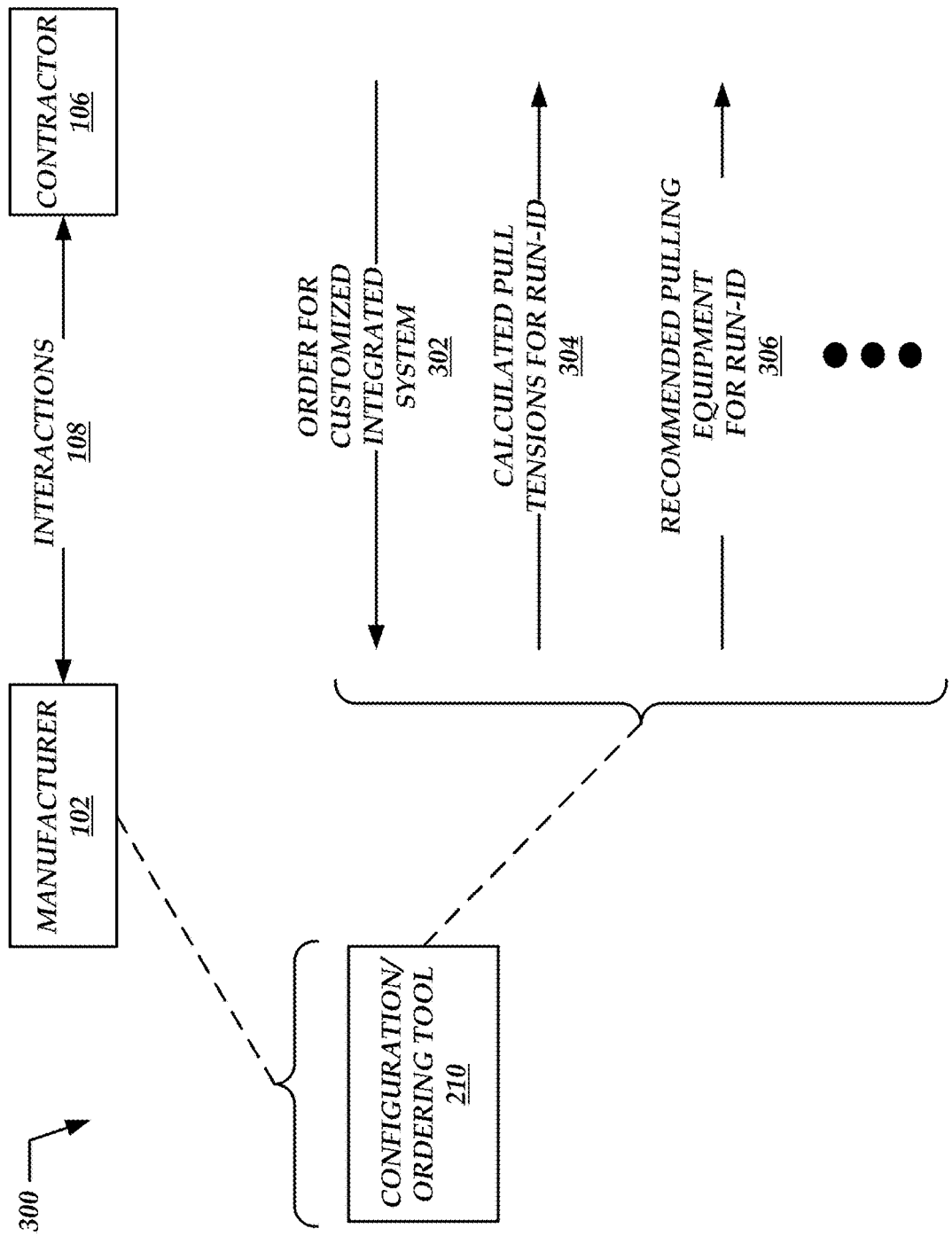
FIG. 3 is a flow diagram illustrating additional details relating to inputs and outputs of the configuration and ordering tool shown in FIG. 2.

FIG. 3 illustrates additional details, denoted generally at 300, relating to inputs and outputs of the configuration and ordering tool 210 shown in FIG. 2. For example, the manufacturer 102 may receive a given order 302 from a given contractor 106, with this order 302 specifying one or more of the various configuration parameters 212 shown in FIG. 2. In turn, the configuration and ordering tool 210 may process these configuration parameters 212, and calculate pull tensions 304 expected for the various pulls or runs included in the order 302. For example, the configuration and ordering tool 210 may consider the size and configuration of the conduit or armored cable involved in a given run, the length of the run, the size and types of the various conductors, and other relevant factors in computing the expected pull tension for that given run.

The configuration and ordering tool 210 may also recommend appropriate pulling equipment for a given run, based at least in part on the pull tension 304 calculated for the given run. Examples of pulling equipment may include tuggers, which typically have maximum rated pulling capacities. In an example scenario, if the pull tension 304 is calculated as a maximum of 2,000 pounds, the configuration and ordering tool 210 may recommend equipment capable of generating at most 2,000 pounds of force. In this example, providing equipment capable of generating any force more than 2,000 pounds would be an unnecessary expense. FIG. 3 denotes at 306 a representation of the pulling equipment recommended for a given pull. If a given order 302 includes multiple different pulls with different calculated tensions 304, the recommendations 306 may suggest a tugger having capacity sufficient to handle the largest calculated tension 304.

Figure 4:
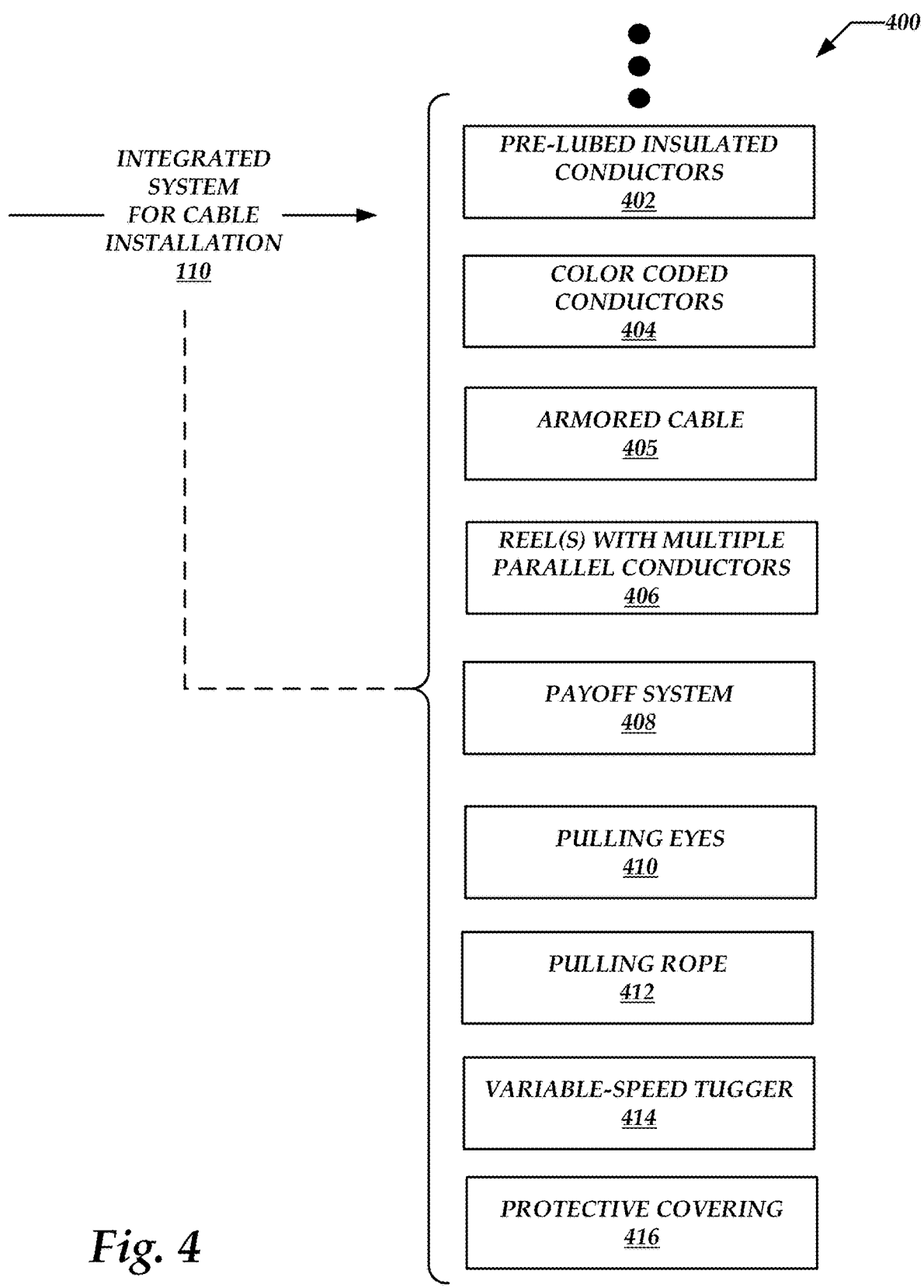
FIG. 4 is a block diagram illustrating various components that may be included in the integrated systems for wire and cable installations.

FIG. 4 illustrates various components, denoted generally at 400, that may be included in the integrated systems 110 for wire and cable installations. In illustrating and describing these example components, it is noted that implementations of this description may include at least one of these components, but may not necessarily include all of these components.

The integrated system 110 may include any number of insulated conductors, represented generally at 402. These conductors may be configured in any number of different ways, to reduce the force involved with installing the insulated conductors through conduit. For example, the insulation of the conductors may be pre-lubed during manufacture, as distinguished from having lubricant applied to the conductors when preparing the pull at the jobsite. The various issued patents, provisional applications, and non-provisional patent applications incorporated herein by reference above provide various non-limiting examples of the pre-lubed insulated conductors 402. However, it is noted that implementations of this description may include other examples of the pre-lubed insulated conductors 402 without departing from the scope and spirit of this description.

The integrated system 110 may include any number of color-coded conductors, represented generally at 404. For example, recalling previous description of FIG. 2, the configuration and ordering tool 210 may enable the contractor 106 to specify conductor colors 212F for a given order. As discussed previously, different colors of conductors may convey particular electrical functions, as understood by those skilled in the art.

In further embodiments, the integrated system 110 may include armored cable, represented generally at 405. As discussed above, the armored cable may include a number of conductors covered by an armor, such as metal.

The conductors 402 provided by a given implementation of the integrated system 110, whether these conductors are pre-lubed and/or color-coded, may be delivered so that multiple different conductors are provided for payoff on a single given reel, denoted generally at 406. For example, if a given order specifies three different conductors having three different insulation colors, the integrated system 110 fulfilling this order may provision these three different conductors on the same reel. Accordingly, the integrated system 110 may enable all three conductors to be payed-off or dispensed from the same reel in parallel with one another.

In addition, the conductors as loaded onto the same reel may be cut to length, recalling, for example, that a pull length may be specified for a given run of conduit (e.g., at 212C in FIG. 2). For example, service centers operated by the manufacturers may load and supply these reels as a service to the contractors.

In some implementation scenarios, the reels may be compartmentalized, to contain the different colors of conductors in respective compartments. In other implementation scenarios, the reels may include a single compartment that contains all the different colors of conductors.

In contrast, previous techniques may fulfill this given order by delivering three different reels, each of which would contain one of the different conductors. In these previous techniques, the three different conductors would be payed-off simultaneously from three different reels, further complicating installation of the conductors. Subsequent drawings illustrate and provide further details related to these single-reel scenarios.

The integrated systems 110 as delivered to a given contractor 106 may be delivered with a consolidated payoff system, as denoted generally at 408. Typically, using previous techniques, reels containing conductors would be installed on apparatus configured on an ad hoc basis at the jobsite. However, these delivered reels may be quite heavy and difficult to manhandle into position, with the attendant risk of strain and injury to workers. However, the consolidated payoff system 408, as illustrated in further detail below, may expedite and facilitate setup of the delivered reels, and may reduce or eliminate manual positioning and leveling of these delivered reels. For example, forklifts or other machinery may maneuver the consolidated payoff system 408 as a single unit into position. Once the payoff system 408 is in place, workers may adjust the system as appropriate to pay-off the conductors into the conduit.

The integrated systems 110 may also include delivered wires, conductors, or armored cable that have pulling eyes installed onto their ends. FIG. 4 denotes these pulling eyes generally at 410, and subsequent drawings provide further details relating to these pulling eyes.

The integrated systems 110 may also deliver specialized pulling ropes, denoted generally at 412. For example, these pulling ropes may be coated or impregnated with specialized low-friction compounds, similar to the compounds that impregnate the pre-lubed insulated conductors 402. In previous techniques for pulling conductors through conduit, contact between the rope and the conduit may contribute considerable friction to the overall pull, thereby increasing the pulling tension. However, by reducing the friction between the pulling rope and the surrounding conduit, the integrated systems 110 may reduce the overall tension involved in a given pull. In addition, abrasive or high-friction rope may damage conduit constructed of polyvinyl chloride (PVC), resulting in burrs, notches, or debris left in the conduit. In turn, this damage to the structure of the conduit may damage conductors and insulation when the wires are pulled into the conduit. However, the specialized pulling rope 412 may be constructed of nylon, and impregnated with low-friction compound.

A variable-speed tugger 414 may also be provided as part of the integrated systems 110. The variable speed tugger 414 may include a drum to which the specialized pulling rope 412 is attached. In some implementations, this variable-speed tugger 414 may be an electric motor controllable by a two-speed switch or a variable-speed switch. This electric motor may be fitted with an output shaft connected to a 90° output chuck, with this output chuck coupled to drive the drum of the tugger 414.

The integrated systems 110 may also include one or more protective covering 416 made of a low-friction material (e.g., NYLON, PVC, or any polymeric materials), with these coverings 416 being adapted for placement around a pulling head before commencing a given pull. More specifically, these coverings 416 may conceal any hardware included as part of the pulling head that might contribute to increased friction, thereby reducing the risk that this hardware may contact the conduit through which the conductors are pulled. As described previously regarding the insulated conductors 402, the protective coverings 416 may contribute, along with other factors, to reducing the force involved with drawing the pulling head though conduit during a given pull. For example, the protective coverings 416 may be pre-lubed during manufacture and/or have lubricant applied to the coverings when preparing the pull at the jobsite.

Figure 5:
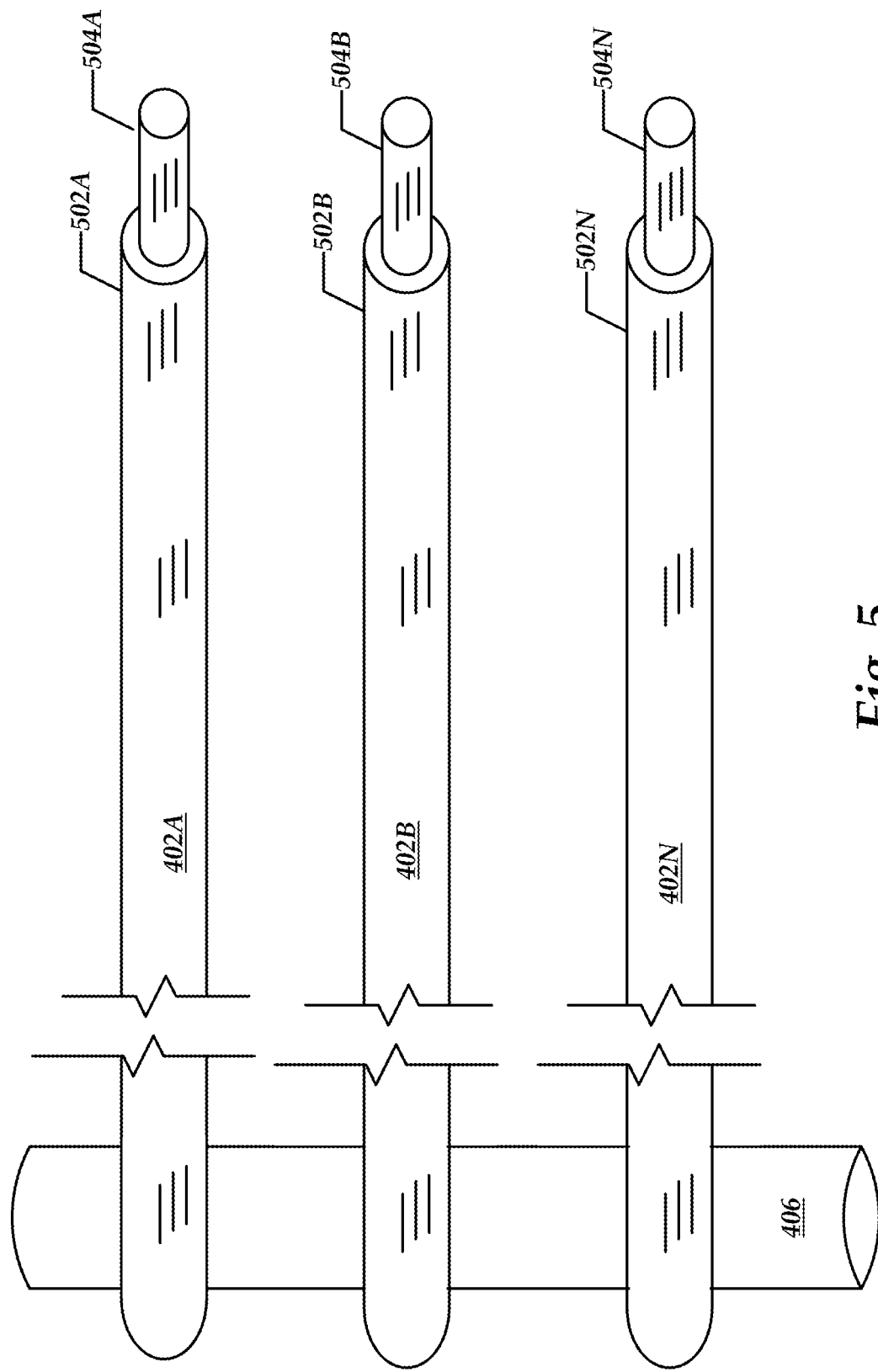
FIG. 5 is a diagram illustrating multiple cables or wires that may be loaded in parallel onto a single reel to be payed-off in parallel during installation at a contractor job site.

FIG. 5 illustrates multiple conductors 402 loaded in parallel onto a single reel 406 to be payed-off in parallel during installation at a contractor job site. For ease of reference, but not to limit possible implementations, FIG. 5 carries forward three examples of these conductors, denoted respectively at 402A, 402B, and 402N. However, implementation of this description may include any number of conductors 402 delivered on a single reel 406. In a further embodiment, multiple parallels, each consisting of one or more conductors 402, may be wound onto the reel 406 in layers, one on top of the other, as will be described below in regard to FIGS. 27-31. Each parallel on the reel 406 may then be payed-off separately for multiple, independent wire/cable pulls.

In example implementation scenarios, the conductors 402 may be of any convenient size or type. In different possible implementations, the different conductors 402A-402N may or may not be of the same size or type. For example, conductors 402 that serve as circuit neutrals may be downsized, relative to conductors 402 that serve as higher-voltage supplies.

The conductors 402 may include insulation 502A-502N (collectively, insulation 502) of any suitable thickness, composition, or type. In addition, the insulation 502 may be color-coded as discussed above in connection with the color-coded conductors 404 in FIG. 4. In some scenarios, the insulation 502 may also be marked with footage markers, to indicate how much wire has been payed-off from the reel 406 at a given time.

As also described above, the insulation 502 may be impregnated or coated with a suitable lubricant as part of the process of manufacturing the insulation 502, as distinguished from previous techniques in which lubricant is applied to the exterior of the insulation 502 just prior to the conductors 402 being pulled through the conduit.

As shown in FIG. 5, a portion of the insulation 502 has been stripped from the end of the conductors 402, exposing the bare metal cables or wires 504A-504N (collectively, wires 504) underneath. The wires 504 may be of any convenient size or type, and may represent solid wires or stranded cables, as appropriate in different installations. In addition, the wires 504 may be constructed of any suitable conductive material, including, but not limited to, copper and aluminum.

Figure 6:
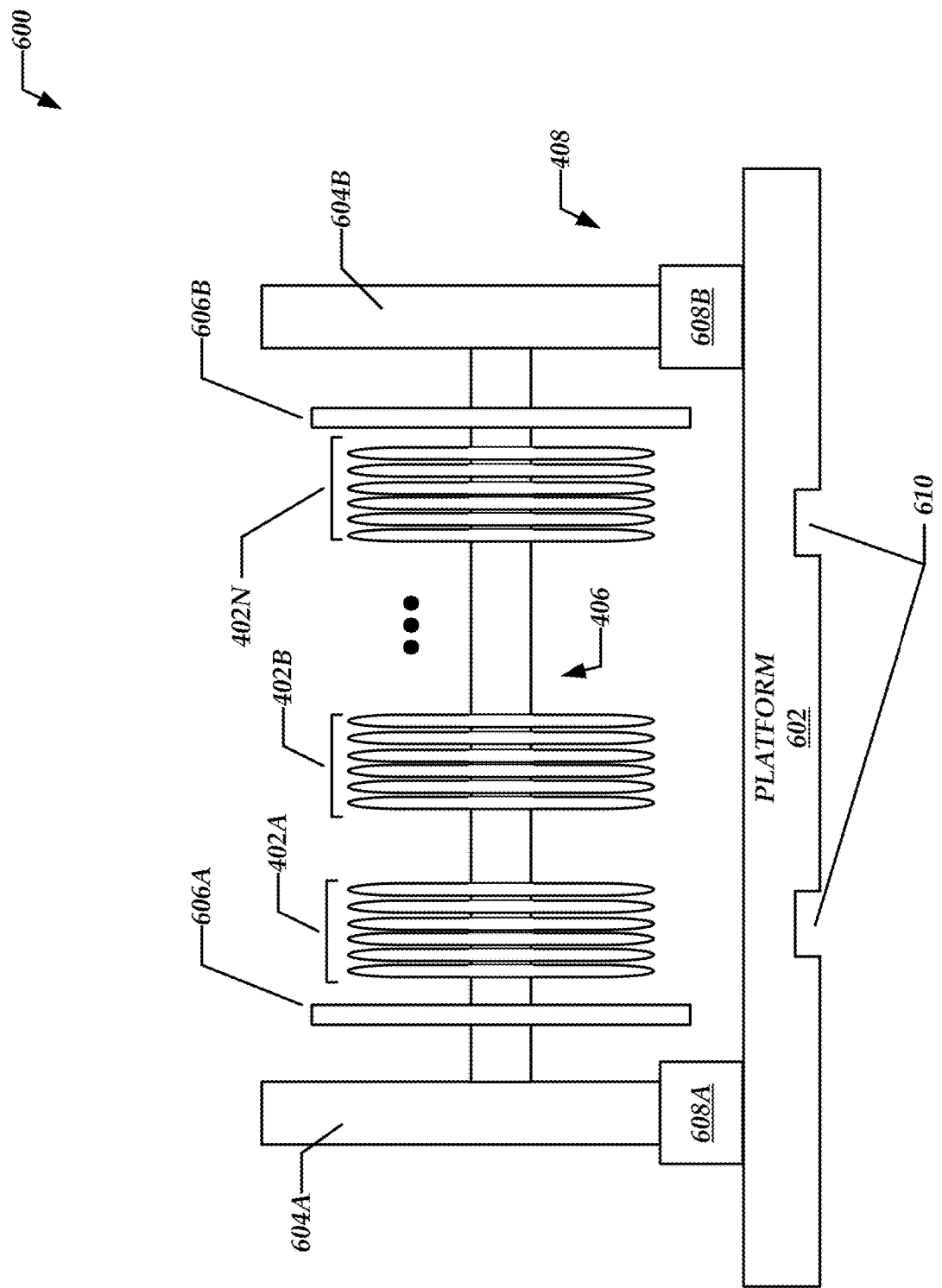
FIG. 6 is a diagram illustrating payoff systems that may be included in some instances of the integrated systems for wire and cable installations.

FIG. 6 illustrates additional details, denoted generally at 600, of payoff systems that may be included in some instances of the integrated systems 110 for wire and cable installations. For convenience of description, but not to limit possible implementations, FIG. 6 may be understood as elaborating further on the payoff systems 408 shown above and described in FIG. 4. In addition, FIG. 6 carries forward a representative reel 406, from which any number of different conductors 402A-402N may be payed-off in parallel with one another.

Turning to the payoff systems 408 in more detail, these systems 408 may include a base platform 602 of sufficient size and weight to provide stability for the overall systems 408 during shipment, delivery, and installation at a construction job site. The base platform 602 is generally horizontal in configuration and may include two or more slots 610 or channels in the base spaced such that the payoff system 408 may be lifted and carried as a single unit by a standard forklift. The payoff systems 408 may also include vertical supports 604A and 604B (collectively, vertical supports 604). The vertical supports 604 may rotateably support the ends of the reel 406, allowing the reel 406 to spin while paying-off the conductors 402. The reel 406 may also include flanges 606A and 606B (collectively, flanges 606) to direct the conductors 402 away from the vertical supports 604.

The payoff systems 408 may also include leveling mechanisms 608A and 608B (collectively, leveling mechanisms 608), respectively attached to the vertical supports 604A and 604B. More specifically, the leveling mechanism 608A is disposed between the platform 602 and the vertical support 604A, while the leveling mechanism 608B is disposed between the platform 602 and the vertical supports 604B. In general, the leveling mechanisms 608 may operate to level the reel 406. For example, assuming that the platform 602 is set upon uneven ground, the leveling mechanisms 608 may adjust the orientation of the vertical supports 604 relative to the platform 602, to level the reel 406. The leveling mechanisms 608 may operate by any suitable means, including but not limited to, mechanical, hydraulic, pneumatic, or other similar means.

FIG. 7 illustrates example pulling eyes, denoted generally at 700, that may be attached to a terminal end of the conductors 402 provided as part of the integrated systems 110 for wire and cable installations. For ease of reference, but not to limit possible implementations, FIG. 7 carries forward an example conductor 402, with a portion of the insulation 502 stripped to expose the bare cable or wire 504. It should be understood by those skilled in the art that the conductor 402 may be included within an armor of an armored cable.

The pulling eye 700 may generally include a somewhat elongated body portion 702, which defines an interior cavity 704 along at least part of the body portion 702. In turn, the bare cable or wire 504 may be inserted into the cavity 704, and the body portion 702 may be crimped, swaged, or otherwise secured to the wire. In scenarios in which the body portion 702 is crimped onto the wire 504, the dimensions of the body portion 702 (more specifically, the wall thickness) may be chosen as appropriate to provide a solid crimp. More specifically, the crimp strength may be sufficient to withstand the tension that the conductor 402 is expected to encounter while being pulled into the conduit.

In other implementation scenarios, the pulling eyes 700 may include a wedging mechanism, set screws, or other mechanical mechanisms operative to secure the body portion 702 to the exposed cable or wire 504.

In implementations in which the pulling eyes 700 are crimped onto the ends of the conductors 402, the pulling eyes 700 may be manufactured of material suitable for crimping (e.g., aluminum, or alloys thereof). In general, the pulling eyes 700 may be manufactured using any suitable processes, including but not limited to, machining from a single piece of stock aluminum or other material, as well as forging, casting, molding, or the like. In addition, the pulling eye 700 may define an aperture 706 through which a pulling rope may be secured, as described further below with FIGS. 8A and 8B.

As compared to previous approaches, in which pulling heads are created for a given conduit run or armored cable run on an ad hoc basis at the jobsite, the pulling eyes 700 as installed by the manufacturers may provide a more standardized and reliable connection to the conductors. Moreover, engineering techniques and quality control processes in place at the manufacturer's facilities may overcome the variability and deviations typically experienced with ad hoc installations done at the jobsite by differently-skilled personnel. In some cases, the manufacturers may publish specifications indicating maximum tension ratings applicable to particular installations of the pulling eyes 700 to the conductors 402.

In some scenarios, the pulling eyes 700 may double as hardware that is suitable for electrically coupling the conductors 402 to terminating switchgear or equipment. For example, an end 708 of the pulling eyes 700 that is opposite the end where the conductor 402 enters may be flattened or otherwise adapted to be bolted into a lug or other attachment mechanism provided by the terminating switchgear or equipment. In this manner, the pulling eyes 700 so configured may save labor time in preparing the conductors 402 for connection to the terminating switchgear or equipment.

FIG. 8A illustrates an assembly, denoted generally at 800, of pulling eyes 700A, 700B, and 700C, as attached respectively to the terminal ends of conductors 402A, 402B, and 402C. In further embodiments, the conductors 402A, 402B, and 402C may be included within an armor of an armored cable. The pulling eyes 700 are connected respectively to pulling ropes 802A, 802B, and 802C (collectively, pulling ropes 802). More specifically, connecting rings, carabiners, or devises 804A, 804B, and 804C (collectively, connecting rings 804) may pass through the apertures 706 shown in FIG. 7, and couple the pulling eyes 700 to the pulling ropes 802. However, some implementations of this description may omit the connecting rings 804, in favor of passing an end of the pulling rope 802 through the aperture in the pulling eye 700 and fastening the end of the pulling rope 802 back on itself. The end of the pulling rope 802 may be swaged, crimped, or otherwise attached to the main body of the pulling rope 802, forming a loop that secures or captures the pulling eye 700. As shown in FIGS. 8A and 8B, the pulling ropes 802 may be linked to a common hook clip 806 for pulling through the conduit.

In the examples shown in FIGS. 8A and 8B, the different pulling ropes 802 are different lengths. These different lengths effectively stagger the different pulling eyes 700A, 700B, and 700C within the conduit, thereby reducing the risk that the pulling eyes 700 may jam within the conduit. In contrast, if the three pulling ropes 802 were the same lengths, the three pulling eyes 700 may stack one on top of the other, and if the conduit is sufficiently small in diameter, these three stacked pulling eyes 700A, 700B, and 700C may cause the assembly 800 to jam when pulled through the conduit. Regarding armored cable, the staggering of the different pulling eyes 700 allows the total diameter of the armored cable with the pulling eyes 700 affixed to the included conductors to be smaller than if the different pulling eyes 700 were stacked one on top of the other.

Turning to the pulling ropes 802 in more detail, as described above, these pulling ropes 802 may be coated or impregnated with low-friction compound to reduce friction and pulling force within the conduit during a pull. This low-friction compound may or may not be similar to the lubricant used to pre-lubricate the insulated conductors, as described above in FIG. 4 in block 402. In this manner, the pulling ropes 802 may reduce pulling tension during a given run. The pulling ropes 802 may be constructed of metallic or non-metallic materials.

FIG. 8B illustrates an additional assembly, denoted generally at 800', of pulling ropes 802A', 802B', and 802C' (collectively, pulling ropes 802') connected respectively to pulling eyes 700A, 700B, and 700C (collectively, pulling eyes 700), as attached respectively to the terminal ends of conductors 402A, 402B, and 402C (collectively, conductors 402). More specifically, the ends of the pulling ropes 802' pass through apertures in the pulling eyes 700, shown in FIG. 7, and the ends of the pulling ropes 802' are fastened back on themselves. The ends of the pulling ropes 802' may be swaged, crimped using connectors 808A, 808B, and 808C (collectively, connectors 808), or otherwise attached to the main bodies of the pulling ropes 802' to form loops 810A, 810B, and 810C (collectively, loops 810) that secure or capture the apertures of the pulling eyes 700. The lengths of the loops 810 may be the same or may be different. For example, the length of the loop 810A (as denoted by reference numeral 812A) may be one inch, the length of the loop 810B (as denoted by reference numeral 812B) may be one and a half inches, and the length of the loop 810C (as denoted by reference numeral 812C) may be two inches. Still consistent with embodiments, the length of the loops 810 may all be a similar length (e.g., one inch) as shown in FIG. 8A.

Also, the lengths of the pulling ropes 802' may be equal or different. For example, the length of the pulling rope 802A' (denoted by reference numeral 814A) may be nine inches, the length of the pulling rope 802B' (denoted by reference numeral 814B) may be seven inches, and the length of the pulling rope 802C' (denoted by reference numeral 814C) may be one inch. Still consistent with embodiments, the length of the pulling ropes 802' may all be a similar length (e.g., six inches).

Turning to the pulling ropes 802' in more detail, as shown in FIG. 8B, the pulling ropes 802' may be linked to a common hook clip, such as the common hook clip 806, for pulling through the conduit. As shown in FIG. 8B, the ends of the pulling ropes 802' pass through the common hook clip 806 and the ends of the pulling ropes 802' are fastened back on themselves. The ends of the pulling ropes 802' may be swaged, crimped using connectors 816A, 816B, and 816C (collectively, connectors 816), or otherwise attached to the bodies of the pulling ropes 802' to form loops 818A, 818B, and 818C (collectively, loops 818) that secure or capture the common hook clip 806. The lengths of the loops 818 may be different, as shown in FIG. 8B. For example, the length of the loop 818A (as denoted by reference numeral 820A) may be two inches, the length of the loop 818B (as denoted by reference numeral 820B) may be three inches, and the length of the loop 818C (as denoted by reference numeral 820C) may be five inches. Still consistent with embodiments, and as shown in FIG. 8A, the length of the loops 818 may all be a similar length (e.g., one inch).

In the examples shown in FIG. 8B, the loops 818 are different lengths. The different lengths effectively stagger the position of the connectors 816A, 816B, and 816C within the conduit, thereby reducing the risk that the connectors 816A, 816B, and 816C may jam within the conduit. In contrast, if the loops 818 were all the same length, the connectors 816A, 816B, and 816C may stack one on top of the other, and if the conduit is sufficiently small in diameter, the connectors 816 may cause the assembly 800' to jam when pulled through the conduit. Regarding armored cable, the staggering of the connectors 816 allows the total diameter of the armored cable with the pulling eyes 700 affixed to the included conductors to be smaller than if the connectors 816 were stacked one on top of the other.

Furthermore, in the examples shown in FIG. 8B, the pulling ropes 802' are different lengths as are the loops 810 and the loops 818. The different lengths of the pulling ropes 802 alone, or in conjunction with the different lengths of the loops 810 and the different length of the loops 818, effectively stagger the pulling eyes 700, the connectors 808, and the connectors 816 within the conduit, thereby reducing the risk that the assembly 800' may jam within the conduit. In contrast, if the pulling ropes 802 were all the same length, the loops 810 were all the same length, and the loops 818 were all the same length, the pulling eyes 700, the connectors 808, and/or the connectors 816 may stack one on top of the other, and if the conduit is sufficiently small in diameter, one or more of the pulling eyes 700, the connectors 808, and the connectors 816 may cause the assembly 800' to jam when pulled through the conduit. Regarding armored cable, the staggering of the different pulling eyes 700, the connectors 808, and the connectors 816 allows the total diameter of the armored cable with the pulling eyes 700 affixed to the included conductors to be smaller than if the pulling eyes 700, the connectors 808, and the connectors 816 were stacked one on top of the other.

Moreover, as described above, the pulling ropes 802' may be coated or impregnated with a low-friction compound to reduce friction and pulling forces within the conduit during a pull. In this manner, the pulling ropes 802' may reduce pulling tension during a given run. Moreover, the connectors 808 and the connectors 816 may be coated or impregnated with a low-friction compound to reduce friction and pulling forces within the conduit during a pull. The low-friction compounds may or may not be similar to the lubricant used to pre-lubricate the insulated conductors, as described above in FIG. 4 in block 402. The pulling ropes 802', the connectors 808, and the connectors 816 may be constructed of metallic or non-metallic materials.

Figure 9:
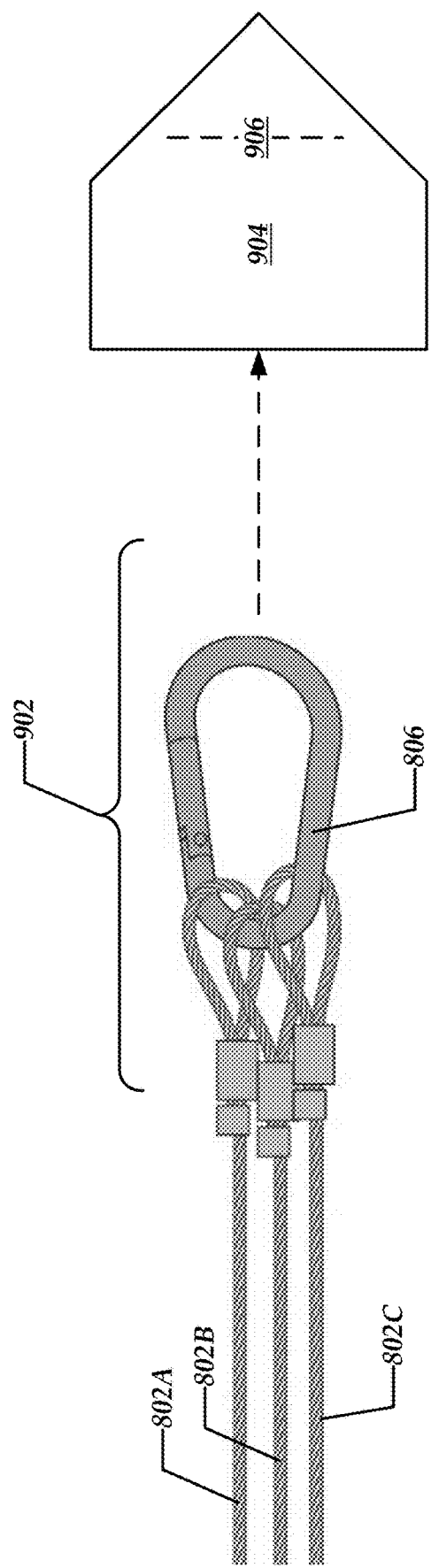
FIG. 9 is a diagram illustrating the snap hook shown in FIG. 8A, along with a protective cover that may be installed over a pulling head to reduce friction encountered by the pulling head when a given run of wire or cable is pulled through conduit.

FIG. 9 illustrates the common hook clip 806 and the pulling ropes 802A, 802B, and 802C carried forward from FIG. 8A. A pulling head 902 may include different types of the common hook clip 806 (e.g., including but not limited to the common hook clip 806 example shown in FIG. 9) for attaching to the pulling ropes 802. Other examples of the common hook clip 806 may include the various pulling eyes and devises illustrated and described herein, suitable for attaching the pulling ropes 802 to one another for pulling wires or cables through conduit. FIG. 9 illustrates a protective cover 904 that may be installed over the pulling head 902 to reduce friction encountered by the pulling head 902 when a given run of wire or cable is pulled through conduit. The protective cover 904 may define a slit or aperture 906 through which at least a portion of the common hook clip 806 may pass. In example implementations, the protective cover 904 may be constructed from a suitable polymeric material. The protective cover 904 may also contribute to reducing the force involved with drawing the pulling head 902 through the conduit.

In some implementations, the protective cover 904 may include shrinkable tubing applied over the pulling head 902, which may be constructed using any of the techniques provided herein. The shrinkable tubing may provide a low-friction jacket or covering over at least a portion of the pulling head 902. In some cases, the shrinkable tubing may shrink when heated with an external source, referred to as "heat" shrinking. In other cases, the shrinkable tubing without heating, and thus characterized as "cold" shrinkable tubing. This "cold" shrinkable tubing may allow installation personnel to apply the shrinkable tubing to the pulling head 902 without using torches or heating sources, which may simplify pulls in the field. Examples of shrinkable tubing, whether characterized as "cold" or otherwise, are available commercially from a variety of vendors.

Figure 10:
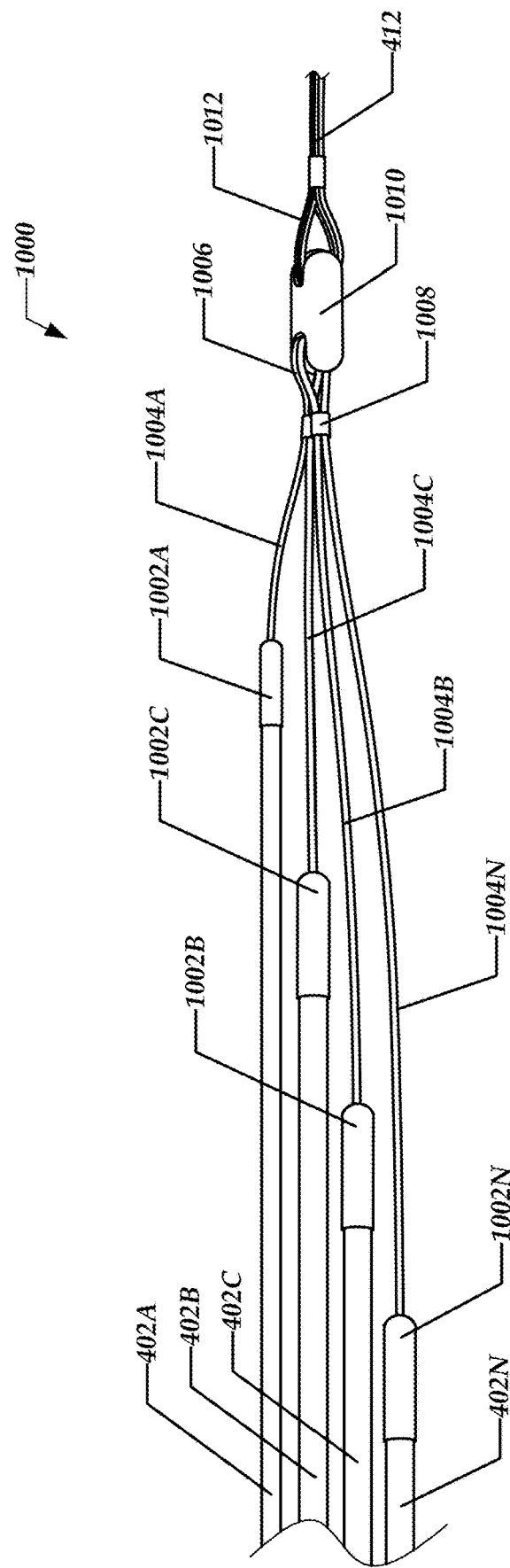
FIG. 10 is a diagram illustrating an alternative construction of an assembled pulling head assembly.

FIG. 10 illustrates alternative constructions of assembled pulling head assemblies, denoted generally at 1000. FIG. 10 carries forward examples of insulated conductors, denoted respectively at 402A, 402B, 402C, and 402N. However, it is noted that implementations of this description may include pulling head assemblies that incorporate any convenient number of individual insulated conductors 402. In further embodiments, the wires 402A, 402B, 402C, and 402N may be included within an armor of an armored cable.

Turning to the pulling head assemblies 1000 in more detail, respective pulling eyes 1002A-1002N (collectively, pulling eyes 1002) are shown affixed to corresponding insulated conductors 402A-402N. It is noted that the pulling eyes 1002 as shown in FIG. 10 provide alternatives to the pulling eyes 700 shown in FIGS. 7 and 8. The pulling eyes 1002 are shown in more detail in FIG. 11 and discussed further below. In overview, however, the pulling eyes 1002 serve to attach the insulated conductors 402 to respective pulling cables 1004A-1004N (collectively, pulling cables 1004). The pulling cables 1004 may be constructed of any suitable metallic or nonmetallic material, and may be coated or impregnated with friction-reducing compounds, as discussed in more detail above. Without limiting possible implementations, the pulling cables 1004 may also represent pulling ropes, pulling members, strength members, or the like.

The individual pulling cables 1004 may include loops, referenced collectively at 1006, which may be formed by suitable crimps, swages, or other attachment means (denoted collectively at 1008). In turn, any number of the pulling cables 1004 may be connected to a clevis 1010. The clevis 1010 may facilitate attachment of the pulling cables 1004 to the specialized pulling rope 412. The specialized pulling rope 412 may include a loop 1012 facilitating attachment to the clevis 1010. The clevis 1010 may be constructed of any suitable metallic or nonmetallic materials, chosen as appropriate for the loads anticipated to be borne by the clevis 1010 during pulls of the completed head assembly through conduit. In addition, implementations of the clevis 1010 may be dimensioned and shaped differently from the examples shown in FIG. 10, without departing from the scope and spirit of the present description.

In different possible implementations, a given pulling cable, such as one of the pulling cables 1004A-1004N (collectively pulling cables 1004) may be attached to one or two of the pulling eyes 1002A-1002N (collectively the pulling eyes 1002). For example, the pulling cables 1004B and 1004N may be the same pulling cable, with one end attached to the pulling eye 1002B and the other end attached to the pulling eye 1002N. FIGS. 8A and 8B, described previously, illustrate examples in which the pulling ropes 802A-802C and the pulling ropes 802A'-802C', respectively, are attached to respective single pulling eyes 700A-700C. However, the examples shown in FIG. 10 may reduce the number of loops 1006 passing through the clevis 1010, by attaching two pulling eyes 1002 to a given pulling cable 1004. Similar to the loops 818 set forth in FIG. 8B, the loops 1006 may have different lengths so as to stagger the attachment means 1008. Finally, the clevis 1010 may be attached to a loop 1012 formed within the specialized pulling rope 412 (carried forward for convenience from FIG. 4).

Figure 11:
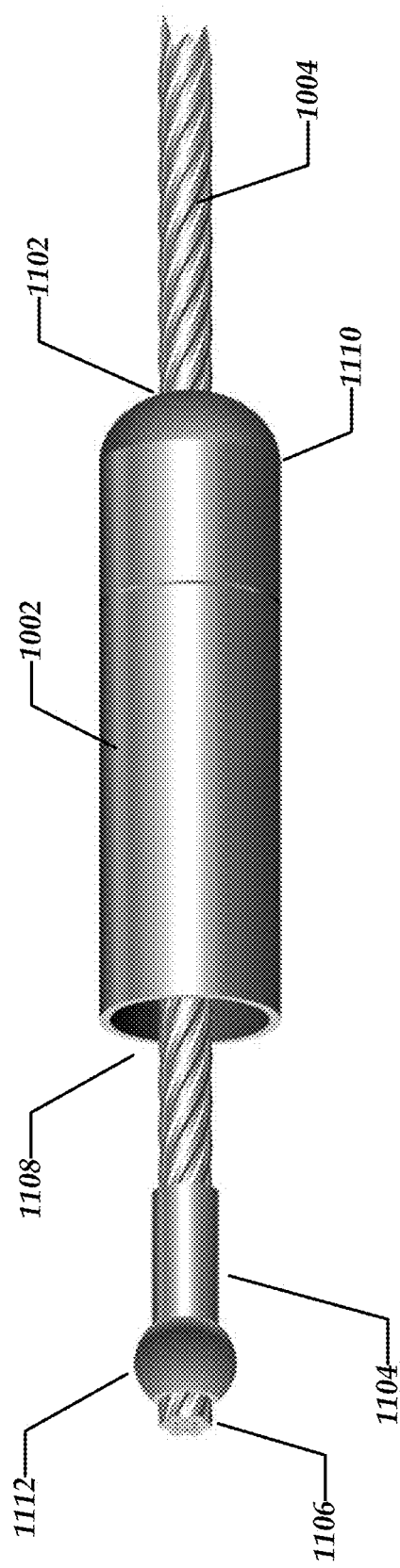
FIG. 11 is a diagram illustrating a pulling eye and pulling cable in more detail.

FIG. 11 illustrates the pulling eyes 1002 and the pulling cables 1004 in more detail. More specifically, FIG. 11 illustrates how the pulling cable 1004 may pass through an aperture 1102 defined by the pulling eye 1002, with a member 1104 crimped or otherwise attached onto an end 1106 of the pulling cable 1004. As shown in FIG. 11, the pulling eye 1002 may define an interior cylindrical cavity 1108. After the member 1104 is crimped onto the pulling cable 1004, the pulling eye 1002 may be slid over the member 1104 until the member 1104 contacts a front interior portion 1110 of the pulling eye 1002.

In the examples shown in FIG. 11, the member 1104 may include an enlarged ball-shaped portion 1112 having a general dimension larger than the aperture 1102, sufficient to retain the member 1104 within the cylindrical cavity 1108. However, it is noted that the shape and dimensions of the member 1104 and the cylindrical cavity 1108 may vary in different implementations of this description. Accordingly, it is recognized that the examples shown in FIG. 11 are provided only to facilitate the present description, and other mechanisms for retaining the member 1104 within the cylindrical cavity 1108 may be suitable in different implementation environments.

Although not shown in FIG. 11, a portion of the insulated conductors 402 may be stripped to expose some length of the bare metal cable or wire (e.g., 504A-504N as shown in FIG. 5) within the insulated conductors 402. In turn, the stripped or exposed length of bare metal wire may pass into the cylindrical cavity 1108. Afterwards, the pulling eye 1102 may be crimped or otherwise attached to the bare metal wire 504. In this manner, the pulling cables 1004 may be securely fastened to the bare metal cables or wires 504, using the pulling eyes 1102.

Figure 12:
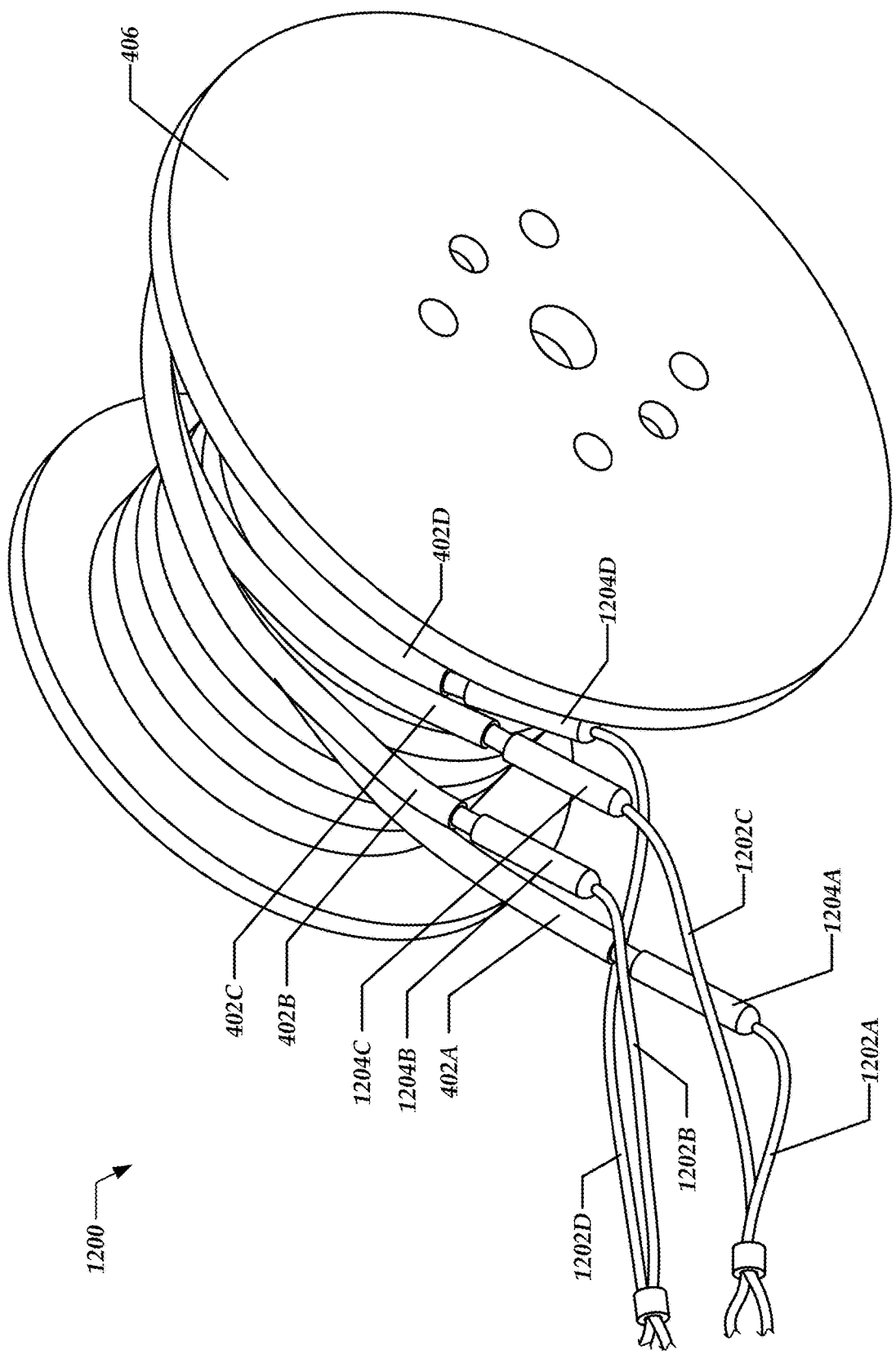
FIG. 12 is a diagram illustrating examples of a reel that is loaded with a plurality of conductors having insulation with different colors.

FIG. 12 illustrates examples, denoted generally at 1200, of a reel (e.g., 406 in previous description) that is loaded with a plurality of conductors (e.g., 402A-402D) having insulation with different colors. In the example shown, the phase conductors 402A-402C may have brown, orange, and yellow insulation, to signify different phases in a given three-phase installation. In addition, a ground conductor 402D may have green insulation, or may have insulation of another suitable color to indicate ground. In general, the colors of the particular conductors involved in a given pull may be specified by applicable electrical codes, local usages or conventions, or other factors. Accordingly, the examples presented herein are understood as illustrative, but do not limit possible implementations of this description.

In the examples shown in FIG. 12, the individual brown, orange, yellow, and green conductors are wound onto a single reel. In turn, this single reel may be delivered to a given jobsite, and all four of the conductors may be pulled from the single reel. At the jobsite, installation personnel may pull all four conductors from the single reel. In contrast, previous techniques may involve delivering four different reels to the jobsite, with each of the four reels containing a different colored conductor. At the jobsite, installation personnel would pull a single conductor simultaneously from the four different reels. However, it is understood from this description that pulling from a single reel is more convenient than pulling from four different reels simultaneously.

In some implementations, the reels 406 may be loaded with the multiple conductors 402 at a facility, where the conductors 402 themselves are manufactured. In other implementations, a warehouse or distribution facility may load the multiple conductors 402 onto the single reels 406. In general, multiple differently-colored conductors 402 may be loaded in combination onto single reels 406 before delivering the single reels 406 to jobsites, thereby relieving jobsite personnel from pulling from multiple reels 406 simultaneously.

As also shown in FIG. 12, pulling eyes 1204A-1204D (collectively, pulling eyes 1204) may be fastened onto the ends of the differently-colored conductors 402A-402D and further attached to suitable pulling ropes or cables 1202A-1202D. In general, the pulling eyes 1204 secure the pulling ropes or cables 1202A-1202D to the ends of the conductors 402. As described above, the end of each conductor 402 may be stripped as appropriate to expose the bare metallic cable or wire, with the pulling eyes 1204 crimped or otherwise fastened directly onto the wire.

Figure 13A:
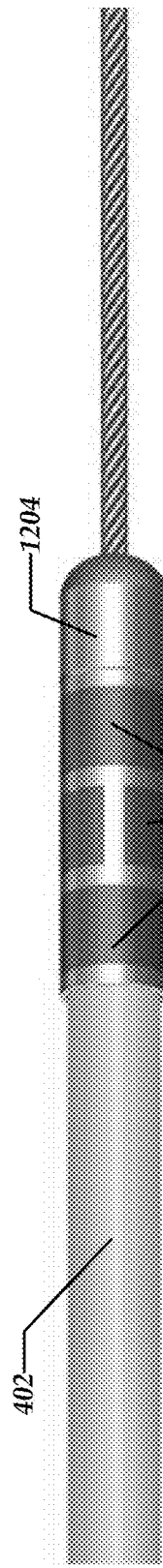
FIGS. 13A-13C are diagrams illustrating details of an illustrative crimp.
Figure 13B:
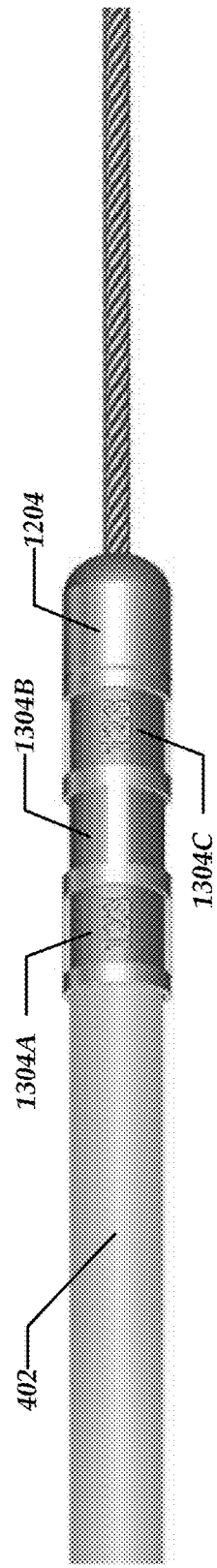
Figure 13C:
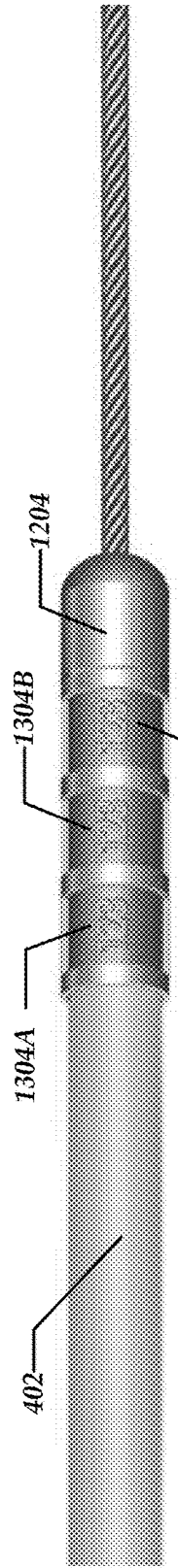

FIGS. 13A-13C illustrate aspects of the crimping of the pulling eyes 1204 to the conductors 402. More specifically, FIG. 13A shows the pulling eye 1204 before the compression sleeve is crimped. The pulling eye 1204 may include areas 1302, represented in darker tone in FIG. 13A, that indicate where the compression sleeve may be crimped. In implementations of this description, the areas 1302 may be colored, knurled, or otherwise visually distinguished from the rest of the pulling eye 1204. The areas 1302 may indicate to personnel where to align dies or other crimping tools when compressing the sleeve.

FIG. 13B illustrates three successive crimps at 1304A, 1304B, and 1304C (collectively, crimps 1304). Any suitable crimping tool, as appropriate in different implementations, may form the crimps 1304 in a compression sleeve provided by the pulling eye 1204. Comparing the crimps 1304A and 1304C with the crimps 1304B, it is noted that implementations of this description may rotate adjacent crimps 1304 relative to one another by approximately 90°. Rotating the crimps 1304 in this manner may promote a more secure overall attachment between the pulling eyes 1204 and the bare cable or wire of the conductor 402. FIG. 13C shows an example of the successive crimps 1304 in approximately the same rotational alignment. It is noted that implementations of the description may employ any number of crimps along the compression sleeve of the pulling eyes 1204, with the three crimps shown herein only for example.

The sleeves provided by the pulling eyes 1204 may be compressed using suitable dies. In some implementations, multiple crimps may be formed simultaneously with multiple dies. In other implementations, multiple crimps may be formed in sequence with a single die. The foregoing examples may apply, whether the multiple crimps share a similar rotational alignment, or whether the multiple crimps are rotated relative to one another. As further shown in FIGS. 13B and 13C, the pulling eyes 1204 may bear indicia or marking indicating a number of die used to create the crimps. The labels "123" shown in FIG. 13B and 13C provide examples of such die markings.

Figure 14:
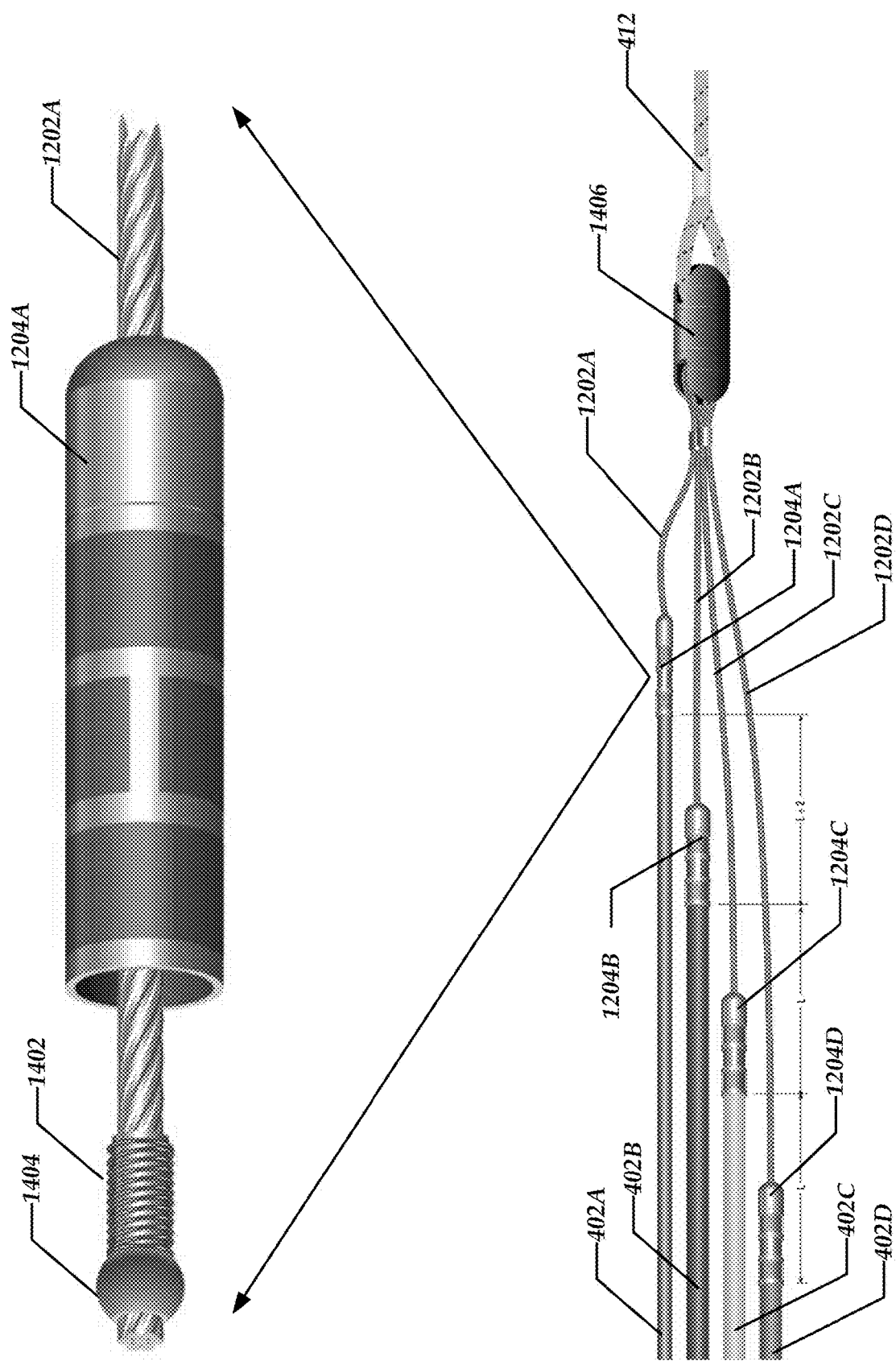
FIG. 14 is a diagram illustrating examples of differently-colored conductors that are crimped onto pulling ropes or cables.

FIG. 14 illustrates the four differently-colored conductors 402A-402D that are crimped onto pulling ropes or cables 1202A-1202D, carried forward from FIG. 12. FIG. 14 also carries forward pulling eyes 1204A-1204D, which fasten the pulling cables 1202A-1202D onto the ends of the conductors 402A-402D.

In the example shown in FIG. 14, the conductor 402A may represent a ground conductor and the conductors 402B-

402D may represent current-carrying phase conductors. The ground conductor 402A may be smaller in gauge or size than the three current-carrying phase conductors 402B-402D. However, problems may arise when pulling the entire bundle of conductors 402A-402D through a conduit, if the smaller ground conductor 402A bears a disproportionate share of the pulling tension, as compared to the other larger phase conductors 402B-402D. However, this description provides several approaches for reducing the risk that the smaller ground conductor 402A may be damaged by excessive pulling tension.

The upper portion of FIG. 14 provides an expanded view of the pulling eye 1204A that attaches the smaller ground conductor 402A to the pulling cable 1202A. As shown, one end of a spring or other resilient member 1402 may engage an enlarged portion of a stop 1404 that is fastened onto the end of the pulling cable 1202A. When the pulling eye 1204A is slid over the stop 1404 and the spring 1402, an opposite end of the spring 1402 engages the front interior of the pulling eye 1204A.

Once the pulling eye 1204A is fastened onto the end of the smaller ground conductor 402A, the spring 1402 may serve as a dampening member between the pulling cable 1202A and the smaller ground conductor 402A. When the smaller ground conductor 402A is pulled through a conduit, along with the other larger conductors 402B-402D, the spring 1402 may dampen any excessive tension experienced by the smaller ground conductor 402A during the pull, thereby protecting the smaller ground conductor 402A from damage resulting from such excessive tension.

Referring to the lower portion of FIG. 14, this description provides other approaches for reducing the risk that the smaller ground conductor 402A may experience damage from excessive tension during pulls. The conductors 402A-402D may be positioned relative to one another in a pulling head, such that some of the pulling cables 1202A-1202D are relatively loose or slack, while at least one of these pulling cables 1202A-1202D is tight. In the example shown in FIG. 14, the pulling cable 1202B is tight, while the pulling cables 1202A, 1202C, and 1202D are loose. Accordingly, the tight pulling cable 1202B would initially experience the bulk of the pulling tension, while the looser pulling cables 1202A, 1202C, and 1202D would experience less pulling tension. The tension would eventually spread out among all conductors during the pulling process. The smaller ground conductor 402A is shown fastened to one of the loose pulling cables 1202A. Typically, the ground conductor 402A is smaller or downsized relative to the current-carrying conductors. Accordingly, maintaining some degree of looseness in the pulling rope 1202A as shown in FIG. 14 may reduce the pulling strain borne by the ground conductor 402A.

In other approaches, the ends of the conductors 402A-402D may be aligned relative to one another to reduce the risk that the smaller ground conductor 402A may experience damage from excessive tension during pulls. As shown in FIG. 14, the ends of the conductors 402D and 402C may be separated by the distance "L", and the ends of the conductors 402C and 402B are also separated by approximately that distance "L". However, the ends of the larger conductor 402B and the smaller ground conductor 402A may be separated by a distance smaller or larger than that distance "L". FIG. 14 provides an example in which the distance between the ends of the larger conductor 402B and the smaller ground conductor 402A is separated by approximately half of that distance "L". However, other implementations may separate the ends of these two conductors by approximately twice that distance "L".

FIG. 14 also illustrates additional examples of a clevis, denoted generally at 1406. As shown, the clevis 1406 may include rounded portions mounted within the ends of the clevis, for receiving and engaging loops formed by the pulling cables 1202A-1202D and the specialized pulling rope 412 (carried forward from FIG. 4). In some implementations of this description, the clevis 1406 may include two or more different segments that rotate or swivel relative to one another. Thus, the clevis 1406 may be characterized as a "swivel" or "swiveling" clevis. For example, during a given pull, the pulling cables 1202A-1202D and/or the specialized pulling rope 412 may twist axially, experiencing forces as the pull proceeds. However, the swiveling devises 1406 may serve to isolate the pulling cables 1202A-1202D and the specialized pulling rope 412 from each other, allowing, for example, the pulling cables to twist axially relative to the specialized pulling rope 412, without also exposing the specialized pulling rope 412 to those same twisting forces.

Figure 15:
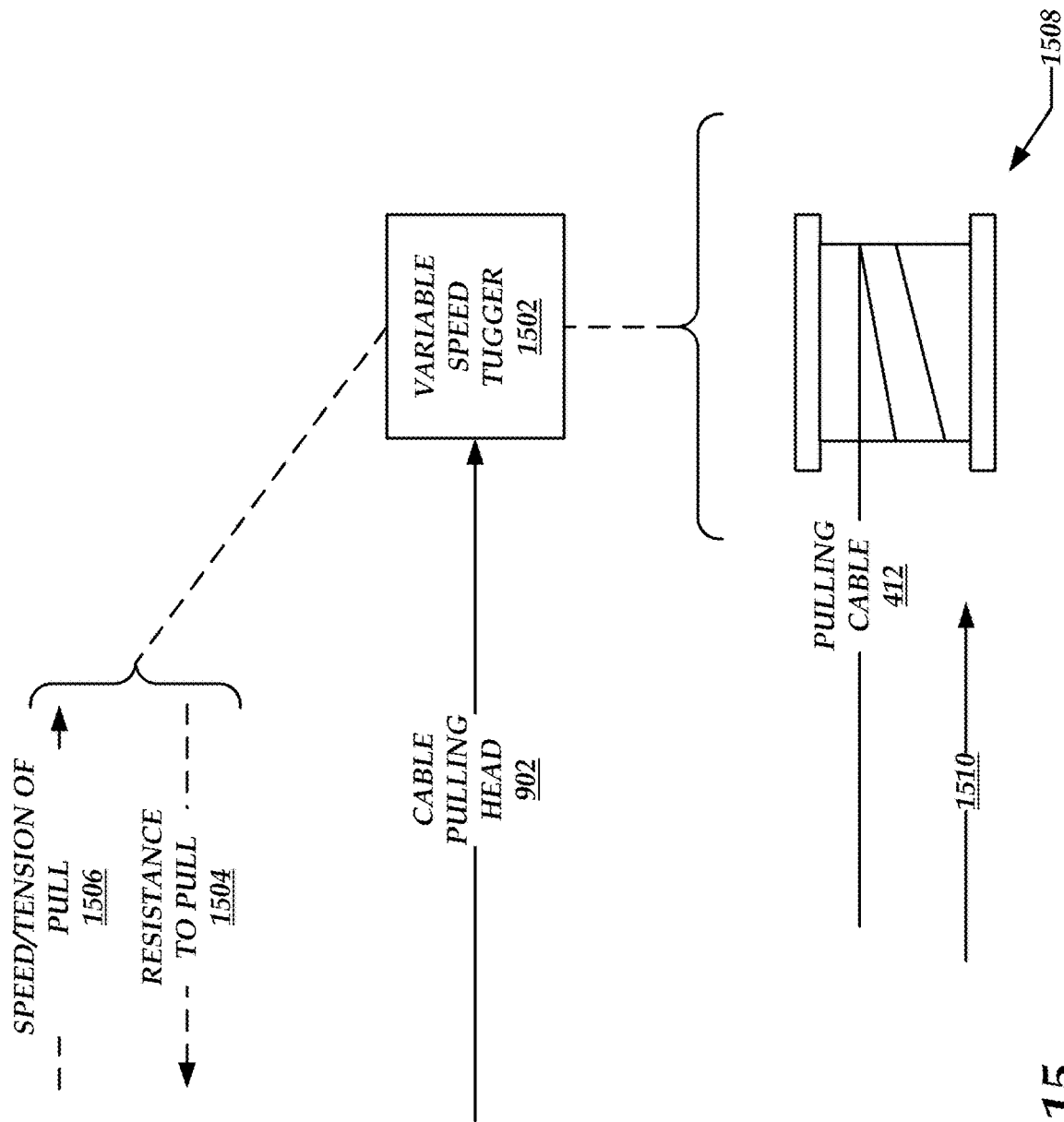
FIG. 15 is a block diagram illustrating a variable speed tugger as provided by some implementations of the integrated systems for wire and cable installations.

FIG. 15 illustrates aspects of a variable speed tugger 1502 that some implementations of the integrated systems for wire and cable installations may provide. FIG. 15 also carries forward a representative cable pulling head at 902, although the pulling heads shown in any of the Figures herein may be suitable for operation with the variable speed tugger 1502 as well.

Turning to the variable speed tugger 1502 in more detail, the variable speed tugger 1502 may include circuitry or software adapted to sense resistance to an ongoing pull, represented generally by a vector 1504. This resistance may be attributable to friction and other forces within the conduit between the conductors being pulled, the pulling heads, and/or the involved pulling ropes. Other factors that may contribute to this resistance include elastic bending governed by bending stiffness proportional to Young's modulus, inelastic bending governed by yield stress, surface deformation governed by hardness and scratch resistance. The Young's modulus, yield stress, hardness, and scratch resistance are physical properties that can each be affected by the cable's sheath composition, including the amount of lubricant. The pulling force during installation may also include a time varying, oscillating component. This oscillating component occurs when there is slack in portions of the cable and is affected by, for example, the difference between the static coefficient of friction and the kinetic coefficient of friction. The oscillating component can also arise when cables jam while being pulled through angles, as is typical during installation. Cable jamming arises specifically when the cable cross-section changes shape during bending. In fact, for installations with severe angles, the coefficient of friction may not contribute appreciably to the pulling force.

In some cases, resistance may increase when the pulling heads reach a bend or sweep within the conduit, and then decrease after the pulling heads pass through this bend or sweep. In addition, this resistance may be attributable to obstructions or damage occurring within the conduit (e.g., burrs, foreign matter, physical damage, or the like). As this resistance increases, the tension on the pulling ropes also typically increases. In this scenario, the variable speed tugger 1502 may reduce the speed of the pull, thereby reducing the tension on the pulling ropes. In this manner, the variable speed tugger 1502 may reduce the risk of exposing the pulling ropes to excessive tension, and/or damaging the pulling heads.

As a given pull proceeds, resistance to the pull may decrease or remain at a relatively low level. FIG. 15 generally represents at 1506 a speed or tension of the pull at a given time. As this tension stays relatively low or decreases, the variable speed tugger 1502 may increase the speed of the pull, at least until some maximum limit is reached. In this manner, so long as resistance remains relatively low, the tugger 1502 may increase the speed of the pull and reduce the overall time and expense involved with the pull.

In previous techniques for pulling wires into conduit, lubricant is typically applied to the wires while they are pulled into and through the conduit. Hence, in these previous techniques, the speed with which the pull can be conducted may be limited by how quickly the lubricant can be applied to the wires. Stated in different terms, lacing the lubricant on the wires during the pull may be a performance bottleneck. However, the various reduced installation force techniques and components provided as part of the integrated systems 110 may contribute to eliminating the performance bottleneck, allowing the overall pull to be conducted more quickly. Accordingly, the variable speed tugger 1502 may take advantage of the performance potential offered by the integrated systems 110 by increasing the pull speed as appropriate in certain circumstances.

The tugger 1502 may include appropriate mechanical components, such as an electric drive motor (not shown), which may drive a rotating circular drum 1508. Only for example, FIG. 15 carries forward the specialized pulling rope 412 from FIG. 4. The specialized pulling rope 412 may be attached to the cable pulling head 902, with the specialized pulling rope 412 secured to and wrapped around the rotating drum 1508. When the drum 1508 rotates, the specialized pulling rope 412 may be wound onto the drum 1508 in the direction indicated by the arrow 1510, thereby drawing the cable pulling head 902 through a given run of conduit.

Considered as a whole, the tugger 1502 may have weight sufficient to resist pulling forces likely to be encountered when pulling the head 902 through a given run of conduit. Accordingly, the tugger 1502 may provide a mass that is relatively immovable, as compared to the forces encountered in a given pull. It is further noted that various tuggers 1502 having different pulling capacities may be appropriate in different pulls, depending upon the pulling forces expected to be encountered during those pulls.

Figure 16:
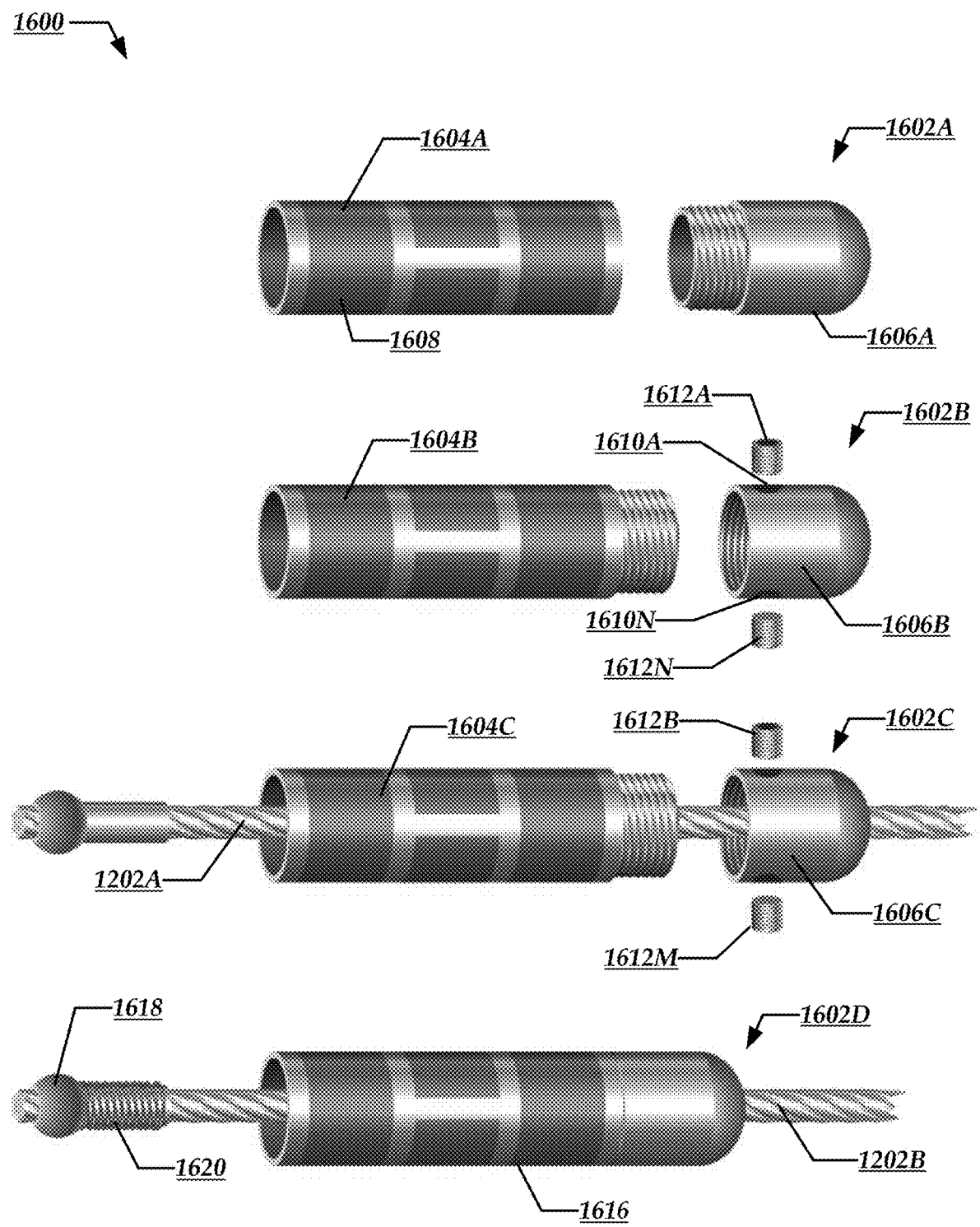
FIG. 16 is a diagram illustrating examples of threaded pulling eyes.

FIG. 16 illustrates additional examples, denoted generally at 1600, of pulling eyes suitable for operation with the integrated systems for wire and cable installations. More specifically, FIG. 16 illustrates examples of pulling eyes, denoted at 1602A, in which a cylindrical sleeve or barrel portion 1604A is threaded to receive a head portion 1606A. Put differently, the sleeve or barrel portion 1604A may be threaded to match corresponding threads on the head portion 1606A. As indicated at 1608, the sleeve or barrel portion 1604A may be marked as appropriate to indicate where to place a crimping tool, when fastening the pulling eye 1602A onto the end of a conductor.

FIG. 16 illustrates other examples of pulling eyes, denoted generally at 1602B, in which a head portion 1606B is threaded to receive a cylindrical sleeve or barrel portion 1604B. In addition, the head portion 1606B may define any number of apertures 1610A and 1610N (collectively, apertures 1610). These apertures 1610 may receive set screws or other suitable fasteners 1612A and 1612N (collectively, fasteners 1612), configured to secure the head portion 1606B to the sleeve or barrel portion 1604B. In example shown in FIG. 16 at 1602B, the fasteners 1612 may engage a threaded portion of the apertures 1610 when the pulling eye 1602B is assembled, thereby locking the head portion 1606B relative to the cylindrical sleeve or barrel portion 1604B.

As shown generally at 1602C, the pulling eyes may be assembled onto a given pulling cable or rope, as carried forward from FIG. 12 at 1202A. First, the pulling cable 1202A is passed through the interior of a cylindrical sleeve or barrel portion 1604C (which represents either the barrel portions 1604A or 1604B), and through the interior of a head portion 1606C (which represents either the head portions 1606A or 1606B). Afterwards, the head portion 1606C and the sleeve/barrel portion 1604C are threaded together. Finally, fasteners 1612B and 1612M may be threaded through the head portion 1606C, to engage the sleeve/barrel portion 1604C.

FIG. 16 illustrates at 1602D an assembled pulling eye 1616 as installed onto a pulling rope or cable 1202B. In general, the assembled pulling eye at 1616 may represent any of the configurations illustrated at 1602A, 1602B, or 1602C. As described in previous drawings, a stop 1618 may be fastened onto the end of the pulling cable 1202B. In addition, one end of a spring or other resilient member 1620 may engage the stop 1618, and another end of the spring 1620 may engage the interior of the front of the assembled pulling eye 1616. Typically, the head portions 1606A-1606C (collectively, head portions 1606) may be captured onto the pulling cables 1202 during manufacture, when the stop 1618 is fastened to the end of the pulling cable 1202. As described in further detail below, the pulling cable 1202 and the head portions 1606 may be reusable over any number of individual pulls, while the sleeves or barrel portions 1604 may be replaced for different pulls, with new sleeves or barrel portions 1604 attached to the head portions 1606 for each pull.

Once one or more given conductors are pulled through a conduit, the assembled pulling eye 1616 may be disassembled as follows. First, if the assembled pulling eye 1616 includes fasteners (e.g., 1612A-1612M, collectively fasteners 1612), these fasteners 1612 may be loosened, allowing the head portions 1606 to unthread relative to the sleeve or barrel portions 1604. Otherwise, the head portions 1606 may be unscrewed directly from the sleeve or barrel portions 1604. Once the head portions 1606 and the sleeve or barrel portions 1604 are completely disengaged from one another, the pulling cables 1202B and head portions 1606 may be separated from the conductor as pulled through the conduit, and reused in future conduit runs.

Referring to the head portions 1606, these head portions may be connected to any number of different sleeve or barrel portions 1604. More specifically, different sleeve or barrel portions 1604 may be sized as appropriate to receive conductors of different sizes or gauges. Thus, the different sleeve or barrel portions 1604 may have different physical dimensions (e.g., inside diameters, outside diameters, lengths, thickness, compositions, etc.). However, these different sleeve or barrel portions 1604 may neck down or up as appropriate to couple to common-sized head portions 1606. Thus, the head portions 1606 may be used to pull a variety of differently sized conductors through conduit, by connecting to differently sized sleeve or barrel portions 1604.

In light of the foregoing description, the physical connection interface between the head portions 1606 and the differently sized sleeve or barrel portions 1604 may be standardized. For example, the sleeve or barrel portions 1604 and the head portions 1606 may be joined by mating threaded members. However, the examples shown in FIG.

16 are provided only to facilitate the present description, and implementations of this description may employ other standardization techniques without departing from the scope and spirit of this description.

Having described the examples of the head portions 1606 and sleeves 1604 in FIG. 16, several observations are noted. Although FIG. 16 illustrates threaded head portions and sleeves, implementations of this description may also include smooth or non-threaded head portions and sleeves, which slide together into engagement. Examples of such smooth head portions and sleeves are described in more detail below in FIG. 20. In addition, implementations of the fasteners 1612 may include pins that slide into the apertures 1610 in the head portion 1606 and into corresponding apertures defined in the sleeves 1604. When the head portion 1606 and the sleeve 1604 are engaged with one another, their corresponding apertures may align, to receive the pin. It is further noted that either the head portion 1606 or the sleeve 1604 may serve as a male portion in this engagement relationship shown in FIG. 16.

Figure 17A:
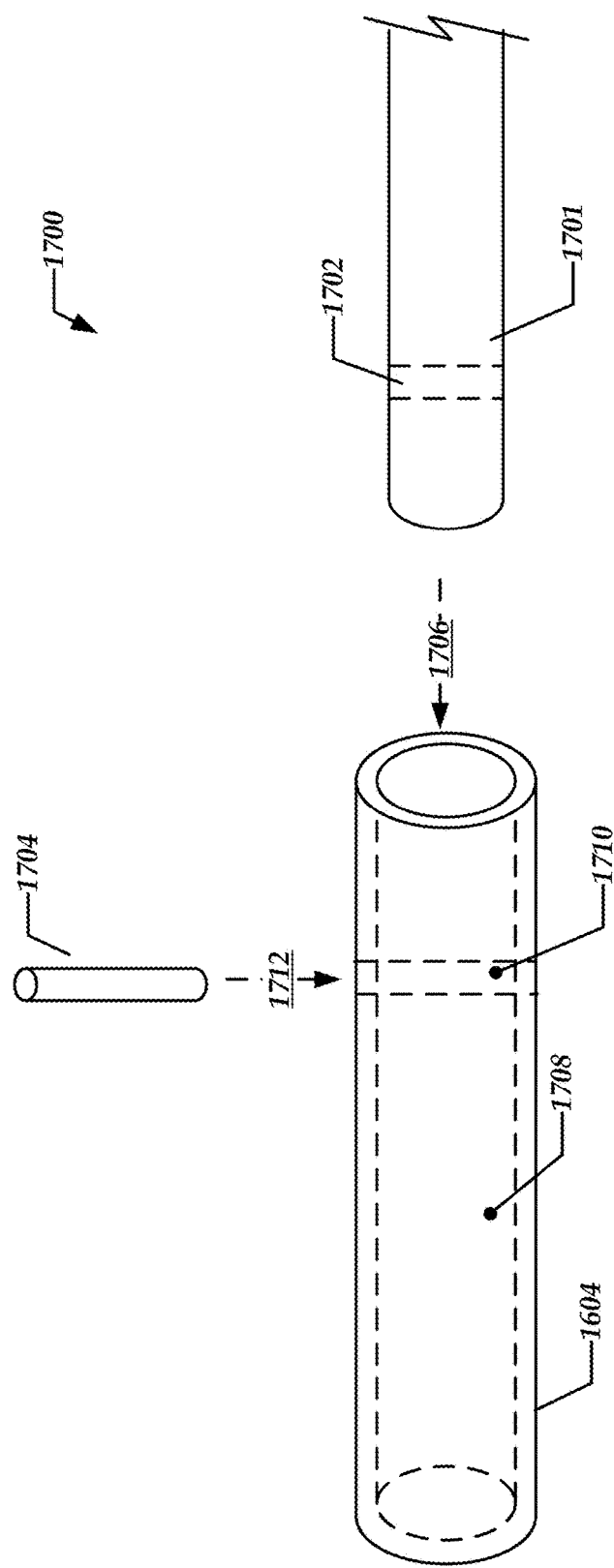
FIGS. 17A and 17B are diagrams illustrating examples of other embodiments of pulling eyes.

FIG. 17A illustrates an example of a non-threaded pulling eye, denoted generally at 1700. As shown in FIG. 17A, a representative head portion 1701 may define a passageway 1702, sized as appropriate to receive a pin 1704. As understood from FIG. 17A, the head portion 1701 provides additional examples of the head portions 1606 shown in FIG. 16. Further, implementations of this description may include head portions 1701 and 1606 having different configurations without departing from the scope and spirit of the present description. According to further embodiments, the head portion 1701 is associated with a pulling rope or cable such as the pulling rope or cable 1202A-1202D of FIG. 12.

As indicated at 1706, the head portion 1701 may slide into a representative sleeve or barrel portion 1604, carried forward from FIG. 16. More specifically, the sleeve or barrel portion 1604 may be cylindrical in general configuration, defining an interior passageway 1708. The interior passageway 1708 may be sized to receive the end of the head portion 1701.

In the example shown in FIG. 17A, the sleeve or barrel portion 1604 may define a passageway 1710, having an axis that is generally perpendicular to an axis of the interior passageway 1708. When the head portion 1701 is slid sufficiently far into the barrel portion 1604, the passageway 1702 aligns with the passageway 1710. In turn, this alignment may allow the pin 1704 to slide into both passageways, as indicated at 1712, and secure the pulling rope or cable 1202 to the barrel portion 1604.

The physical dimensions of the pin 1704 may vary in different implementations. For example, the non-threaded pulling eyes 1700 may rely on a friction fit between the pin 1704 and the sleeve 1604 and/or the head portion 1701 to secure the pin 1704 in place. In other cases, the pin 1704 may be secured in engagement with the sleeve or barrel portion 1604 and/or the head portion 1701 by separate fastening means (e.g., nuts, cotter pins, etc.).

As described above, the sleeve or barrel portion 1604 may be crimped onto the end of a given conductor for pulling through conduit. In some cases, a given assembled non-threaded pulling eye 1700 may be assembled into pulling heads that include one or more other assembled pulling eyes. These other pulling eyes in the pulling head may or may not be of the same type as the pulling eyes 1700.

Once the head portion 1701 is secured to the barrel portion 1604, the pull may proceed. After the pull is complete, the non-threaded pulling eyes 1700 may be disassembled by reversing the assembly process described above. Afterwards, the crimped sleeve or barrel portion 1604 may be discarded or recycled. However, the head portion 1701 may be used repeatedly for other pulls, after assembly with another sleeve or barrel portion 1604.

FIG. 17A illustrates an example in which the head portion 1701 is a male portion that slides into a corresponding female portion provided by the sleeve or barrel portion 1604. However, it is noted that implementations of this description may also include the head portion 1701 serving as a female portion, which receives the barrel portion 1604 as a male portion.

Figure 17B:
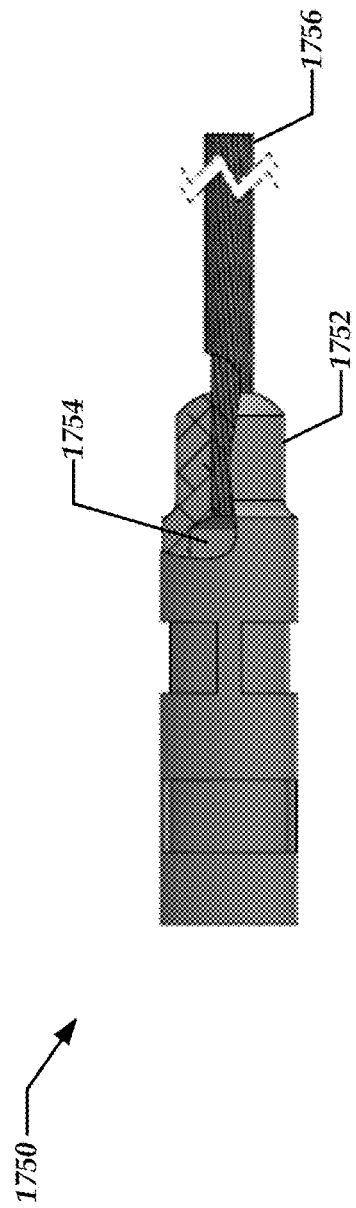

FIG. 17B illustrates additional embodiments of a pulling eye 1750 defining an interior passageway 1754 that has a diameter smaller than that of a stop, such as the stop 1618 of FIG. 16, of a pulling rope or cable, such as the pulling rope or cable 1202A of FIG. 16. According to exemplary embodiments, in order to secure the pulling eye 1750 to a pulling rope or cable 1756, the pulling rope or cable 1756 is inserted into the interior passageway 1754 of the pulling eye 1750, and a head portion 1752 of the pulling eye 1750 is crimped, swaged, or otherwise secured to the pulling rope or cable 1756. The crimp strength may be sufficient to withstand the tension that the pulling eye 1750 is expected to encounter while being pulled into a conduit. Crimping of the head portion 1752 to the pulling rope or cable 1756 allows for pulling rope or cable to be solidly connected to the pulling eye 1750 without using other materials, such as stops, shims, etc., to wedge the pulling rope or cable 1756 into the interior passageway 1754.

Figure 18B:
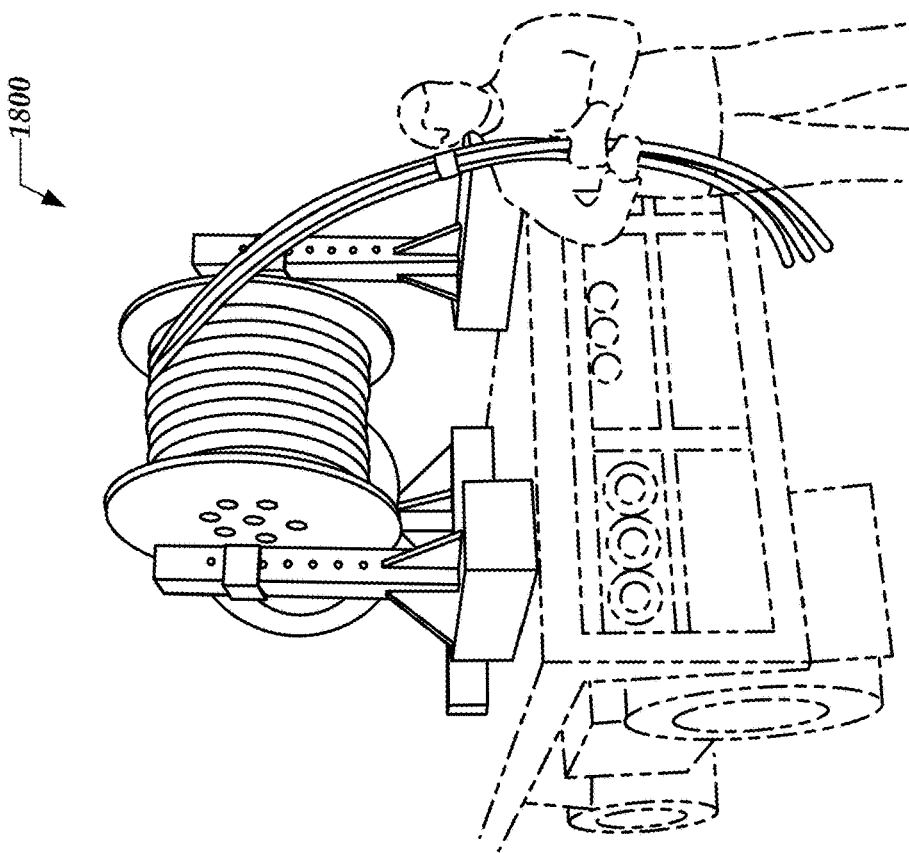
FIGS. 18A and 18B are diagrams illustrating examples of pay-off systems configured for delivery to job sites.
Figure 18A:
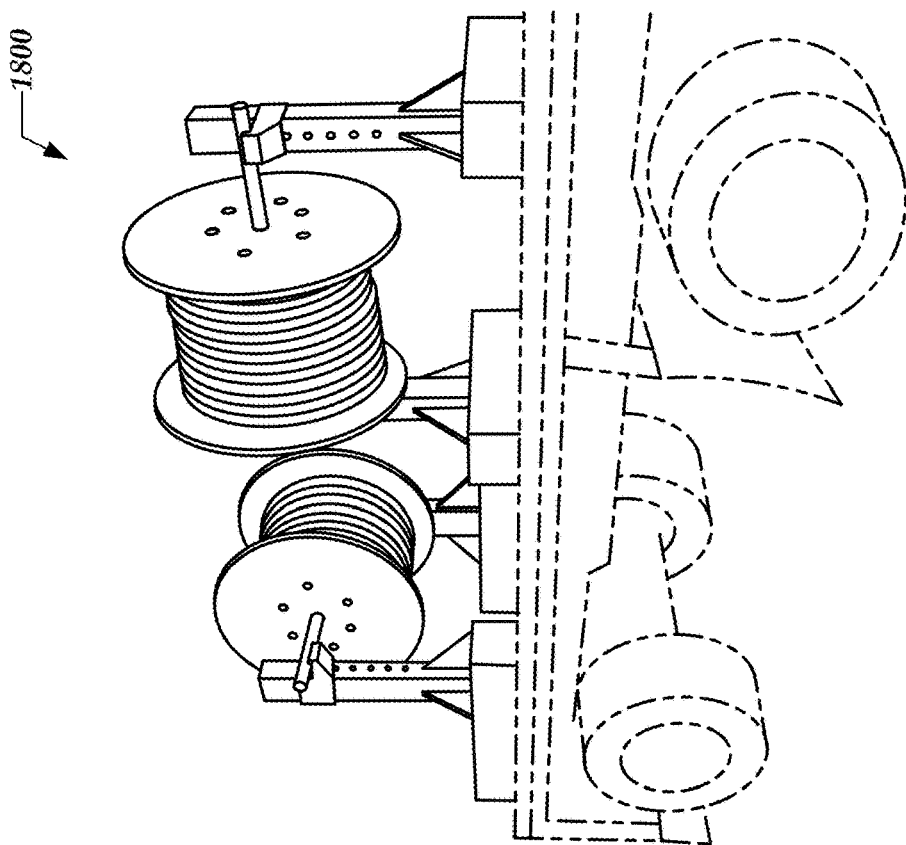

FIGS. 18A and 18B illustrate examples, denoted generally at 1800, of pay-off systems configured for delivery to job sites. More specifically, FIGS. 18A and 18B illustrate example implementations of the payoff systems as represented in block form at 408 in FIG. 4, and as represented at 600 in FIG. 6. As shown in the figures, a given reel that is loaded with one or more appropriate conductors may loaded into a given payoff system. In turn, that payoff system may be transported to a jobsite, with one or more other loaded and configured payoff systems. For example, a given job site may be scheduled for one or more different pulls through different conduit systems, and a different payoff system may be configured for each of the different pulls.

FIGS. 18A and 18B illustrate transporting the loaded payoff systems to the jobsite using a flatbed trailer. At the jobsite, the conductors may be pulled from the payoff systems while the payoff systems remain loaded on the trailer. However, in other scenarios, the payoff systems may be unloaded from the trailer and relocated where convenient on the jobsite before the conductors are pulled.

Figure 19:
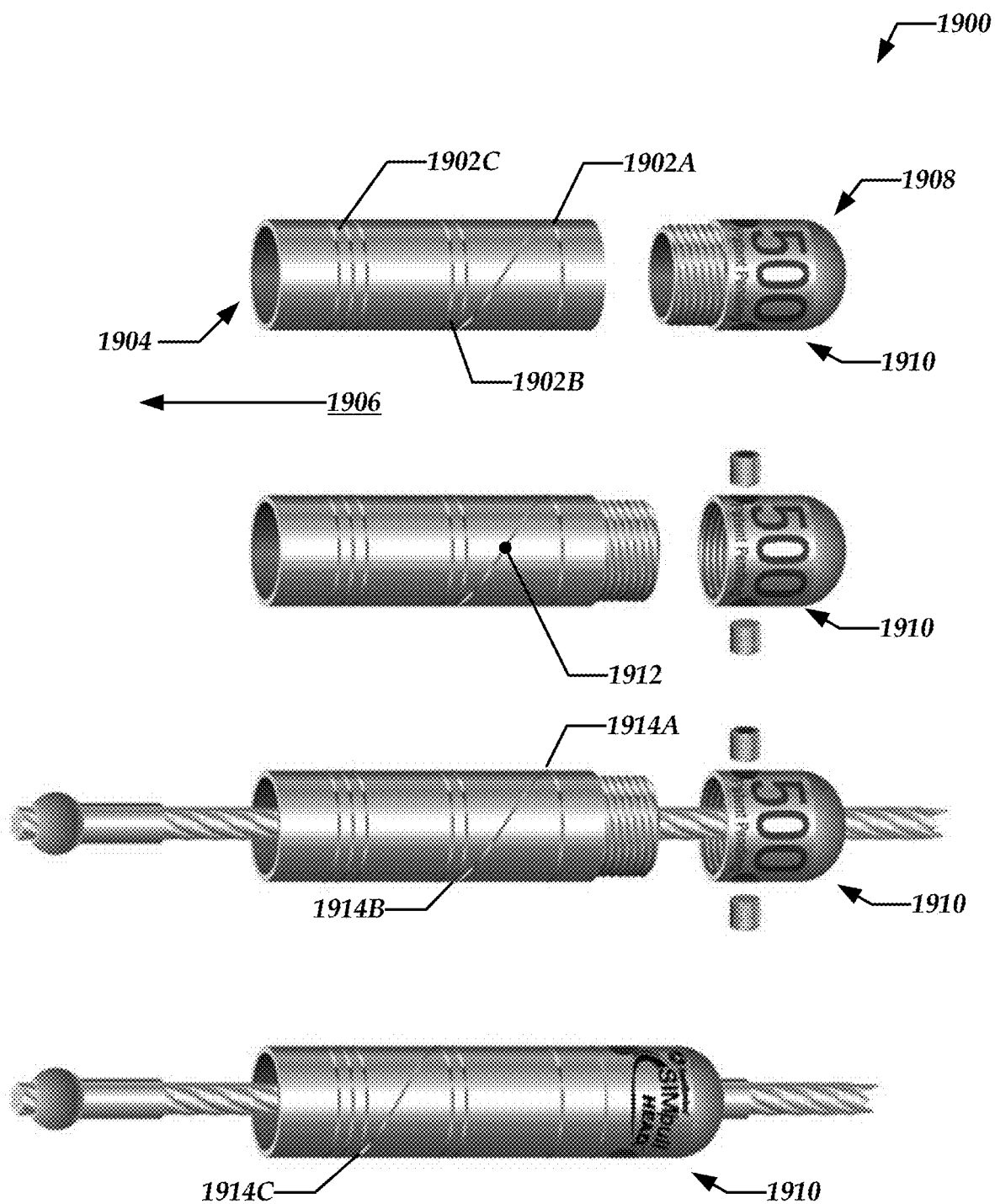
FIG. 19 is a diagram illustrating additional examples of pulling eyes.

FIG. 19 illustrates additional examples of pulling eyes, denoted generally at 1900. In general, previous description directed to the pulling eyes applies equally to the pulling eyes 1900 shown in FIG. 19. However, FIG. 19 illustrates additional features that may be included in at least some implementations of the pulling eyes. For example, markings 1902A, 1902B, and 1902C (collectively, markings 1902) may indicate example orders or sequences for performing crimps when crimping the pulling eyes 1900. More specifically, a first crimp may be performed by placing a crimping tool approximately where indicated by the marking 1902A, a second sequential crimp may be performed by placing the crimping tool approximately where indicated by the marking 1902B, and a third sequential crimp may be performed by placing the crimping tool approximately where indicated by the marking 1902C.

As appreciated from reading the foregoing description with reference to FIG. 19, it is noted that the order of crimps proceed along a representative body or sleeve portion 1904 in the general direction indicated by the arrow 1906. More specifically, assuming that a given pulling eye 1908 includes a head portion 1910 attached to the body or sleeve portion 1904, the first crimp performed approximately at the marking 1902A may be closest to the head portion 1910. The second crimp performed approximately at the marking 1902B may be next closest to the head portion 1910, while the last crimp performed approximately at the marking 1902C may be are farthest from the head portion 1910.

Crimping the body or sleeve portion 1904 may displace a certain portion of the material constituting the body or sleeve portion 1904. In implementations that perform the crimped sequence in the order indicated by the sequential markings 1902A-1902C, the material displaced by the crimping operations may generally flow in the direction indicated by the arrow 1906. In this manner, the displaced material may flow toward a distal end of a conductor onto which the pulling eye 1908 is crimped.

In light of the foregoing description, a first crimp performed approximately where indicated by the marking 1902A may result in some displaced material flowing in both directions (i.e., some toward the head portion 1910, and some displaced material flowing in the direction indicated by the arrow 1906). A second crimp performed approximately where indicated by the marking 1902B may also result in some displaced material flowing in both directions. However, displaced material flowing opposite the direction 1906 would be blocked by the first crimp 1902A. Similar considerations apply to material displaced by the third crimp performed approximately where indicated by the marking 1902C. Accordingly, performing the crimps in the order indicated by the markings 1902A-1902C may allow material displaced by the crimps to flow unimpeded along the body portion 1904 in the direction indicated by the arrow 1906.

In the examples shown in FIG. 19, the sequence of crimps is indicated by the markings 1902A-1902C (e.g., one marking 1902A may indicate the first approximate crimp location, two markings 1902B may indicate the second approximate crimp location, and so on). However, implementations of this description may employ other techniques for indicating a suggested sequence or order of crimps. For example, in some implementation scenarios, the body portions 1904 may be marked with numerals "1", "2", and "3", to suggest crimping orders and/or locations.

In other examples, the body portions may be color-coded. For example, a first sequential crimping location may be color-coded red, a second sequential crimping location may be color-coded white, a third sequential crimping location may be color-coded blue, and so on. These color-coding crimping locations may be associated with a suitable mnemonic (e.g., "red-white-and-blue").

For convenience of description only, and not to limit possible implementations, the foregoing drawings and description may relate to examples including body portions that are crimped three times. However, implementations of this description may incorporate any suitable number of crimps, without departing from the scope and spirit of the present description.

As described above with previous drawings, successive or adjacent crimps performed along the body portion 1904 may be rotated relative to one another, as illustrated in, for example, FIGS. 14-16. As suggested in these drawings, successive crimps may be rotated approximately 90° relative to one another. To facilitate these rotational alignments between adjacent or successive crimps, the body portion 1904 may be marked to provide a guide for aligning a crimping tool and the body portion relative to one another when performing successive crimps. For example, as shown in FIG. 19, the pulling eye 1908 may include a marking line 1912 that intersects the markings 1902A-1902C, such that the crimping tool may be oriented to intersections between the marking line 1912 and the markings 1902A-1902C. FIG. 19 denotes a first such intersection at 1914A (between the marking line 1912 and the first marking 1902A), a second such intersection at 1914B (between the marking line 1912 and the second marking 1902B), and a third such intersection at 1914C (between the marking line 1912 and the third marking 1902C).

In light of the foregoing description, the pulling eye 1908 may be crimped by following the marking line 1912 along the body portion 1904, and placing the crimping tool approximately at the intersections 1914A-1914C (collectively, intersections 1914) when performing sequential crimps. Following the intersections 1914 as indicated in FIG. 19 may result in the rotationally offset sequence of crimps shown previously in FIG. 13. Although FIG. 19 provides examples in which the marking line 1912 traces a generally spiral configuration along the body portion 1904, other techniques for guiding the crimping process to achieve the rotationally offset sequence of crimps may be possible as well. For example, the body portion 1904 may be marked with marks or hash marks (e.g., longitudinal with the body portion 1904) indicating a rotational alignment for the crimping tool.

Referring to the head portions 1910, these head portions may bear textual or other subject matter. This subject matter may be printed, etched, embossed, debossed, textured, or otherwise visibly affixed to the head portions 1910. Examples of the subject matter may include, but are not limited to: sizes of the conductors onto which a given pulling eye 1908 is crimped or sized to be crimped; trademarks, logos, or other branding information associated with the pulling eyes 1908, or associated with integrated wire installation systems of which the pulling eyes 1908 are a part; or the like.

Figure 20:
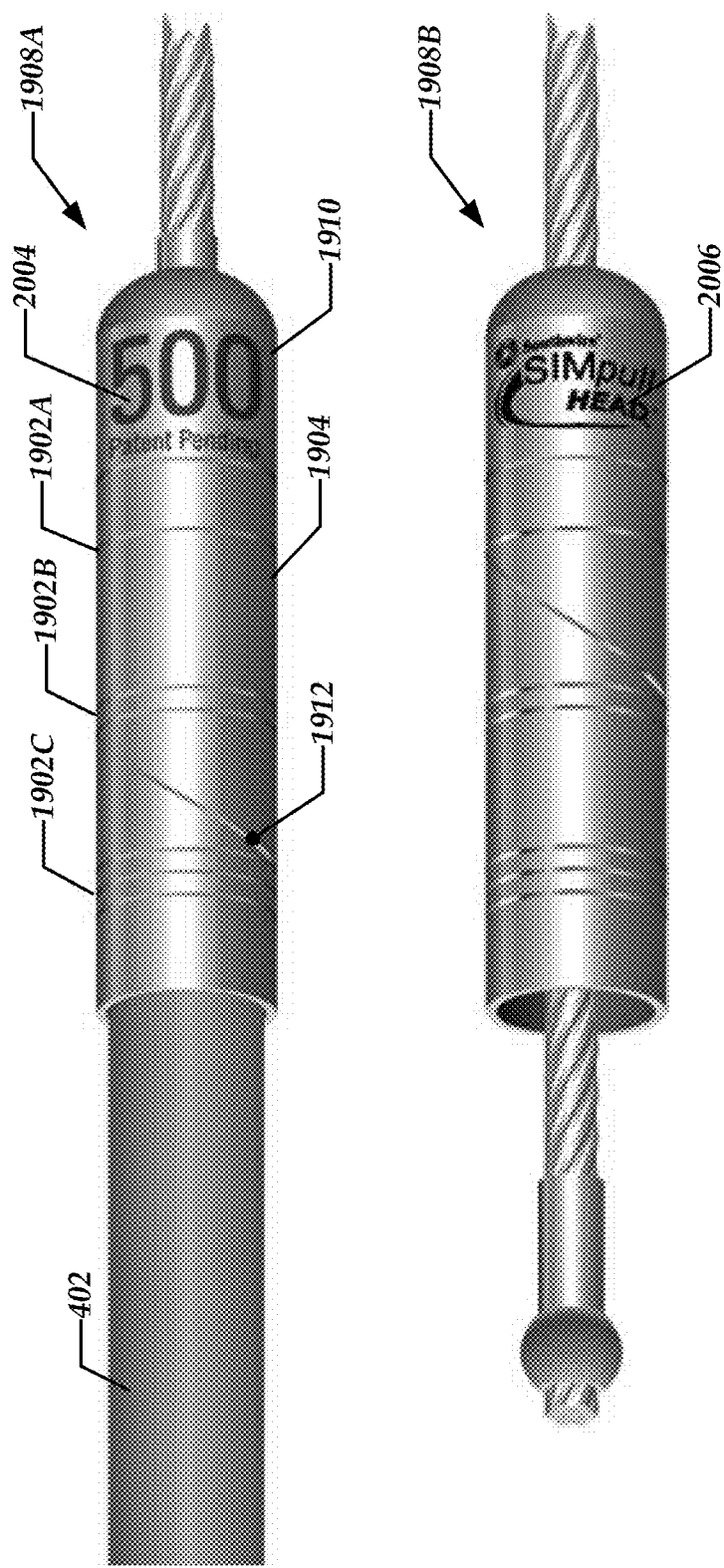
FIG. 20 is a diagram illustrating the pulling eyes shown in FIG. 19, with head portions and body portions assembled.

FIG. 20 illustrates a pulling eye 1908A, with the head portion 1910 and body portion 1904 assembled. The markings 1902A-1902C and 1912 may facilitate sequential crimps along the body portion 1904, to attach the pulling eye 1908A onto a representative conductor 402. In addition, the pulling eye 1908A may include label 2004 that represents a size of the conductor, or any other suitable information.

Pulling eye 1908B is shown unattached to a conductor, and may include other examples of labels 2006, featuring logos or the like. In some implementations, a given pulling eye 1908 may include the label 2004 or the label 2006. In other implementations, the given pulling eye 1908 may include the label 2004 and the label 2006, with the labels 2004 and 2006 appearing on different sides of the pulling eye 1908. In addition, the labels 2004 and/or 2006 may appear in locations other than those shown in FIG. 20 without departing from the scope and spirit of the present description.

Figure 21:
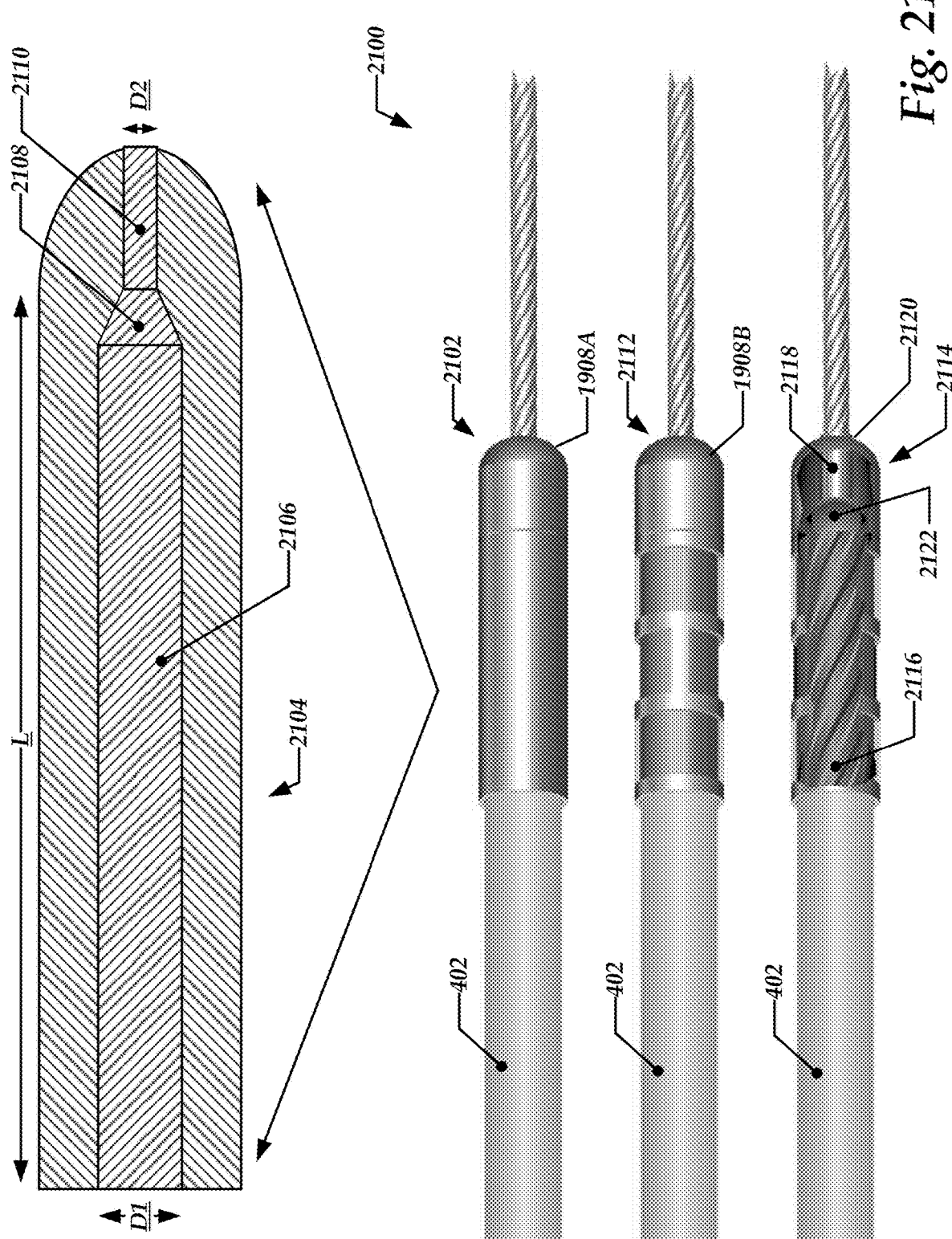
FIG. 21 is a diagram illustrating additional details of the pulling eyes as the pulling eyes undergo crimping.

FIG. 21 illustrates additional details of the pulling eyes, denoted generally at 2100, as the pulling eyes undergo crimping. As shown generally at 2102, a representative pulling eye 1908A is slid over the representative conductor 402. At 2104, FIG. 21 provides an expanded internal view of the representative pulling eye 1908A. This expanded internal view is simplified and not drawn to scale, and is provided only to facilitate this description. Turning to the expanded internal view 2104 in more detail, the representative pulling eye 1908A may define an internal bore 2106 for receiving an end of the conductor 402. For example, the internal bore 2106 may be machined into blank stock material using a suitable drill bit. The drill bit may have a tapered cutting end, such that it leaves an angled seat or lip portion 2108 within the blank after the machining operation. Afterwards, another bore 2110 may be drilled through the blank as shown, having a diameter D2 that is smaller than the diameter D1.

The internal bore 2106 may be formed from a cylindrical blank of material by, for example, machining through the blank at a distance L with a drill bit having a diameter D1. Examples of suitable materials may include, but are not limited to aluminum, aluminum alloy (e.g., O-tempered 6061 alloy), or other materials suitable for crimping onto and engaging conductors. In general, the pulling eyes described herein may be manufactured from any metals having a relatively tacky or high-friction characteristic when cold, particularly when crimped into close contact with metals commonly used to manufacture electrical conductors (e.g., aluminum, copper, and the like).

As shown at 2112, the pulling eye 1908A may be crimped onto the conductor 402, with the crimping technique shown in FIG. 21 understood as illustrative rather than limiting. FIG. 21 denotes at 1908B the pulling eye 1908A as crimped onto the conductor 402.

FIG. 21 shows at 2114 internal details relating to the crimped pulling eye 1908B. In the example shown, the pulling eye 1908B may be crimped onto a stripped portion 2116 of the conductor 402, with the stripped portion 2116 passing into the internal bore 2106. A shank portion 2118 of a stop member 2120 may pass into the smaller bore 2110, with a ball portion 2122 lodging against and contacting the lip portion 2108 when the stop member 2120 is fully seated internally within the pulling eye 1908B (to the right in the example shown in FIG. 21). In some cases, an end of the shank portion 2118 may be exposed through the front of the pulling eyes 1908. When the diameter D2 is smaller than the diameter of the ball portion 2122, the ball portion 2122 may be captured internally within the crimped pulling eye 1908B.

The ball portion 2122 may be manufactured to a predefined dimension, depending on the size of the pulling eyes 1908 and/or the gauge of the conductor 402 with which the pulling eyes 1908 are to be used. Once the ball portion 2122 is fully seated in the lip area 2108, it may provide a stop that an end of the conductor 402 may contact. Put differently, the conductor 402 may be inserted into the pulling eye 1908 until the end of the conductor 402 rests against the ball portion 2122. At this point, the conductor 402 is fully bottomed in the pulling eye 1908, and the pulling eye 1908 may be crimped onto the conductor 402.

Some implementations of this description may employ insulation-stripping tools that remove a predefined length of insulation from the conductor 402, exposing that length of bare metal. If some portion of the bare metal remains exposed after the conductor 402 is inserted into the pulling eye 1908, this may indicate that the conductor 402 is not fully bottomed in the pulling eye 1908 and may be inserted further to obtain a more secure crimp.

In the example shown in FIG. 21, the pulling eye 1908 is crimped onto the bare metal conductor, with no insulation captured between the pulling eye 1908 and the bare metal conductor. Accordingly, pulling forces may be transmitted from the pulling eye 1908 directly to the bare metal conductor. However, other implementations are possible, in which at least a portion of the crimp between the pulling eye 1908 and the bare metal conductor may capture at least a portion of the insulation around the conductor 402.

In the crimping examples shown and described herein, the pulling eyes may be crimped onto the outer surfaces of the conductors. Implementations of the crimping techniques described herein may utilize all strands of the conductors, without removing or cutting any of these strands. As appreciated from this description, removing some of the strands may reduce the pulling strength of the crimp between the conductor and the pulling eye. In addition, the crimping techniques described herein may operate without any additional plugs, wedges, or other devices forced into the strands of the conductor as part of the crimping process. Accordingly, crimping forces may act only on the outer portion of the conductor, without utilizing such plugs, wedges, or the like to generate counteracting forces internally from within the strands of the conductor.

Figure 22:
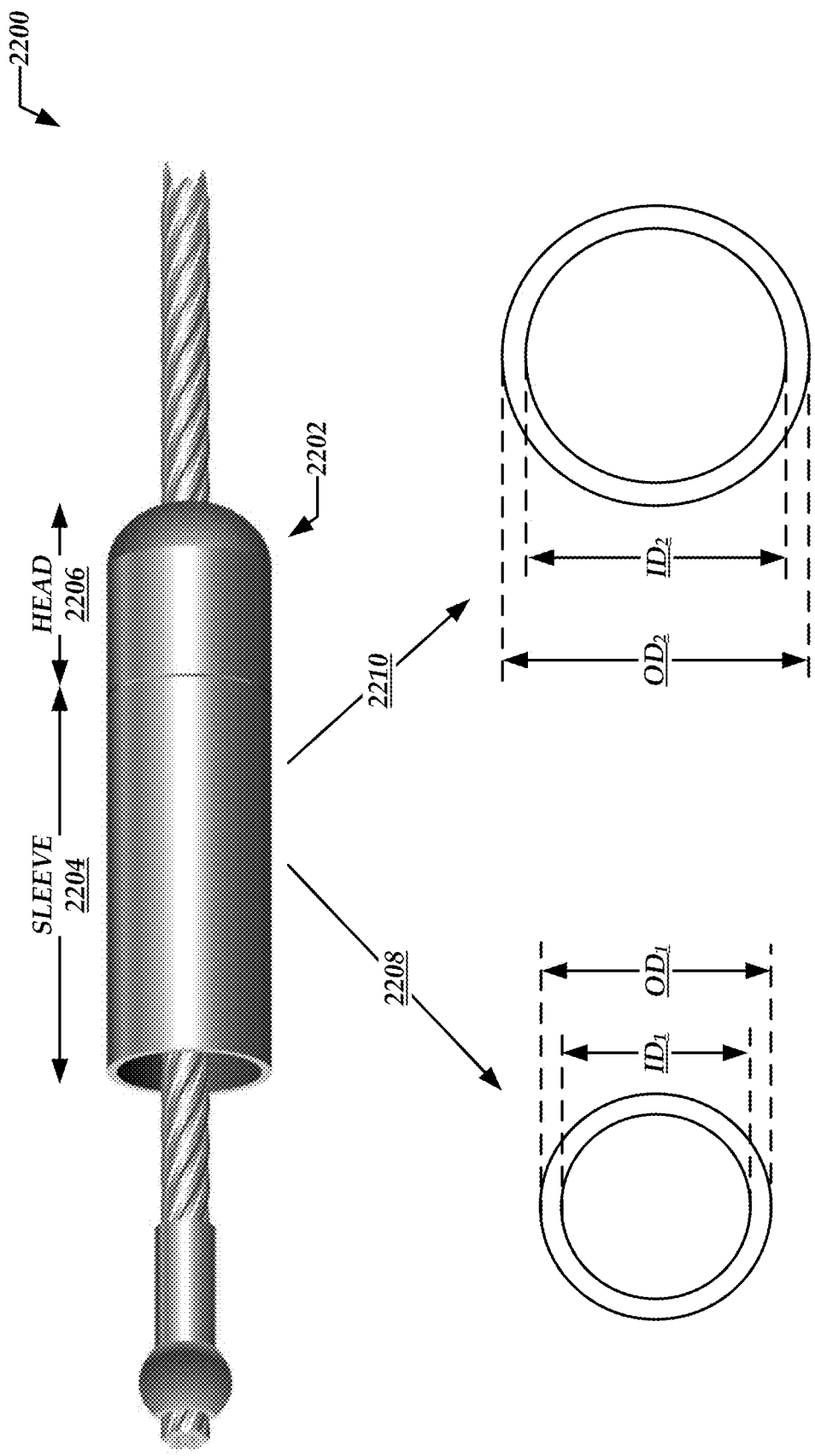
FIG. 22 is a diagram illustrating outside diameters, inside diameters, and wall thicknesses suitable for implementing the pulling eyes described herein.

FIG. 22 illustrates examples of outside diameters, inside diameters, and wall thicknesses, denoted generally at 2200, suitable for implementing the various pulling eyes described herein. FIG. 22 provides a representative pulling eye at 2202, with this pulling eye 2202 including a cylindrical, hollow sleeve portion 2204 and a somewhat rounded head portion 2206. The various dimensions and proportions shown in FIG. 22 are illustrative, and FIG. 22 is not drawn to scale.

As described previously, different pulling eyes 2202 may be provided for crimping onto conductors having different sizes or gauges. Thus, the pulling eyes 2202 may be available in different sizes, according to the gauge of conductor being installed. In general, the length of the sleeve portions 2204 may be approximately the same, regardless of the size or gauge of the conductor being installed. However, the diameter of the sleeve portion 2204 may vary to accommodate different sizes or gauges of conductors.

Likewise, the diameter of the head portion 2206 may also vary to accommodate these different sizes or gauges of conductors. However, the overall length of the head portion 2206 may vary, depending upon the radius of the rounded portion as shown in FIG. 22. Thus, although the length of the sleeve portions 2204 may be approximately the same regardless of the size or gauge of the conductor being installed, the overall length of the pulling eyes 2202 may vary somewhat, with this variance attributable to deferring lengths of the head portions 2206.

As represented at 2208, FIG. 22 provides a representative cross-sectional view of one size of the pulling eye 2202. As represented at 2210, FIG. 22 provides a representative cross-sectional view of another size of the pulling eye 2202. In the example shown in FIG. 22, the view 2208 corresponds to a pulling eye 2202 sized for pulling a smaller conductor, as compared to the pulling eye represented in the view 2210.

Referring first to the view 2208, this size of the pulling eye 2202 may be characterized by a first outside diameter ($OD_1$), and a first inside diameter ($ID_1$). The difference between the $OD_1$ and the $ID_1$ represents a wall thickness associated with this size of the pulling eye 2202.

Referring now to the view 2210, this size of the pulling eye 2202 may be characterized by a second outside diameter ($OD_2$), and a second inside diameter ($ID_2$). The difference between the $OD_2$ and the $ID_2$ represents a wall thickness associated with this size of the pulling eye 2202.

Although FIG. 22 is not drawn to scale, the wall thicknesses of the two pulling eyes represented at 2208 and 2210 may be approximately equal, although the outside diameters and inside diameters may vary to accommodate different sizes or gauges of conductors. More specifically, the inside diameters ID$_1$ and ID$_2$ may be sized to snugly receive a conductor having a given size or gauge. Put differently, the inside diameters ID$_1$ and ID$_2$ may be chosen for a given conductor gauge, such that the conductor encounters slight friction or physical resistance when being inserted into the pulling eye 2202. In different implementations, different tolerances or clearances are possible between the pulling eye 2202 and the conductor. In example implementations, however, these tolerances may be less than or equal to approximately 100 mils. However, experimentation in crimping the pulling eye 2202 with different tolerances may yield similar or different results. The snug engagement described here may enable secure crimps without using the plugs, wedges, or other auxiliary devices, as described above.

Regarding the wall thicknesses, as defined by the inside diameters ID$_1$ and ID$_2$ and the outside diameters OD$_1$ and OD$_2$, different wall thicknesses are possible in different implementations. In example implementations, however, these wall thicknesses may be less than or equal to approximately ⅛". Once again, however, experimentation with different wall thicknesses and materials may yield similar or different results.

Figure 23:
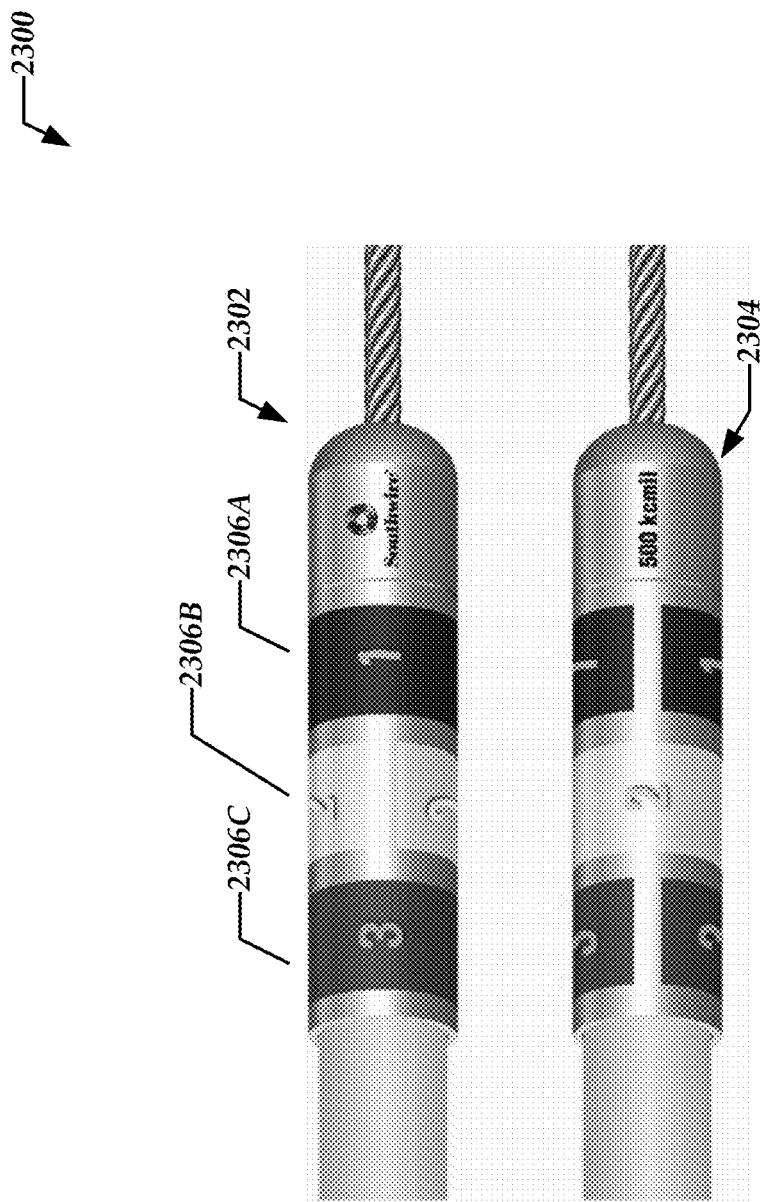
FIG. 23 is a diagram illustrating sequences and/or rotational orientations for performing successive crimps along pulling eyes, as indicated by color-coded areas along the pulling eyes.

As described above, implementations of this description may employ various techniques for indicating a sequence and/or rotational orientation of successive or sequential crimps along pulling eyes. Referring to FIG. 23, this Figure illustrates sequences and/or rotational orientations, denoted generally at 2300, for performing successive crimps along representative pulling eyes 2302 and 2304. More specifically, the representative pulling eyes 2302 and 2304 may incorporate any number of color-coded areas 2306A, 2306B, and 2306C (collectively, color-coded areas 2306). These color-coded areas 2306 may or may not include representations of the numbers (i.e., "1", "2", and "3") as shown in FIG. 23.

In example implementations, the color-coded area 2306A may be printed or otherwise colored as red. The color-coded area 2306B may be colored as white, and the color-coded area 2306C may be colored as blue. Accordingly, the pulling eyes 2302 and 2304 may employ the color-coded areas 2306A-2306C in connection with a mnemonic or memory device, such as "red, white, and blue." For example, the color-coded areas 2306A-2306C may suggest to operations personnel to crimp the red area first, the white area second, and the blue area third.

As also indicated at 2302 and 2304, some implementations of the pulling eyes may indicate rotational orientations of successive crimps. In the examples shown, the red area may be crimped at a given rotational orientation, followed by crimping the white area offset by approximately 90°, followed by crimping the blue area after offsetting by approximately 90° from the previous crimp.

As shown at 2302, the pulling eyes may be printed or otherwise marked with logos, trademarks, or other visual subject matter. As shown at 2304, the pulling eyes may be marked to indicate a wire gauge for which a given pulling eye is sized.

Figure 24:
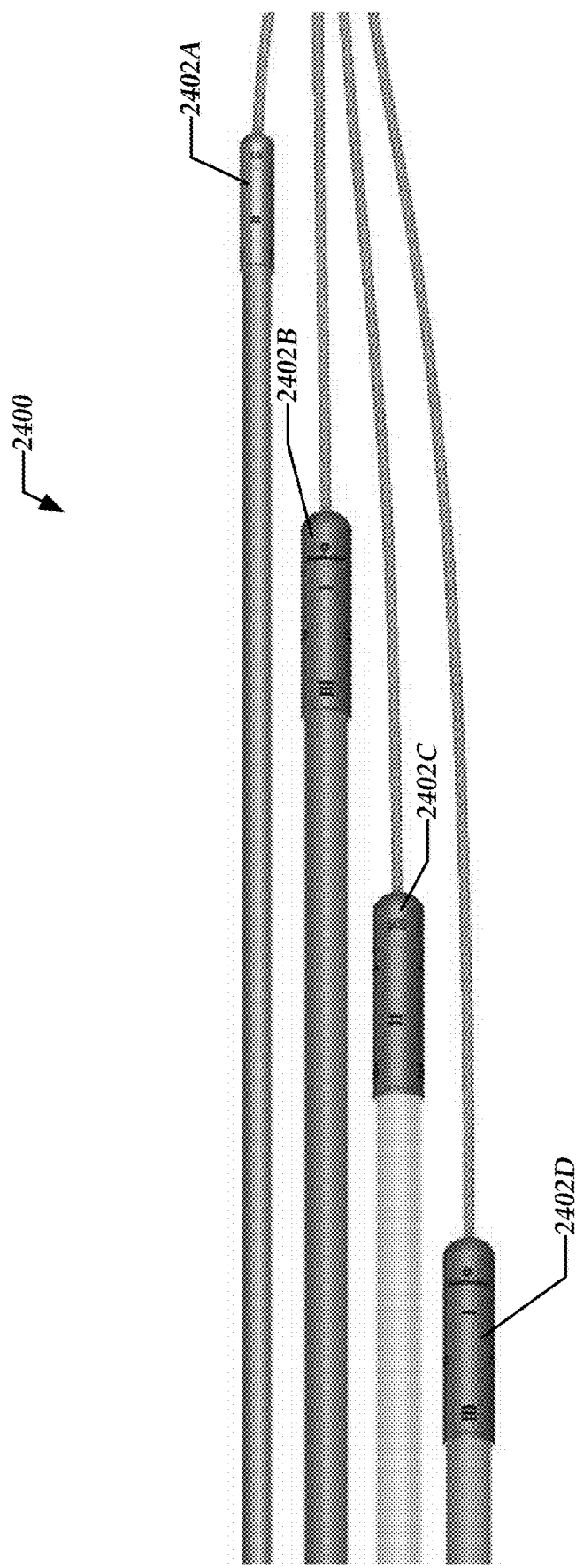
FIG. 24 is a diagram illustrating sequences and/or rotational orientations for performing successive crimps along pulling eyes, as indicated by dashes or other indicia applied to the pulling eyes.

FIG. 24 illustrates sequences and/or rotational orientations, denoted generally at 2400, for performing successive crimps along representative pulling eyes 2402A, 2402B, 2402C, and 2402D (collectively, pulling eyes 2402). In general, the pulling eyes 2402 may incorporate dashes or other indicia to perform functions similar to those described above in connection with the color-coded areas 2306 shown in FIG. 23. In the example shown in FIG. 24, a location for a first crimp may be indicated by a single dash (i.e., "I"), a location for a next crimp may be indicated by a double dash (i.e., "II"), and a location for a next crimp may be indicated by a triple dash (i.e., "III").

Similar to the above description regarding rotational orientation of successive crimps, the pulling eyes 2402 shown in FIG. 24 may also suggest orientation of a crimping tool when performing successive crimps. For example, as shown most clearly at 2402B or 2402D, the location of the single dash may indicate where to orient the crimping tool when performing the first crimp. As shown most clearly at 2402A or 2402C, the location of the double dash may indicate where to orient the crimping tool when performing the second crimp. As shown most clearly at 2402B or 2402D, the location of the triple dash may indicate where to orient the crimping tool when performing the third crimp.

Figure 25A:
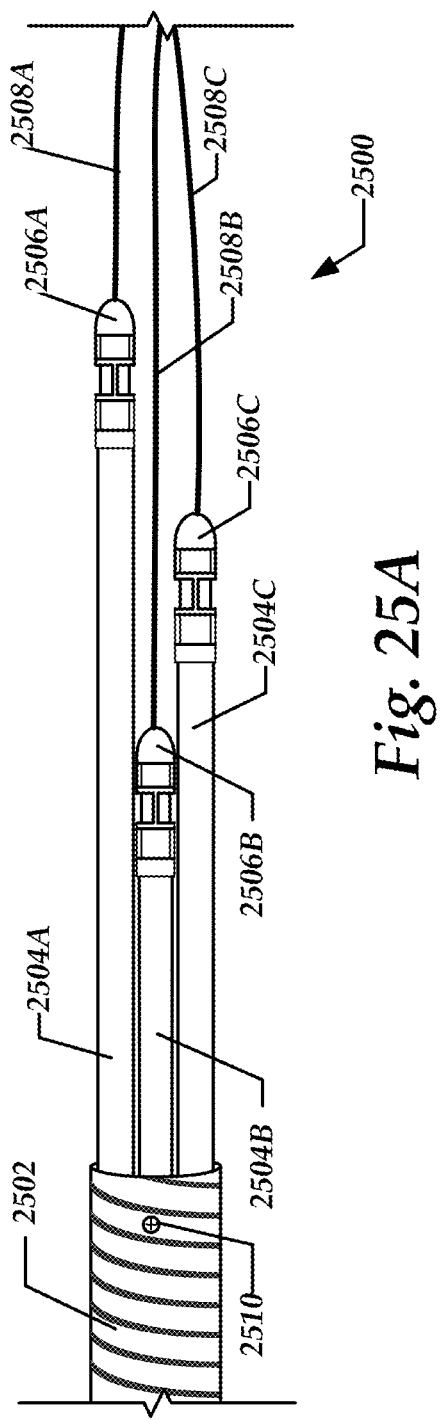
FIGS. 25A and 25B are diagrams illustrating details of preparing an armored cable for installation of pulling head assemblies.
Figure 25B:
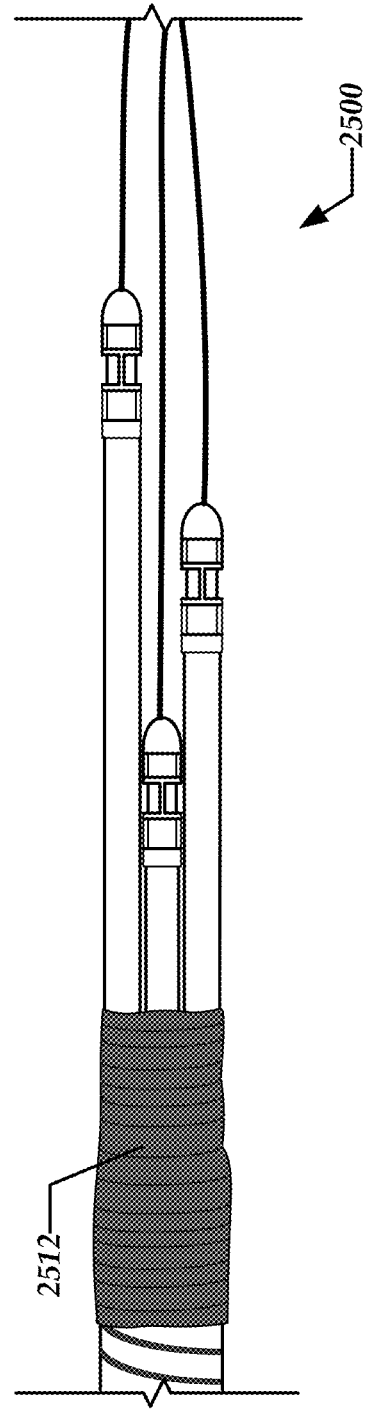

Although the description above is primarily focused on wire or cables pulled through conduit, the description may also be applied to armored cable, such as MC cable, or any other cable not necessarily required to be pulled through conduit. FIGS. 25A and 25B illustrate embodiments in which the cable is armored cable. FIG. 25A illustrates pulling head assemblies of an armored cable, denoted generally at 2500. Respective pulling eyes 2506A-2506C are shown affixed to corresponding insulated conductors 2504A-2504C which are encompassed by a covering or armor 2502 which may be constructed of any suitable metallic or nonmetallic material. It is noted that the pulling eyes 2506A-2506C as shown in FIG. 25A may include any of the alternative pulling eyes discussed above and may be affixed to the corresponding insulated conductors 2504A-2504C in any manner discussed above. The pulling eyes 2506A-2506C serve to attach the insulated conductors 2504A-2504C to respective pulling cables 2508A-2508C. Although FIG. 25 illustrates each of the insulated conductors 2504A-2504C affixed with one of the pulling eyes 2506A-2506C, it should be understood that less than all of the insulated conductors of the armored cable 2500 may be affixed with one of the pulling eyes. As discussed above, the pulling cables 2508A-2508C may be constructed of any suitable metallic or nonmetallic material, and may be coated or impregnated with friction-reducing compounds, as discussed in more detail above. Moreover, the pulling cables 2508A-2508C may be constructed in any manner as discussed above.

In order to construct the pulling head assemblies of the armored cable 2500 illustrated in FIG. 25A, the armor 2502 of the armored cable may be cut and removed to expose the insulated conductors 2504A-2504C; conductors, such as a ground conductor, that are not insulated; and any other material, such as filler material, of the armored cable. In addition to cutting and removing the armor 2502, other materials, such as binder tape, encompassing the insulated conductors 2504A-2504C, the conductors not insulated, and any other filler material may also be cut and removed. According to embodiments, a portion of any ground conductor and a portion of any filler material may be removed from the armored cable 2500 by cutting the ground conductor and the filler material back to the armor 2502.

The insulated conductors 2504A-2504C may be cut to lengths associated with the staggered lengths of the pulling cables 2508A-2508C, as further discussed above with regards at least to FIGS. 8A and 8B, and a portion of the insulation of the insulated conductors may be stripped to expose a portion of the conductors for affixing the pulling eyes 2506A-2506C, as further discussed above with regards at least to FIGS. 7 and 11. Affixing the pulling eyes 2506A-2506C to the portions of the conductors of the insulated conductors 2504A-2504C results in the pulling head assemblies of the armored cable 2500 as illustrated in FIG. 25A.

The pulling head assemblies of the armored cable 2500 as illustrated in FIG. 25A may be pulled over obstructions, such as pulleys and struts, when being installed. FIGS. 25A and 25B further illustrate embodiments to protect the pulling head assemblies of the armored cable 2500 from such obstructions and to keep the armor 2502 from slipping off the insulated conductors 2504A-2504C and any other materials encompassed within the armor while the armored cable is being installed.

As shown FIG. 25A, a screw, nail, or other insertable object 2510 may be inserted into the armor 2502 of the armored cable 2500 to keep the armor from slipping away from the insulated conductors 2504A-2504C during installation.

As illustrated in FIG. 25B, a binding material 2512, such as tape, may be applied to the armored cable 2500 to protect further from slippage between the armor 2502 and the insulated conductors 2504A-2504C during installation of the armored cable. The binding material 2512 also protects the screw 2510 from dislodging or being dislodged from the armored cable 2500 during installation of the armored cable. Additionally, the binding material 2512 protects the pulling head assemblies of the armored cable 2500 from catching on any obstructions during installation. According to embodiments, the binding material may be applied to the insulated conductors 2504A-2504C of the armored cable 2500 from before the cut on the armor 2502, as illustrated in FIG. 25A; past the cut; and on to the armor itself. According to further embodiments, the binding material 2512 may be applied from a minimum of six to eight inches on the armor 2502, past the cut on the armor, and to a minimum of six to eight inches on the insulated conductors 2504A-2504C. The binding material 2512 may be partially overlapped on itself, and any number of layers of the binding material may be applied.

In further embodiments, a protective material, such as shrink wrap, may be applied over the binding material 2512 to protect further from slippage between the armor 2502 and the insulated conductors 2504A-2504C during installation of the armored cable. The protective material may also further protect the screw 2510 from dislodging or being dislodged from the armored cable 2500 during installation of the armored cable. Additionally, the protective material may protect the pulling head assemblies of the armored cable 2500 from catching on any obstructions during installation. According to embodiments, the protective material may be applied completely or partially over the binding material 2512.

Figure 26:
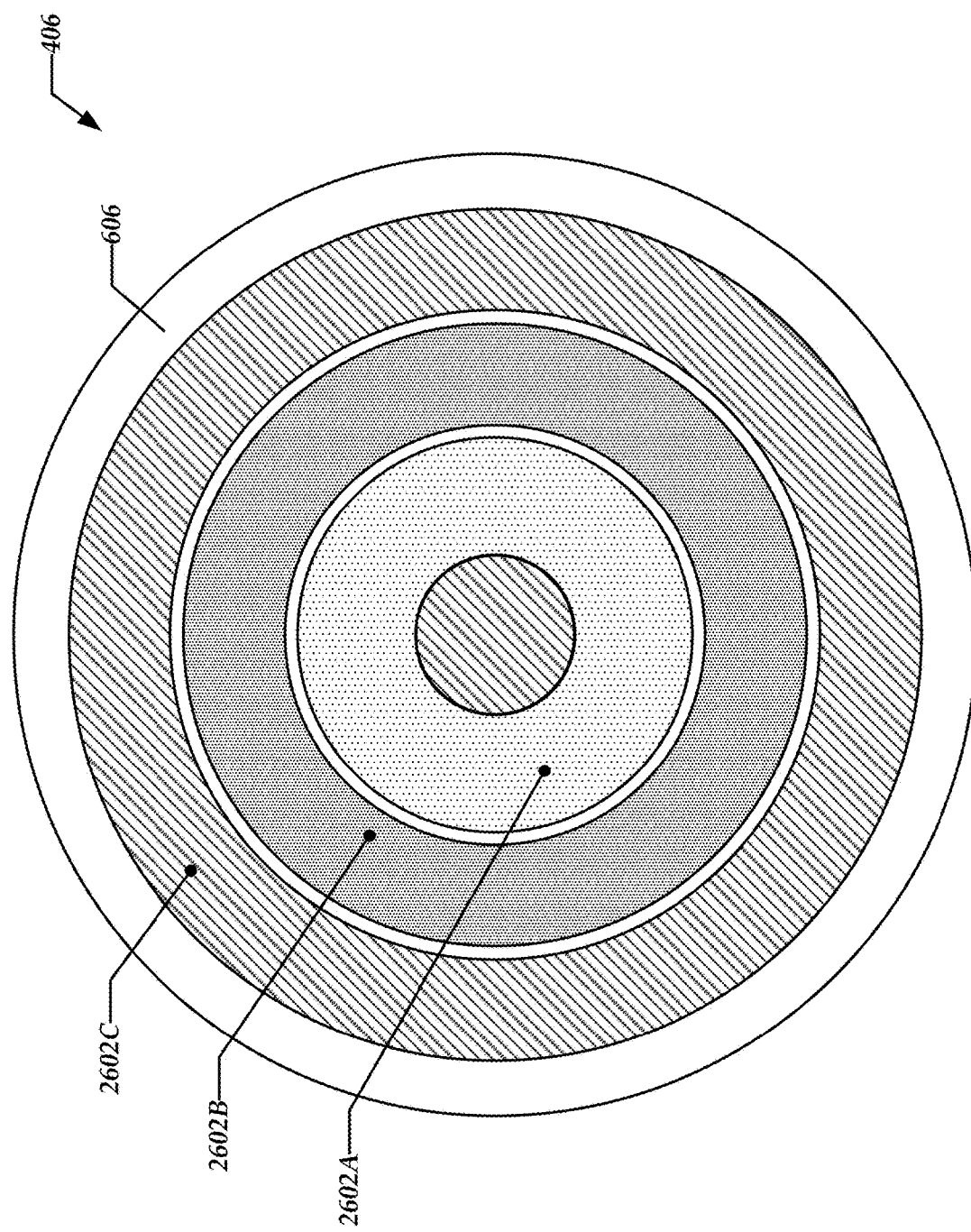
FIG. 26 is a cross-section of a reel containing multiple parallels wound in layers on the reel, according to embodiments described herein.

As described above in regard to FIG. 5, multiple parallels, each consisting of one or more conductors 402, may be wound onto a reel 406 in layers, one on top of the other, for delivery to a job site. Each parallel on the reel 406 may then be payed-off separately for multiple, independent wire/cable pulls. FIG. 26 illustrates a cross-section of a reel 406 containing multiple parallels wound in layers 2602A-2602C on the reel. For example, the reel 406 may contain a first parallel consisting of four 350 kcmil conductors 402 of 210 feet in length on a first layer 2602A, a second parallel consisting of three 350 kcmil conductors 402 of 185 feet in length on a second layer 2602B, and a third parallel consisting of five 350 kcmil conductors 402 on 100 feet on a third layer 2602C. Upon delivery of the reel 406 to the job site, installers may pull the third parallel from the third layer 2602C, then the second parallel from the second layer 2602B, and finally the first parallel from the first layer 2602A.

Figure 27:
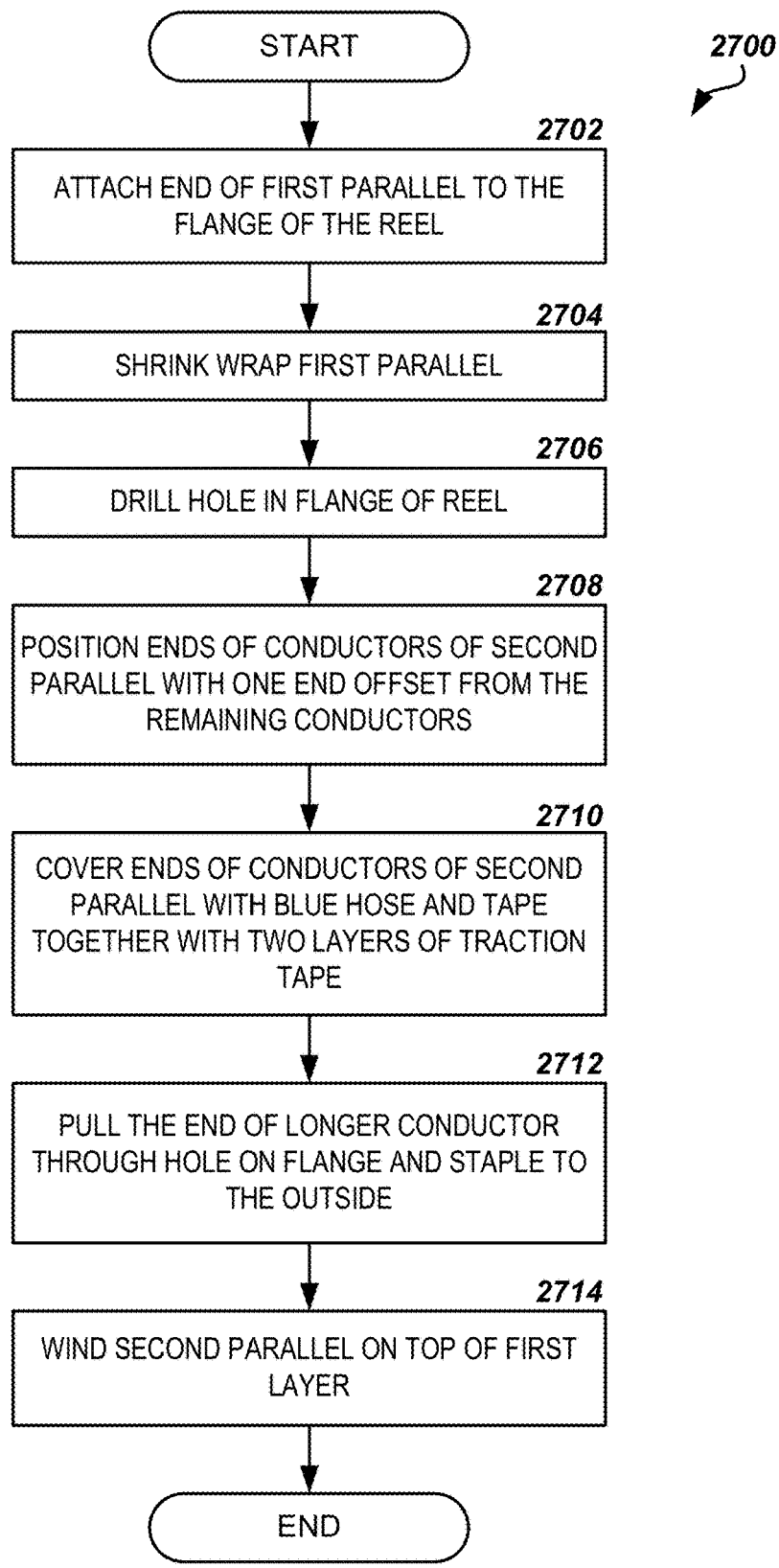
FIG. 27 is a flow diagram showing methods for layering multiple parallels on a single reel, according to embodiments described herein.
Figure 28:
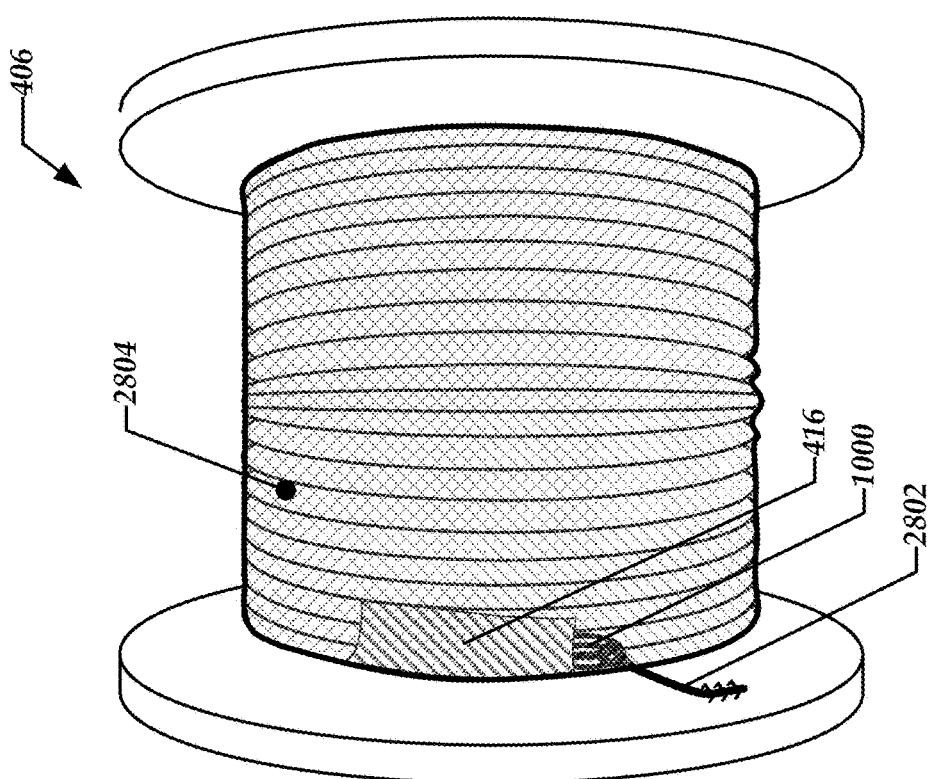

FIG. 27 illustrates a routine 2700 for layering multiple parallels on a single reel 406. It should be appreciated that more or fewer operations may be performed than shown in the figures and described herein, and that the operations may be performed in parallel, or in a different order than that described herein. The routine 2700 begins at operation 2702, where the end of the first parallel wound onto the reel 406 is attached to a flange 606 of the reel. The full length of the conductors 402 of the first parallel may be wound onto the reel 406, leaving an end of the first parallel exposed. According to embodiments, the conductors 402 of the first parallel may be terminated with pulling eyes 700 that are further connected to a pulling head assembly 1000, in a manner described above at least at FIGS. 7 and 10. As shown in FIG. 28, the pulling head assembly may be covered with a protective covering 416, as described above in regard to FIG. 4. The pulling head assembly 1000 may be further connected to a short loop of rope 2802 or other material for handling of the terminal end of the parallel in take-up, storage, delivery, and pay-out. The short loop of rope 2802 may be stapled or otherwise fastened to the inside of one flange 606 of the reel 406, as further shown in FIG. 28.

Figure 29:
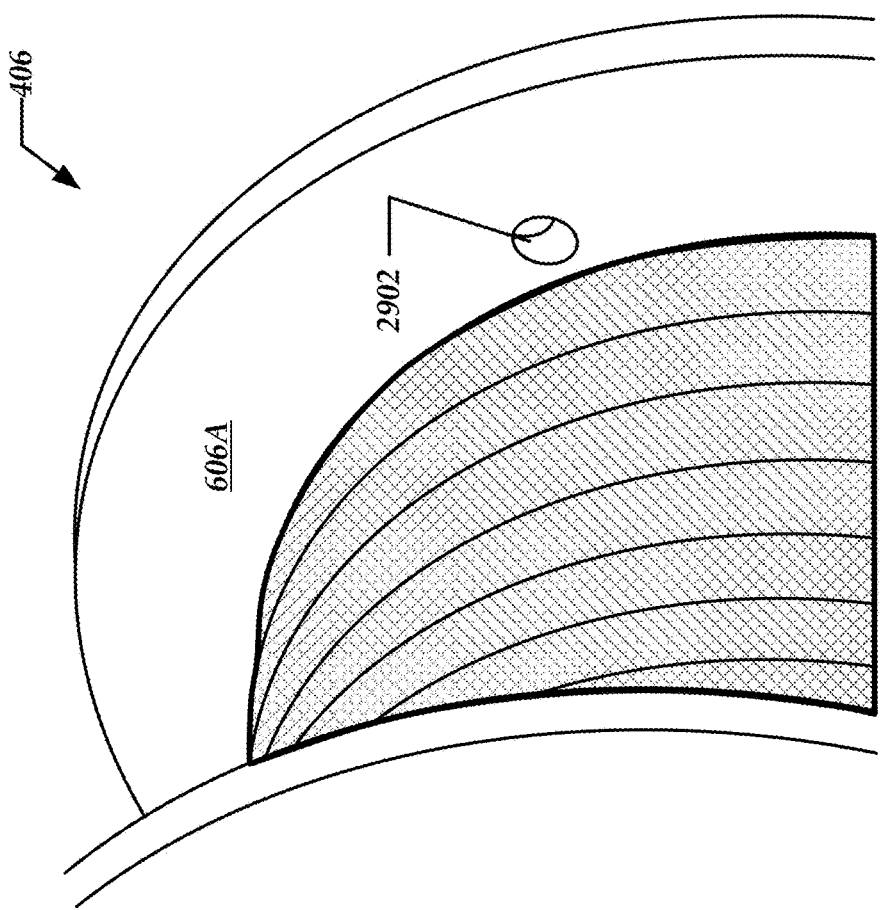
FIGS. 28-31 are diagrams showing aspects of the layering of multiple parallels on a single reel, according to embodiments described herein.

From operation 2702, the routine 2700 proceeds to operation 2704, where the first parallel wound onto the reel 406 is shrink-wrapped. This may be accomplished by winding one or more layers of shrink-wrap material 2804 over the first parallel on the reel 406, as further shown in FIG. 28. The shrink-wrap material 2804 may serve to separate the multiple parallels layered on the reel 406, allowing each parallel to be paid out without interference from the layer 2602A-2602C below. The routine 2700 then proceeds from operation 2704 to operation 2706, where a hole 2902 is drilled through the inside of a flange 606A of the reel 406, as shown in FIG. 29. The hole 2902 may be located just above the first shrink-wrapped layer 2602A on the flange 606A, as further shown in the figure. The hole 2902 may be of sufficient size to accommodate one conductor 402 of the second parallel to be wound onto the reel 406, as will be described below.

Figure 30:
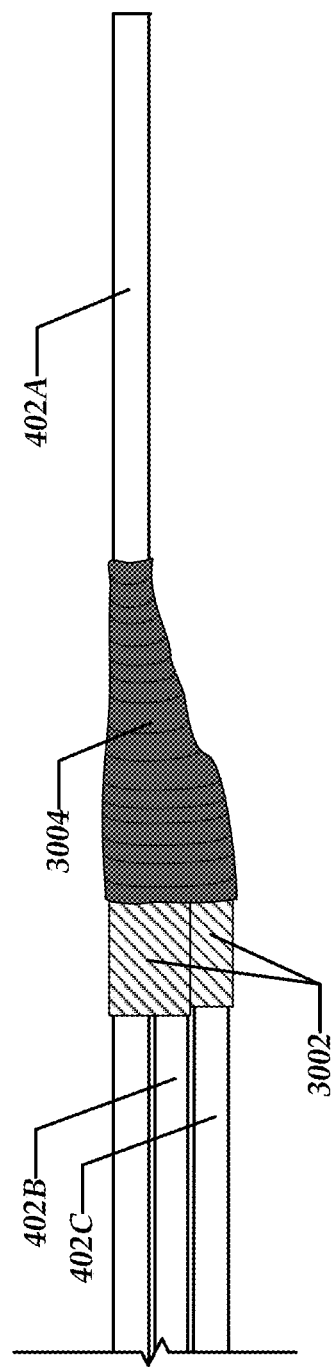
Figure 31:
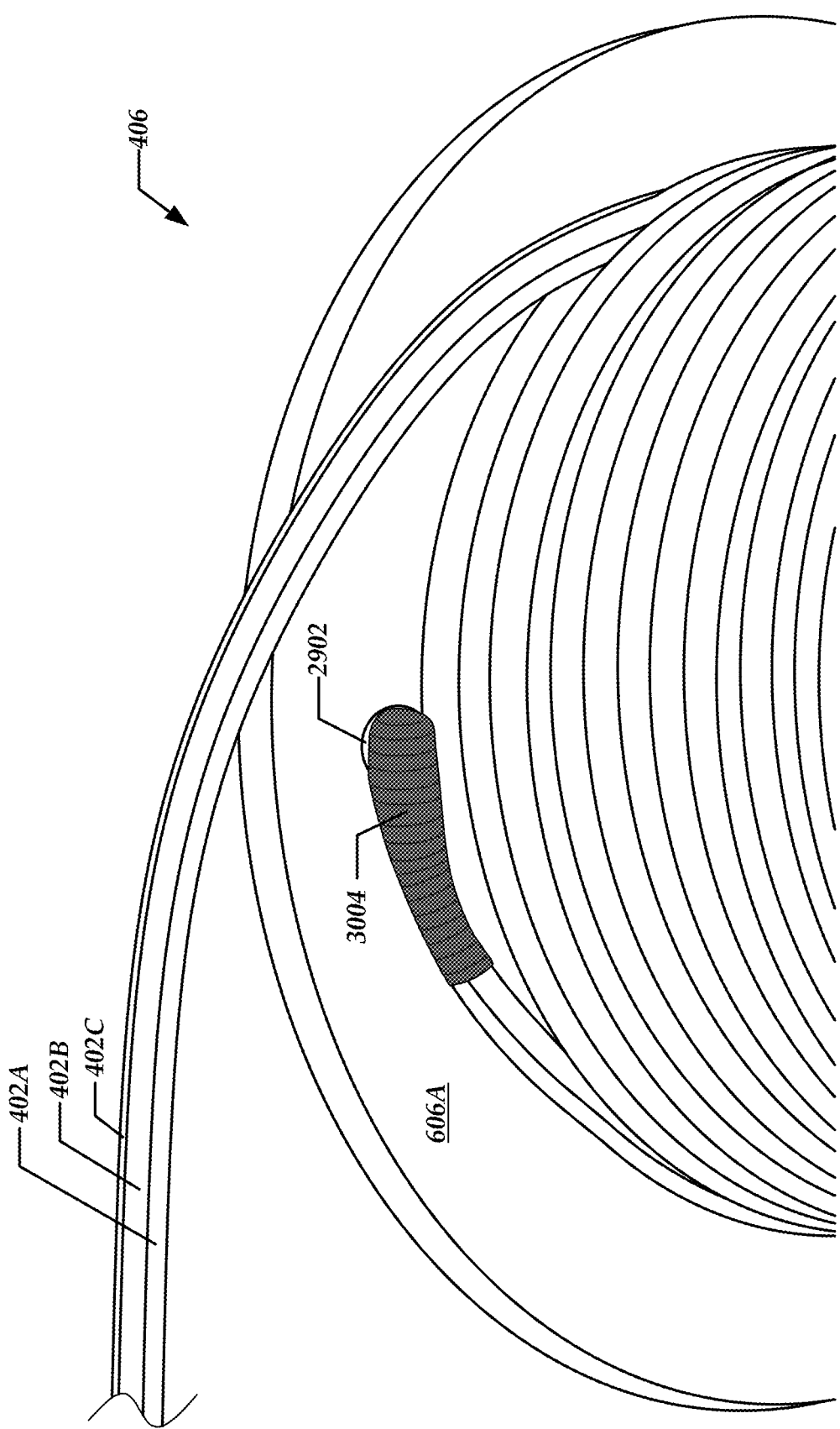

Next, the routine 2700 proceeds from operation 2706 to operation 2708, where the terminal ends of the conductors 402A-402C of the second parallel are positioned such that the end one conductor 402A is offset from the ends of the remaining conductors 402B-402C, as shown in FIG. 30. In one embodiment, the end of the offset conductor 402 may be 12 to 18 inches longer than the ends of the other conductors. From operation 2708, the routine 2700 proceeds to operation 2710, where protective coverings 3002 are installed on the ends of the conductors 402A-402C of the second parallel. The protective coverings 3002 may be a short length of hose, made of NYLON, PVC, or other polymeric material, that is slipped over the ends of the conductors 402A-402C, for example. The protective coverings 3002 may serve to protect the insulation of the conductors 402A-402C of the second parallel as they are wound onto the reel 406 and over the terminal ends, as shown in FIG. 31. The conductors 402A-402C of the second parallel may then be bound together using multiple layers of traction tape 3004 or other binding material, as further shown in FIG. 30.

The routine 2700 then proceeds from operation 2710 to operation 2712, where the end of the longer conductor 402A is pulled through the hole 2902 drilled through the flange 606A of the reel 406 in operation 2706 above, as shown in FIG. 31. The longer conductor 402A may then be stapled or otherwise fastened to the outside of the flange 606A. Next, from operation 2712, the routine 2700 proceeds to operation 2714, where the conductors 402A-402C of the second parallel are wound onto the reel 406 on top of the shrink-wrapped first layer, as further shown in FIG. 31. Once the entire, length of the conductors 402A-402C of the second parallel have been wound onto the reel 406, the end of the second parallel may be attached to the flange 606A and the routine 2700 repeated to add a third layer 2602C to the cable reel. It will be appreciated that any number of parallels may be layered onto a reel 406 in this fashion, provided that the entire quantity and weight of the combined conductors 402 for the multiple parallels do not exceed the relevant capacities of the reel 406 or consolidated payoff system 408 being utilized.

Illustrative Applications

As shown in the table presented below, implementations of this description may realize savings in time expended by electrical contractor (EC) personnel. In presenting the table below, it is noted that the wire pull scenarios represented in this table are illustrative only, and that implementations of this description may perform other wire pull scenarios without departing from the scope and spirit of this description. In addition, the hourly labor costs and time estimates provided in this table are illustrative only, and may vary in different implementations of this description. For example, the table below presents illustrative factors relating to an overhead 250' pull, with four conductors of size 500 with a 1/0 ground conductor. However, the description herein may be applied to other pulls as well. Accordingly, the savings presented in the table below may also vary across different implementations of this description.

In the table below, the left-most two columns present illustrative data related to traditional pipe and wire installations, while the next two columns present illustrative data related to pipe and wire installations performed according to the description herein. The right-most column lists illustrative installation steps as a percentage of total pull time, as compared to the EC personnel using traditional techniques.

CONCLUSION

Having provided the foregoing description of the drawing figures, several observations are noted. In general, the foregoing drawings are not drawn to scale, unless explicitly stated otherwise. Accordingly, the dimensions or proportions of particular elements, or the relationships between those different elements, as shown in the drawings are chosen only for convenience of description, but do not limit possible implementations of this description.

Various aspects of the integrated systems described herein may be implemented in connection with wires, cables, or conductors of any convenient size. For example, different pulling eyes, as described and illustrated above, may be provided for use with particular sizes of wire or cable. More specifically, the different pulling eyes may be sized and dimensioned as appropriate for the different sizes of wire, or types of conductors (e.g., copper or aluminum).

In general, implementations of the integrated systems 110 described herein may reduce the risk of damaging wire or cable during installation (e.g., pulls through conduits or installation of armored cable). In turn, the risk of equipment damage that is attributable to such wire damage may be reduced. In addition, these integrated systems 110 may reduce the risk of injury to personnel involved with the installation, as well as reducing time and cost associated with the insulation.

Personnel working at service centers may construct the integrated wiring solutions described herein. Among other operations, these construction processes may include at least crimping the pulling eyes onto conductors and assembling the pulling eyes into pulling heads. These construction operations may be performed before delivering the assembled and integrated wiring solutions to a job site. Put differently, the integrated wiring solutions may be pre-assembled for delivery to a job site.

| | | | | Steps as % of total pull time - |
|---|---|---|---|---|
| Overhead 250' pull, 4 conductors 500 with 1/0 ground | | | | |
| Traditional Pipe and Wire installation | time - minutes | time - minutes | Improved Solutions | EC using old THHN |
| 5 × 1,000' reels black conductor arrives at job site, EC off loads and transports to pull site | 45 | 10 | Single reel THHN with 5 conductors (brown, orange, yellow, gray and green) paralleled on single reel | 14% |
| EC sets up 5 reels on jacks in preparation for pull - may need equipment and leveling | 30 | 5 | EC sets up 1 reel on jacks in preparation for pull -may need equipment and leveling | 10% |
| Transport 5 gal bucket pulling lube and rags to pull site | 2 | 0 | | 1% |
| EC applies phase tape to each conductor 3 × 5 | 15 | 0 | | 5% |
| EC pulls braided, poly pulling rope and rag through 250 feet conduit | 10 | 5 | EC pulls pulling rope through 250 feet conduit | 3% |
| EC prepares conductor heads for pulling | 60 | 0.5 | Attach pulling eye to pulling rope | 19% |
| EC sets up to apply lube to head of conduit at start of pull | 30 | 0 | | 10% |
| EC Sets up to apply lube at 1 pull boxes | 30 | 0 | | 10% |
| EC sets up tugger (bolted to floor) | 30 | 15 | EC sets up light weight tugger | 10% |
| Cable pull starts, EC workers apply lube at 2 locations, rope pulling speed 6 feet minute | 45 | 30 | Cable pull starts, rope pulling speed varies from 6-25 feet minute (average 16' min) | 14% |
| Clean lube off conductors and enclosure | 15 | 0 | | 5% |
| Total Minutes | 312 | 65.5 | | |
| Labor 6 men $70.00 per hour | $2,184.00 | $305.67 | 4 men | 100% |

In light of the above description, the service center personnel constructing the integrated wiring solutions may be specially-trained to assemble and construct the integrated wiring solutions. In addition, these service center personnel may be equipped with specially-designed tools to facilitate efficient construction of the integrated wiring solutions. For example, the service center personnel may be equipped with stripping equipment to remove a prescribed, uniform amount of insulation from the conductors, and may further be equipped with standardized tools for crimping the pulling eyes onto the conductors.

On-site contractor personnel may be tasked with a variety of different construction-related functions. Previous techniques for facilitating pulls through conduit may involve such personnel preparing the pulling heads on more or less an as-needed basis. Accordingly, such personnel may possess varying amounts of experience in preparing such pulling heads. However, the service center personnel described above may specialize in various tasks involved with constructing the integrated wiring solutions. Therefore, the integrated wiring solutions constructed by such service center personnel may perform more consistently than pulling heads constructed on-site by, for example, contractor personnel.

The subject matter described above is provided by way of illustration only and should not be construed as limiting. Various modifications and changes may be made to the subject matter described herein without following the example embodiments and applications illustrated and described, and without departing from the true spirit and scope of the claimed subject matter, which is set forth in the following claims.

What is claimed is:

1. A method comprising:
   causing a first indicia to be applied to a body portion of a pulling eye at a first position on the body portion, wherein the body portion of the pulling eye defines an interior cavity for receiving a conductor; and
   causing a second indicia to be applied to the body portion of the pulling eye at a second position on the body portion that is different from the first position on the body portion where the first indicia is caused to be applied, wherein the first indicia has a first configuration that is visually distinct from a second configuration of the second indicia, wherein the first indicia and the second indicia indicate a sequential order for applying a plurality of crimps to the body portion, wherein the first indicia indicates that a first crimp of the plurality of crimps be applied to the first position on the body portion before a second crimp of the plurality of crimps is applied to the second position on the body portion, and wherein the second indicia indicates that the second crimp of the plurality of crimps be applied to the second position on the body portion after the first crimp of the plurality of crimps is applied to the first position on the body portion.

2. The method of claim 1, wherein causing the first indicia to be applied to the body portion of the pulling eye at the first position on the body portion comprises causing the first indicia to be applied such that the first indicia has a first rotational alignment on the body portion, wherein causing the second indicia to be applied to the body portion of the pulling eye at the second position on the body portion comprises causing the second indicia to be applied such that the second indicia has a second rotational alignment on the body portion, and wherein the first rotational alignment of the first indicia on the body portion is different from the second rotational alignment of the second indicia on the body portion.

3. The method of claim 2, wherein the first rotational alignment on the body portion of the first indicia and the second rotational alignment on the body portion of the second indicia provide a guide for rotationally aligning a crimping tool at the first position on the body portion to apply the first crimp of the plurality of crimps to the body portion and for rotationally aligning the crimping tool at the second position on the body portion to apply the second crimp of the plurality of crimps to the body portion, respectively.

4. The method of claim 3, further comprising:
   causing, based on at least the first indicia, the first crimp to be applied to the body portion of the pulling eye at the first position on the body portion prior to causing the second crimp to be applied to the body portion of the pulling eye at the second position on the body portion; and
   after causing the first crimp to be applied to the body portion of the pulling eye, causing the second crimp to be applied to the body portion of the pulling eye at the second position on the body portion.

5. The method of claim 4, wherein causing the first crimp to be applied to the body portion of the pulling eye at the first position on the body portion further comprises applying, using the crimping tool, the first crimp to the body portion at the first position on the body portion at the first rotational alignment relative to the body portion as indicated by the first indicia and applying, using the crimping tool, the second crimp to the body portion at the second position on the body portion at the second rotational alignment relative to the body portion as indicated by the second indicia such that the first crimp and the second crimp have differing rotational alignment relative to one another.

6. The method of claim 1, wherein the first indicia further indicates a first rotational alignment relative to the body portion for positioning a crimping tool to perform the first crimp of the plurality of crimps and the second indicia further indicates a second rotational alignment relative to the body portion for positioning the crimping tool to perform the second crimp of the plurality of crimps, wherein the first rotational alignment indicated by the first indicia is different from the second rotational alignment indicated by the second indicia.

7. The method of claim 1, wherein the first indicia comprises a first element of a mnemonic device and the second indicia comprises a second element of the mnemonic device.

8. The method of claim 1, further comprising:
   causing, based on at least the first indicia, the first crimp to be applied to the body portion of the pulling eye at the first position on the body portion prior to causing the second crimp to be applied to the body portion of the pulling eye at the second position on the body portion; and
   after causing the first crimp to be applied to the body portion of the pulling eye, causing the second crimp to be applied to the body portion of the pulling eye at the second position on the body portion.

9. The method of claim 8, wherein causing, based on at least the first indicia, the first crimp to be applied to the body portion of the pulling eye at the first position on the body portion prior to causing the second crimp to be applied to the body portion of the pulling eye at the second position on the body portion comprises applying, using a crimping tool, the first crimp to the body portion of the pulling eye at the first position on the body portion prior to applying, using the crimping tool, the second crimp to the body portion of the pulling eye at the second position on the body portion.

10. The method of claim 1, further comprising causing, based on at least the first indicia, the first crimp to be applied to the body portion of the pulling eye at the first position on the body portion, wherein the first crimp is positioned on at least a portion of the first indicia and wherein the first crimp extends around only a portion of a circumference of the body portion of the pulling eye.

11. A method comprising:
causing a first indicia to be applied to a body portion of a pulling eye at a first position on the body portion, wherein the first indicia indicates that a first crimp be applied to the body portion at the first position on the body portion, and wherein the body portion of the pulling eye defines an interior cavity for receiving a conductor; and
causing a second indicia to be applied to the body portion of the pulling eye at a second position on the body portion that is different from the first position on the body portion where the first indicia is caused to be applied, wherein the first indicia has a first configuration that is visually distinct from a second configuration of the second indicia, wherein the second indicia indicates that a second crimp be applied to the body portion at the second position, and wherein the first indicia further indicates that the first crimp be applied to the first position on the body portion before the second crimp is applied to the second position on the body portion.

12. The method of claim 11, wherein causing the first indicia to be applied to the body portion of the pulling eye at the first position on the body portion comprises causing the first indicia to be applied such that the first indicia has a first rotational alignment on the body portion, wherein causing the second indicia to be applied to the body portion of the pulling eye at the second position on the body portion comprises causing the second indicia to be applied such that the second indicia has a second rotational alignment on the body portion, and wherein the first rotational alignment of the first indicia on the body portion is different from the second rotational alignment of the second indicia on the body portion.

13. The method of claim 12, wherein the first rotational alignment on the body portion of the first indicia and the second rotational alignment on the body portion of the second indicia provide a guide for rotationally aligning a crimping tool at the first position on the body portion to apply the first crimp to the body portion and for rotationally aligning the crimping tool at the second position on the body portion to apply the second crimp to the body portion, respectively.

14. The method of claim 13, further comprising:
causing, based on at least the first indicia, the first crimp to be applied to the body portion of the pulling eye at the first position on the body portion prior to causing the second crimp to be applied to the body portion of the pulling eye at the second position on the body portion; and
after causing the first crimp to be applied to the body portion of the pulling eye, causing the second crimp to be applied to the body portion of the pulling eye at the second position on the body portion.

15. The method of claim 14, wherein causing the first crimp to be applied to the body portion of the pulling eye at the first position on the body portion further comprises applying, using the crimping tool, the first crimp to the body portion at the first position on the body portion at the first rotational alignment relative to the body portion as indicated by the first indicia and applying, using the crimping tool, the second crimp to the body portion at the second position on the body portion at the second rotational alignment relative to the body portion as indicated by the second indicia such that the first crimp and the second crimp have differing rotational alignment relative to one another.

16. The method of claim 11, wherein the first indicia further indicates a first rotational alignment relative to the body portion for positioning a crimping tool to perform the first crimp and the second indicia further indicates a second rotational alignment relative to the body portion for positioning the crimping tool to perform the second crimp, wherein the first rotational alignment indicated by the first indicia is different from the second rotational alignment indicated by the second indicia.

17. The method of claim 11, wherein the first indicia comprises a first element of a mnemonic device and the second indicia comprises a second element of the mnemonic device.

18. The method of claim 11, further comprising:
causing, based on at least the first indicia, the first crimp to be applied to the body portion of the pulling eye at the first position on the body portion prior to causing the second crimp to be applied to the body portion of the pulling eye at the second position on the body portion; and
after causing the first crimp to be applied to the body portion of the pulling eye, causing, the second crimp to be applied to the body portion of the pulling eye at the second position on the body portion.

19. The method of claim 18, wherein causing, based on at least the first indicia, the first crimp to be applied to the body portion of the pulling eye at the first position on the body portion prior to causing the second crimp to be applied to the body portion of the pulling eye at the second position on the body portion comprises applying, using a crimping tool, the first crimp to the body portion of the pulling eye at the first position on the body portion prior to applying, using the crimping tool, the second crimp to the body portion of the pulling eye at the second position on the body portion.

20. A method comprising:
causing a first indicia to be applied to a body portion of a pulling eye at a first position on the body portion, wherein the first indicia indicates that a first crimp be applied to the body portion at the first position on the body portion, and wherein causing the first indicia to be applied to the body portion of the pulling eye at the first position on the body portion comprises causing the first indicia to be applied such that the first indicia has a first rotational alignment on the body portion; and
causing a second indicia to be applied to the body portion of the pulling eye at a second position on the body portion, wherein the second indicia indicates that a second crimp be applied to the body portion at the second position, wherein the first indicia further indicates that the first crimp be applied to the first position on the body portion before the second crimp is applied to the second position on the body portion, wherein causing the second indicia to be applied to the body portion of the pulling eye at the second position on the body portion comprises causing the second indicia to be applied such that the second indicia has a second rotational alignment on the body portion, and wherein the first rotational alignment of the first indicia on the body portion is different from the second rotational alignment of the second indicia on the body portion.

\* \* \* \* \*